US007108873B2

(12) United States Patent
Chen

(10) Patent No.: US 7,108,873 B2
(45) Date of Patent: Sep. 19, 2006

(54) GELATINOUS FOOD ELASTOMER COMPOSITIONS AND ARTICLES

(75) Inventor: John Y. Chen, Pacifica, CA (US)

(73) Assignee: Applied Elastomerics, Inc., South San Francisco, CA (US)

( * ) Notice: Subject to any disclaimer, the term of this patent is extended or adjusted under 35 U.S.C. 154(b) by 512 days.

(21) Appl. No.: 10/199,363

(22) Filed: Jul. 20, 2002

(65) Prior Publication Data

US 2004/0018223 A1 Jan. 29, 2004

Related U.S. Application Data

(63) Continuation-in-part of application No. 09/721,213, filed on Nov. 21, 2001, now Pat. No. 6,867,253, which is a continuation-in-part of application No. 09/896,047, filed on Jun. 30, 2001, which is a continuation-in-part of application No. 09/421,886, filed on Oct. 5, 1999, now abandoned, which is a continuation-in-part of application No. 09/285,809, filed on Apr. 1, 1999, now abandoned, which is a continuation-in-part of application No. 09/274,498, filed on Mar. 23, 1999, now Pat. No. 6,420,475, which is a continuation-in-part of application No. 09/130,545, filed on Aug. 8, 1998, now Pat. No. 6,627,275, which is a continuation-in-part of application No. 08/984,459, filed on Dec. 3, 1997, now Pat. No. 6,324,703, which is a continuation-in-part of application No. PCT/US97/17534, filed on Sep. 30, 1997, now Pat. No. 6,161,555, which is a continuation-in-part of application No. 08/909,487, filed on Jul. 12, 1997, now Pat. No. 6,050,871, which is a continuation-in-part of application No. 08/863,794, filed on May 27, 1997, now Pat. No. 6,117,176, which is a continuation-in-part of application No. 08/719,817, filed on Sep. 30, 1996, now Pat. No. 6,148,830, which is a continuation-in-part of application No. 08/665,343, filed on Jun. 17, 1996, which is a continuation-in-part of application No. 08/612,586, filed on Mar. 8, 1996, now Pat. No. 6,552,109, which is a continuation-in-part of application No. 08/581,191, filed on Dec. 29, 1995, now Pat. No. 5,760,117, which is a continuation-in-part of application No. 05/581,188, filed on Dec. 29, 1995, now abandoned, which is a continuation-in-part of application No. 08/581,125, filed on Dec. 29, 1995, now Pat. No. 5,962,572, which is a continuation-in-part of application No. 08/288,690, filed on Aug. 11, 1994, now Pat. No. 5,633,286, which is a continuation-in-part of application No. PCT/US94/07314, filed on Jun. 27, 1994, now Pat. No. 5,868,597, which is a continuation-in-part of application No. PCT/US94/04278, filed on Apr. 19, 1994, now Pat. No. 6,033,383.

(51) Int. Cl.
*A01K 97/04* (2006.01)
*A23L 1/05* (2006.01)

(52) U.S. Cl. .................. 426/1; 426/573; 524/505

(58) Field of Classification Search ................ 524/505; 424/486; 426/1, 648, 656, 534, 555, 573
See application file for complete search history.

(56) References Cited

U.S. PATENT DOCUMENTS

| 2,993,874 A | 7/1961 | Hoel ............................ 260/27 |
| 3,149,182 A | 9/1964 | Porter ........................ 360/879 |
| 3,239,476 A | 3/1966 | Harlan ........................ 260/27 |
| 3,239,478 A | 3/1966 | Harlan ........................ 260/27 |
| 3,265,765 A | 8/1966 | Holden ...................... 260/876 |
| 3,325,430 A | 6/1967 | Grasley ....................... 260/25 |
| 3,333,024 A | 7/1967 | Haefele ...................... 260/880 |
| 3,464,850 A | 9/1969 | Haefele ................... 117/135.5 |
| 3,485,787 A | 12/1969 | Haefele ...................... 260/33.6 |
| RE27,145 E | 6/1971 | Jones ......................... 260/880 |
| 3,595,942 A | 7/1971 | Wald .......................... 260/880 |
| 3,614,836 A | 10/1971 | Snyder ......................... 36/2.5 |
| 3,660,849 A | 5/1972 | Jonnes ......................... 2/2.1 |
| 3,676,387 A | 7/1972 | Lindlof ...................... 260/28.5 |
| 3,756,977 A | 9/1973 | Yoshimoto ................. 260/33.6 |
| 3,792,005 A | 2/1974 | Herlan ........................ 260/22 |
| 3,810,957 A | 5/1974 | Lunk .......................... 260/876 |
| 3,821,148 A | 6/1974 | Makowski |
| 3,821,149 A | 6/1974 | Makowski ................. 260/30.6 |
| 3,827,999 A | 8/1974 | Crossland .................. 260/33.6 |
| 3,830,767 A | 8/1974 | Condon ..................... 260/28.5 |
| 3,860,013 A | 1/1975 | Czapor ......................... 132/91 |
| 3,898,208 A | 8/1975 | Krause ....................... 260/85.1 |
| 3,929,715 A | 12/1975 | Noweil ...................... 260/34.2 |
| 3,933,723 A | 1/1976 | Grenness ................... 260/33.6 |
| 3,965,019 A | 6/1976 | St. Clair ...................... 252/59 |
| 4,006,116 A | 2/1977 | Dominguez ................ 260/33.6 |
| 4,032,459 A | 6/1977 | Crossland .................. 252/51.5 |

(Continued)

FOREIGN PATENT DOCUMENTS

| EP | 146163 | 11/1984 |
| EP | 285181 | 4/1988 |
| EP | 439180 | 1/1991 |
| EP | 483370 | 4/1991 |

(Continued)

OTHER PUBLICATIONS

Allen, et al. Comprehensive Polymer Science-vol. 7; 1994; p. 416-431.

(Continued)

*Primary Examiner*—Herbert J. Lilling

(57) ABSTRACT

A soft gelatinous food elastomer composition and article useful as simulated food formed from one or a mixture of two or more of a thermoplastic elastomer block copolymer (s) and one or more plasticizers and a food or components of food. The plasticizers being in sufficient amounts to achieve a gel rigidity of from about 20 gram Bloom to about 1,800 gram Bloom.

16 Claims, No Drawings

U.S. PATENT DOCUMENTS

| Patent | Date | Name | Ref |
|---|---|---|---|
| 4,036,910 A | 7/1977 | Anderson | 525/338 |
| 4,039,629 A | 8/1977 | Himes | 260/880 |
| 4,041,103 A | 8/1977 | Davison | 260/857 |
| 4,080,348 A | 3/1978 | Korpman | 260/27 |
| 4,136,071 A | 1/1979 | Korpman | 260/27 |
| 4,136,699 A | 1/1979 | Collins | 128/290 |
| 4,151,057 A | 4/1979 | St. Clair | |
| 4,176,240 A | 11/1979 | Sabia | 174/23 |
| 4,259,540 A | 3/1981 | Sabia | |
| 4,313,867 A | 2/1982 | Duvdevanl | 260/33.6 |
| 4,351,913 A | 9/1982 | Patel | |
| 4,361,508 A | 11/1982 | Bourland | 523/173 |
| 4,369,284 A | 1/1983 | Chen | |
| 4,432,607 A | 2/1984 | Levy | 350/96.34 |
| 4,481,323 A | 11/1984 | Sterling | 524/269 |
| 4,492,428 A | 1/1985 | Levy | |
| 4,497,538 A | 2/1985 | Patel | |
| 4,509,821 A | 4/1985 | Stenger | 350/96.23 |
| 4,511,354 A | 4/1985 | Sterling | 604/98 |
| 4,600,261 A | 7/1986 | Debbaut | |
| 4,610,738 A | 9/1986 | Jervis | 156/49 |
| 4,618,213 A | 10/1986 | Chen | |
| 4,643,924 A | 2/1987 | Uken | 428/35 |
| 4,662,692 A | 5/1987 | Uken | 339/96 |
| 4,678,664 A | 7/1987 | Schmolka | 424/65 |
| 4,680,233 A | 7/1987 | Camin | 428/424.6 |
| 4,690,831 A | 9/1987 | Uken | 427/44 |
| 4,692,369 A | 9/1987 | Nomi | 428/198 |
| 4,709,982 A | 12/1987 | Corne | 427/44 |
| 4,716,183 A | 12/1987 | Gamarra | 522/90 |
| 4,721,832 A | 1/1988 | Toy | 174/87 |
| 4,764,535 A | 8/1988 | Leicht | |
| 4,798,853 A | 1/1989 | Handlin | 523/173 |
| 4,801,346 A | 1/1989 | Huddleston | |
| 4,822,834 A | 4/1989 | Blevins | 524/427 |
| 4,833,193 A | 5/1989 | Sieverding | |
| 4,842,931 A | 6/1989 | Zook | 428/354 |
| 4,864,725 A | 9/1989 | Debbaut | 29/871 |
| 4,865,905 A | 9/1989 | Uken | 428/220 |
| 4,880,676 A | 11/1989 | Pulgcerver | 428/35.7 |
| 4,880,878 A | 11/1989 | Himes | 525/89 |
| 4,883,431 A | 11/1989 | Uken | |
| 4,888,070 A | 12/1989 | Clark | |
| 4,889,403 A | 12/1989 | Zucker | |
| 4,889,717 A | 12/1989 | Covington | 428/304 |
| 4,900,877 A | 2/1990 | Dubrow | 174/35 |
| 4,909,756 A | 3/1990 | Jervis | |
| 4,929,211 A | 5/1990 | Resnick | 446/14 |
| 4,942,270 A | 7/1990 | Gamarra | 174/93 |
| 4,944,363 A | 7/1990 | Osher | 273/58 |
| 4,944,973 A | 7/1990 | Follette | |
| 4,968,747 A | 11/1990 | Mallikarjun | 525/74 |
| 4,983,008 A | 1/1991 | Campbell | 350/96.16 |
| 5,026,054 A | 6/1991 | Osher | 273/58 |
| 5,059,748 A | 10/1991 | Allen | 174/87 |
| 5,068,138 A | 11/1991 | Mitchell | 428/36.8 |
| 5,085,597 A | 2/1992 | Story | 439/521 |
| 5,088,734 A | 2/1992 | Glava | 273/73 |
| 5,098,421 A | 3/1992 | Zook | 604/367 |
| 5,112,900 A | 5/1992 | Buddenhagen | 524/484 |
| 5,126,182 A | 6/1992 | Lumb et al. | 428/90 |
| 5,149,736 A | 9/1992 | Gamarra | 524/490 |
| 5,153,254 A | 10/1992 | Chen | 524/505 |
| 5,159,022 A | 10/1992 | Ikematu | 525/250 |
| 5,167,649 A | 12/1992 | Zook | 604/307 |
| 5,173,573 A | 12/1992 | Jervis | 174/138 |
| 5,177,143 A | 1/1993 | Chang et al. | 524/848 |
| 5,181,914 A | 1/1993 | Zook | 604/307 |
| 5,191,752 A | 3/1993 | Murphy | 54/44.5 |
| 5,221,534 A | 6/1993 | DesLauriers | 424/78.03 |
| 5,239,723 A | 8/1993 | Chen | 15/104 |
| 5,262,468 A | 11/1993 | Chen | 524/476 |
| 5,313,019 A | 5/1994 | Brusselmans | 174/93 |
| 5,324,222 A | 6/1994 | Chen | 446/34 |
| 5,330,452 A | 7/1994 | Zook | 604/307 |
| 5,333,405 A | 8/1994 | Bowles | 43/42.06 |
| 5,334,646 A | 8/1994 | Chen | 524/474 |
| 5,336,708 A | 8/1994 | Chen | 524/474 |
| 5,442,004 A | 8/1995 | Sutherland | 524/140 |
| 5,459,193 A | 10/1995 | Anderson | 524/505 |
| 5,475,890 A | 12/1995 | Chen | 15/104 |
| 5,479,952 A | 1/1996 | Zachariades | 132/321 |
| 5,541,250 A | 7/1996 | Hudson | 524/505 |
| 5,559,165 A | 9/1996 | Paul | 523/111 |
| 5,580,572 A | 12/1996 | Mikler | 424/448 |
| 5,606,149 A | 2/1997 | Yaworski | 174/92 |
| 5,618,882 A | 4/1997 | Hammond | 525/92 |
| 5,624,294 A | 4/1997 | Chen | 446/253 |
| 5,626,657 A | 5/1997 | Pearce | 106/122 |
| 5,633,286 A | 5/1997 | Chen | 524/474 |
| 5,655,947 A | 8/1997 | Chen | 446/46 |
| 5,703,162 A | 12/1997 | Anderson | 525/89 |
| 5,863,977 A | 1/1999 | Fisher | |
| 5,872,201 A | 2/1999 | Cheun | |
| 5,884,639 A | 3/1999 | Chen | 132/321 |
| 5,929,138 A | 7/1999 | Mercer | |
| 5,952,396 A | 9/1999 | Chang | 522/1 |
| 5,994,446 A | 11/1999 | Graulus et al. | |
| 5,994,450 A * | 11/1999 | Pearce | 524/505 |
| 6,117,176 A | 9/2000 | Chen | 623/36 |
| 6,148,830 A | 11/2000 | Chen | 132/321 |
| 6,161,555 A | 12/2000 | Chen | 132/321 |
| 6,187,837 B1 | 2/2001 | Pearce | 523/105 |
| 6,552,109 B1 * | 4/2003 | Chen | 524/270 |
| 6,794,440 B1 * | 9/2004 | Chen | 524/505 |
| 6,797,765 B1 * | 9/2004 | Pearce | 524/505 |

FOREIGN PATENT DOCUMENTS

| | | |
|---|---|---|
| GB | 1268431 | 1/1969 |
| GB | 2019416 | 4/1979 |
| WO | WO8800603 | 7/1987 |
| WO | PCT/WO 88/00603 | 1/1988 |
| WO | WO9005166 | 9/1989 |
| WO | PCT/WO 90/05166 | 5/1990 |
| WO | PCT/WO 91/05014 | 4/1991 |
| WO | PCT/WO 93/05113 | 3/1993 |
| WO | PCT/WO 93/23472 | 11/1993 |

OTHER PUBLICATIONS

Kirk-Othmer; Encyclopedia of Chemical Technology; 1994; 4th Edition; p. 17-37.

Garder, William; Gardners Chemical Synonyms and Trade Names; 1994.

Holden et al; Thermoplastic Elastomers; 2nd Edition; 1996: chapter 1-p. 1-26 ; Chapter 3-p. 27-70; Chapter 4-p. 71-100.

"Styrene-Diene Triblock Copolymers: Orientation Conditions and Mechanical Properties of the Oriented Materials" A. Weill and R. Pixa, Journal of Polymer Science Polymer Symposium 58, 381-394 (1977).

Septon Trade Literature, Kuraray Co., Ltd. 1995.8 (4,000) 15 Pages.

SC:1102-89 Shell Chemical Technical Bulletin *Kraton® Thermoplastic Rubber in Oil Gels*, Apr. 1989.

Septon, High Performance Thermoplastic Rubber, Kurraray Co., LTD., 1995.

Kraton Polymers, May 1997, Shell Chemical Company.

Silipos manual, 1994.

*Melt Miscibility In Blends Of Polypropylene, Polystryenhe-Block-Poly(Ethylene-Sat-Butylene)-Block-Polystyrene, and Processing Oil From Melting Point Depression*, Ohlesson et al., Polymer Engineering and Science, 1996, vol. 36, No. 11.

*Blends And Thermoplastic Interpenetrating Polymer Networks Of Polypropylene And Polystyrene-Block-Poly(Ethylene-Stat-Butylene)-Block-Polytstyrene Triblock Copolymer. 1: Morphology*

*And Structure-Related Properties*, Ohlesson, et al., Polymer Engineering and Science, Feb. 1996, vol. 36, No. 4.

*Migration And Blooming Of Waxes To The Surface Of Rubber Vulcanizates*, Nah, et al., J. Of Polymer Science: Polymer Physics Ed., vol. 18, 511-521 (1980).

"SiloLiner" Sales literature from Knit-Rite medical (Mar. 1, 1999 three pages).

ALPS South Corporation -Gel Liners: NEW! Easy Liner ELPX, ELDT and ELFR published fact sheet downloaded from the Internet on Aug. 10, 1999.

Chung P. Park and George P. Clingerman, "Compatibilization of Polyethylene-Polystyrene Blends with Ethylene-Styrene Random Copolymers", the Dow Chemical Company, May 1996.

Steve Hoenig, Bob Turley and Bill Van Volkenburgh, "Material Properties and Applications of Ethylene-Styrene Interpolymers", the Dow Chemical Company, Sep. 1996.

Y. Wilson Cheung and Martin J. Guest, "Structure, Thermal Transitions and Mechanical Properties of Ethylene/Styrene Copolymers", the Dow Chemical Company, May 1996. (17).

Teresa Plumley Karjaia, Y. Wilson Cheung and Martin J. Guest, "Melt Rheology and Processability of Ethylene/Styrene Interpolymers", the Dow Chemical Company, May 1997.

D. C. Prevorsek, et al., Origins of Damage Tolerance in Ultrastrong Polyethylene Fibers and Composites:, Journal of Polymer Science: Polymer Symposia No. 75, 81-104 (1993).

Chen, H., et al, "Classification of Ethylene-Styrene Interpolymers Based on Comonomer Content", J. Appl. Polym. Sci., 1998, 70, 109.

Alizadeh, et al., "Effect of Topological Constraints on The Crystallization Behavior of Ethylene/alpha-Olefin Copolymers", PMSE, vol. 81, pp. 248-249, Aug. 22-26, 1999.

Guest, et al., "Structre/Property Relationships of Semi-Crystalline Ethylene-Styrene Interpolymers (ESI)", PMSE, vol. 81, pp. 371-372, Aug. 22-26, 1999.

\* cited by examiner

GELATINOUS FOOD ELASTOMER COMPOSITIONS AND ARTICLES

RELATED APPLICATIONS

This application is a continuation-in-part (CIP) of application U.S. Ser. No. 09/896,047 filed Jun. 30, 2001 which is a CIP of Ser. No. 09/274,498, filed Mar. 23, 1999 (now U.S. Pat. No. 6,420,475). This application is also a CIP of U.S. Ser. No. 09/721,213 filed Nov. 21, 2001 (now U.S. Pat. No. 6,867,253), which is a CIP of Ser. No. 09/274,498, filed Mar. 23, 1999 (now U.S. Pat. No. 6,420,475). This application is a CIP of application U.S. Ser. No. 09/421,886, filed Oct. 5, 1999 (abandoned), which is a CIP of Ser. No. 09/274,498, filed Mar. 23, 1999 (now U.S. Pat. No. 6,420,475). This application is also a CIP of application U.S. Ser. No. 09/285,809, filed Apr. 1, 1999 (abandoned), which is a CIP of Ser. No. 09/274,498, filed Mar. 23, 1999 (now U.S. Pat. No. 6,420,475). This application is also a CIP of U.S. Ser. No. 09/896,047 filed Jun. 30, 2001, which is a CIP of Ser. No. 09/130,545, filed Aug. 8, 1998 (now U.S. Pat. No. 6,627,275). This application is also a CIP of U.S. Ser. No. 09/721,213 filed Nov. 21, 2001 (now U.S. Pat. No. 6,867,253), which is a CIP of Ser. No. 09/130,545, filed Aug. 8, 1998 (now U.S. Pat. No. 6,627,275. This application is also a CIP of U.S. Ser. No. 09/421,886, filed Oct. 5, 1999 (abandoned), which is a CIP of Ser. No. 09/130,545, filed Aug. 8, 1998 (now U.S. Pat. No. 6,627,275). This application is also a CIP of U.S. Ser. No. 09/285,809 filed Apr. 1, 1999 (abandoned), which is a CIP of Ser. No. 09/130,545, filed Aug. 8, 1998 (now U.S. Pat. No. 6,627,275). This application is also a CIP of U.S. Ser. No. 09/896,047 filed Jun. 30, 2001, which is a CIP of U.S. Ser. No. 08/984,459, filed Dec. 3, 1997 (now U.S. Pat. No. 6,324,703). This application is also a CIP of U.S. Ser. No. 09/721,213 filed Nov. 21, 2001 (now U.S. Pat. No. 6,867,253), which is a CIP of Ser. No. 08/984,459, filed Dec. 3, 1997 (now U.S. Pat. No. 6,324,703). This application is also a CIP of U.S. Ser. No. 09/421,886, filed Oct. 5, 1999 (abandoned), which is a CIP of Ser. No. 08/984,459, filed Dec. 3, 1997 (now U.S. Pat. No. 6,324,703). This application is also a CIP of U.S. Ser. No. 09/285,809 filed Apr. 1, 1999 (abandoned), which is a CIP of Ser. No. 08/984,459, filed Dec. 3, 1997 (now U.S. Pat. No. 6,324,703). This application is also a CIP of U.S. Ser. No. 09/896,047 filed Jun. 30, 2001, which is a CIP of Ser. No. 08/909,487, filed Jul. 12, 1997 (now U.S. Pat. No. 6,050,871). This application is also a CIP of U.S. Ser. No. 09/721,213 filed Nov. 22, 2001 (now U.S. Pat. No. 6,867,253). which is a CIP of Ser. No. 08/909,487, filed Jul. 12, 1997 (now U.S. Pat. No. 6,050,871). This application is also a CIP of U.S. Ser. No. 09/421,886, filed Oct. 5, 1999 (abandoned), which is a CIP of Ser. No. 08/909,487, filed Jul. 12, 1997 (now U.S. Pat. No. 6,050,871. This application is also a CIP of U.S. Ser. No. 09/285,809 filed Apr. 1, 1999 (abandoned), which is a CIP of Ser. No. 08/909,487, filed Jul. 12, 1997 (now U.S. Pat. No. 6,050,871). This application is also a CIP of U.S. Ser. No. 09/896,047, filed Jun. 30, 2001 , which is a CIP of Ser. No. 08/863,794, filed May 27, 1997 (now U.S. Pat. No. 6,117,176). This application is also a CIP of U.S. Ser. No. 09/721,213, filed Nov. 21, 2001 (now U.S. Pat. No. 6,867,253), which is a CIP of Ser. No. 08/863,794, filed May 27, 1997 (now U.S. Pat. No. 6,117, 176). This application is also a CIP of U.S. Ser. No. 09/421,886, filed Oct. 5, 1999 (abandoned), which is a CIP of Ser. No. 08/863,794, filed May 27, 1997 (now U.S. Pat. No. 6,117,176). This application is also a CIP of U.S. Ser. No. 09/285,809, filed Apr. 1, 1999 (abandoned), which is a CIP of Ser. No. 08/863,794, filed May 27, 1997 (now U.S. Pat. No. 6,117,176). This application is also a CIP of U.S. Ser. No. 09/896,047 filed Jun. 30, 2001, which is a CIP of CIP of PCT/US97/17534, filed Sep. 30, 1997 (U.S. Ser. No. 09/230,940 now U.S. Pat. No. 6,161,555). This apolication is also a CIP of U.S. Ser. No. 09/721,213 filed Nov. 21, 2001 (now U.S. Pat No. 6,867,253, which is a CIP of PCT/US97/17534, filed Sep. 30, 1997 (U.S. Ser. No. 09/230940 now U.S. Pat. No. 6,161,555). This application is also a CIP of U.S. Ser No. 09/421,886, filed Oct. 5, 1999 (abandoned), which is a CIP of PCT/US97/17534, filed Sep. 30, 1997 (U.S. Ser. No. 09/2309940 now U.S. Pat. No. 6,161,555). This application is also a CIP of U.S. Ser. No. 09/285,809 filed Apr. 1, 1999 (abandoned), which is a CIP of PCT/US97/17534, filed Sep. 30, 1997 (U.S. Ser. No. 09/230940 now U.S. Pat. No. 6,161,555. This application is also a CIP of U.S. Ser. No. 09/896,047 filed Jun. 30, 2001, which is a CIP of Ser. No. 08/719,817 filed Sep. 30, 1996 (U.S Pat. No. 6,148,830). This application is also a CIP of U.S. Ser. No. 09/721,213 filed Nov. 21, 2001 (now U.S. Pat. No. 6,867, 253), which is a CIP of Ser. No. 08/719,817 filed Sep. 30, 1996 (U.S. Pat. No. 6,148,830). This application is also a CIP of U.S. Ser. No. 09/421,886, filed Oct. 5, 1999 (abandoned), which is a CIP of Ser. No. 08/719,817 filed Sep. 30, 1996 (U.S. Pat. No. 6,148,830). This application is also a CIP of U.S. Ser. No. 09/285,809 filed Apr. 1, 1999 (abandoned), which is a CIP of Ser. No. 08/719,817 filed Sep. 30, 1996 (U.S. Pat. No. 6,148,830). This application is also a CIP of U.S. Ser. No. 09/896,047 filed Jun. 30, 2001, which is a CIP of Ser. No. 08/665,343 filed Jun. 17, 1996, which is a CIP of Ser. No. 08/612,586 filed Mar. 8, 1996 (now U.S. Pat. No. 6,552,109). This application is also a CIP of U.S. Ser. No. 09/721,213 filed Nov. 21, 2001 (now U.S. Pat. No. 6,867,253), which is a CIP of Ser. No. 08/565,343 filed Jun. 17, 1996, which is a CIP of Ser. No. 08/612,586 filed Mar. 8, 1996 (now U.S. Pat. No. 6,552,109). This application is also a CIP of U.S. Ser. No. 09/421,886, filed Oct. 5, 1999 (abandoned), which is a CIP of Ser. No. 08/665,343 filed Jun. 17, 1996, which is a CIP of Ser. No. 08/612,586 filed Mar. 8, 1996 (now U.S. Pat. No. 6,552,109. This application is also a CIP of U.S. Ser. No. 09/285,809 filed Apr. 1, 1999 (abandoned), which is a CIP of Ser. No. 08/665,343 filed Jun. 17, 1996, which is a CIP of Ser. No. 08/612,586 filed Mar, 8, 1996 (now U.S. Pat. No. 6,552,109). This application is also a CIP of U.S. Ser. No. 09/896,047 filed Jun. 30, 2001, which is a CIP of Ser. No. 08/665,343 filed Jun. 17, 1996, which is a CIP of PCT/US94/04278 filed Apr. 19, 1994 (U.S. Ser. No. 08/211781 now U.S. Pat. No. 6,033, 383). This application is also a CIP of U.S. Ser. No. 09/721,213 filed Nov. 21, 2001 (now U.S. Pat. No. 6,867, 253), which is a CIP of Ser. No. 08/665,343 filed Jun. 17, 1996, which is a CIP of PCT/US94/044278 filed Apr. 19, 1994 (U.S. Ser. No. 08/211781 now U.S. Pat. No. 6,033, 383). This application is also a CIP of U.S. Ser. No. 09/421,886, filed Oct. 5, 1999 (abandoned), which is a CIP of Ser. No. 08/665,343 filed Jun. 17, 1996, which is a CIP of PCT/US94/044278 filed Apr. 19, 1994 (U.S. Ser. No. 08/211,781 now U.S. Pat. No. 6,033,383). This application is also a CIP of U.S. Ser. No. 09/285,809 filed Apr. 1, 1999 (abandoned), which is a CIP of Ser. No. 08/665,343 filed Jun. 17, 1996, which is a CIP of PCT/US94/044278 filed Apr. 19, 1994 (U.S. Ser. No. 08/211,781 now U.S. Pat. No. 6,033,383). This application is also a CIP of U.S. Ser. No. 09/896,047 filed Jun. 30, 2001, which is a CIP of Ser. No. 08/665,343 filed Jun. 17, 1996, which is a CIP of PCT/US94/07314 filed Jun. 27, 1994 (U.S. Ser. No. 08/256,235 now U.S. Pat. No. 5,868,597). This application is also a CIP or U.S. Ser. No. 09/721,213 filed Nov. 21, 2001 (now U.S. Pat. No. 6,867,253), which is a CIP of 08/665,343 filed Jun. 17, 1996, which is a CIP of PCT/US94/07314 filed Jun. 27, 1994 (U.S. Ser. No. 08/256,235 now U.S. Pat. No. 5,868,597). This Application is also a CIP of U.S. Ser. No. 09/421,886, filed Oct. 5, 1999 (abandoned), which is a CIP of Ser. No. 08/665,343 filed Jun. 17, 1996, which is a CIP of PCT/US94/07314 filed Jun. 27, 1994 (U.S. Ser. No. 08/256235 now U.S. Pat. No. 5,868,597). This application is also a CIP of U.S. Ser. No. 09/285,809 filed Apr. 1, 1999 (abandoned), which is a CIP of Ser. No. 08/665,343 filed Jun. 17, 1996, which is a CIP of PCT/US94/07314 filed Jun 27, 1994 (U.S. Ser. No. 08/256,235 now U.S. Pat. No. 5,868,597). This application is also a CIP of U.S. Ser. No. 09/896,047 filed Jun. 30, 2001, which is a CIP of Ser. No. 08/665,343 filed Jun. 17, 1996, which is a CIP of Ser. No. 08/288,690 filed Aug. 11, 1994 (now U.S. Pat. No. 5,633,286). This application is also a CIP of U.S. Ser. No. 09/721,213 filed Nov. 21, 2001 (now U.S. Pat. No. 6,867,253, which is a CIP of Ser. No. 08/665,343 filed Jun. 17, 1996, which is a CIP of Ser. No. 08/288,690 filed Aug. 11, 1994 (now U.S. Pat. No. 5,633,286). This application is also a CIP of U.S. Ser. No. 09/421,886, filed Oct. 5, 1999 (abandoned), which is a CIP of Ser. No. 08/665,343 filed Jun. 17, 1996, which is a CIP of Ser. No. 08/288,690 filed Aug. 11, 1994 (now U.S. Pat. No. 5,533,286). This application is also a CIP of U.S. Ser. No. 09/285,809 filed Apr. 1, 1999 (abandoned), which is a CIP of Ser. No. 08/665,343 filed Jun. 17, 1996, which is a CIP of Ser. No. 08/288,690 filed Aug. 11, 1994(now U.S. Pat. No. 5,633,286). This application is also a CIP of U.S. Ser. No. 09/896,047 filed Jun. 30, 2001, which is a CIP of Ser. No. 08/665,343 filed Jun. 17, 1996, which is a CIP of Ser. No. 08/581,188 filed Dec. 29, 1995 (abandoned), which is a CIP of Ser. No. 08/288,690 filed Aug. 11, 1994 (now U.S. Pat. No. 5,633,286). This application is also a CIP of U.S. Ser. No. 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,188 filed Dec. 29, 1995 (abandoned), which is a CIP of Ser. No. 08/288,690 filed Sep. 11, 1994 (now U.S. Pat. No. 5,633,286). This application is also a CIP of U.S. Ser. No. 09/421,886, filed Oct. 5, 1999 (abandoned), which is a CIP of Ser. No. 08/665,343 filed Jun. 17, 1996, which is a CIP of Ser. No. 08/581,188 filed Dec. 29, 1995 (abandoned), which is a CIP of Ser. No. 08/288,690 filed Aug. 11, 1994 (now U.S. Pat. No. 5,633,286). This application is also a CIP of U.S. Ser. No. 09/285,809 filed Apr. 1, 1999 (abandoned), which is a CIP of Ser. No. 08/665,343 filed Jun. 17, 1996, which is a CIP of Ser. No. 08/581,188 filed Dec. 29, 1995 (abandoned), which is a CIP of Ser. No. 08/288,690 filed Sep. 11, 1994 (now U.S. Pat. No. 5,633,286). This application is also a CIP of U.S. Ser. No. 09/896,047 filed Jun. 30, 2001, which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of Ser. No. 08/288,690 filed Aug. 11, 1994 (now U.S. Pat. No. 5,633,286). This application is also a CIP of U.S. Ser. No. 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of Ser. No. 08/288,690 filed Sep. 11, 1994 (now U.S. Pat. No. 5,633,286). This application is also a CIP of U.S. Ser. No. 09/421,886, filed Oct. 5, 1999 (abandoned), which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of Ser. No. 08/288,690 filed Aug. 11, 1994 (now U.S. Pat. No. 5,633,286). This application is also a CIP of U.S. Ser. No. 09/285,809 filed Apr. 1, 1999 (abandoned), which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of Ser. No. 08/288,690 filed Aug. 11, 1994 (now U.S. Pat. No. 5,633, 286). This application is also a CIP of U.S. Ser. No. 09/896,047 filed Jun. 30, 2001, which is a CIP of Ser. No. 08/665,343 filed Jun. 17, 1996, which is a CIP of Ser. No. 08/581,125 filed Dec. 29, 1995 (now U.S. Pat. No. 5,962, 572), which is a CIP of Ser. No. 08/288,690 filed Aug. 11, 1994 (now U.S. Pat. No. 5,633,286). This application is also a CIP of U.S. Ser. No. 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,125 filed Dec. 29, 1995 (now U.S. Pat. No. 5,962, 572, which is a CIP of Ser. No. 08/288,690 filed Aug. 11, 1994 (now U.S. Pat. No. 5,633,286). This application is also a CIP of U.S. Ser. No. 09/421,886, filed Oct. 5, 1999 (abandoned), which is a CIP of Ser. No. 08/665,343 filed Jun. 17, 1996, which is a CIP of Ser. No. 08/581,125 filed Dec. 29, 1995 (now U.S. Pat. No. 5,962,572), which is a CIP of Ser. No. 08/288,690 filed Aug. 11, 1994 (now U.S. Pat. No. 5,633,286). This application is also a CIP of U.S. Ser. No. 09/285,809 filed Apr. 1, 1999 (abandoned), which is a CIP of Ser. No. 08/665,343 filed Jun. 17, 1996, which is a CIP of Ser. No. 08/581,125 filed Dec. 29, 1995 (now U.S. Pat. No. 5,962,572, which is a CIP of Ser. No. 08/288,690 filed Aug. 11, 1994 (now U.S. Pat. No. 5,633,286). This application is also a CIP of U.S. Ser. No. 09/896,047 filed Jun. 30, 2001, which is a CIP of Ser. No. 08/665,343 filed Jun. 17, 1996, which is a CIP of Ser. No. 08/581,188 filed Dec. 29, 1993 (abandoned), which is a CIP of PCT/US94/ 07314 filed Jun. 27, 1994 (U.S. Ser. No. 08/256,235 now U.S. Pat. No. 5,868,597), which is a CIP of PCT/US94/ 04278 filed Apr. 19, 1994 (U.S. Ser. No. 08/211,781 now U.S. Pat. No. 6,033,383). This application is also a CIP of U.S. Ser. No. 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,188 filed Dec. 29, 1995 (abandoned), which is a CIP of PCT/US94/ 07314 filed Jun. 27, 1994 (U.S. Ser. No. 08/256,235 now U.S. Pat. No. 5,868,597), which is a CIP of PCT/US94/ 04278 (U.S. Ser. No. 08/211,781 now U.S. Pat. No. 6,033, 383). This application is also a CIP of (U.S. Ser. No. 09/421,886, filed Oct. 5, 1999 (abandoned), which is a CIP of Ser. No. 08/665,343 filed Jun. 17, 1996, which is a CIP of Ser. No. 08/581,188 filed Dec. 29, 1995 (abandoned), which is a CIP of PCT/US94/07314 filed Jun. 27, 1994 (U.S. Ser. No. 08/256,235 now U.S. Pat. No. 5,868,597, which is a CIP of PCT/US94/04278 (U.S. Ser. No. 08/211,781 now U.S. Pat. No. 6,033,383). This application is also a CIP of (U.S. Ser. No. 09/285,809 filed Apr. 1, 1999 (abandoned), which is a CIP of Ser. No. 08/665,343 filed Jun. 17, 1996, which is a CIP of Ser. No. 08/581,188 filed Dec. 29, 1995 (abandoned), which is a CIP of PCT/US94/07314 filed Jun. 27, 1994 (U.S. Ser. No. 08/256,235 now U.S. Pat. No. 5,868,597), which is a CIP of PCT/US94/04278 (U.S. Ser. No. 08/211,781 now U.S. Pat. No. 6,033,383). This application is also a CIP of (U.S. Ser. No. 09/896,047 filed Jun. 30, 2001, which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of PCT/US94/07314 filed Jun. 27, 1994 (U.S. Ser. No. 08/256, 235 now U.S. Pat. No. 5,868,597), which is a CIP of PCT/US94/04278 (U.S. Ser. No. 08/211,781 now U.S. Pat.

No. 6,033,383). This application is also a CIP of U.S. Ser. No. 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,191 filed Dec. 29, 1995 (now U.S. Pat. No. 5,760,117, which is a CIP of PCT/US94/07314 filed Jun 27, 1994 (U.S. Ser. No. 08/256,235 now U.S. Pat. No. 5,868,597), which is a CIP of PCT/US94/04278 (U.S. Ser. No. 08/211,781 now U.S. Pat. No. 6,033,383). This application is also a CIP of U.S. Ser. No. 09/421,886, filed Oct. 5, 1999 (abandoned), which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of PCT/US94/07314 filed Jun. 27, 1994 (U.S. Ser. No. 08/256,235 now U.S. Pat. No. 5,868,597), which is a CIP of PCT/US94/04278 (U.S. Ser. No. 08/211,781 now U.S. Pat. No. 6,033,383). This application is also a CIP of U.S. Ser. No. 9/285,809 filed Apr. 1, 1999 (abandoned), which is a CIP of Ser. No. 08/665,343 filed Jun. 17, 1996, which is a CIP of Ser. No. 08/581,191 filed Dec. 29, 1995 (now U.S. Pat. 5,760,117), which is a CIP of PCT/US94/07314 filed Jun. 27, 1994 (U.S. Ser. No. 08/256,235 now U.S. Pat. No. 5,868,597), which is a CIP of PCT/US94/04278 (U.S. Ser. No. 8/211,781 now U.S. Pat. No. 6,033,383). This application is also a CIP or U.S. Ser. No. 09/896,047 filed Jun. 30, 2001, which is a CIP of Ser. No. 08/665,343 filed Jun. 17, 1996, which is a CIP of Ser. No. 08/581,125 filed Dec. 29, 1995 (now U.S. Pat. No. 5,962,572), which is a CIP of PCT/US94/07314 filed Jun. 27, 1994 (U.S. Ser. No. 08/256,235 now U.S. Pat. No. 5,868,597), which is a CIP of PCT/US94/04278 (U.S. Ser. No. 08/211,781). This application is also a CIP of U.S. Ser. No. 09/721,213 filed Nov. 21, 2001 now U.S. Pat. No. 6,867,253), which is a CIP of Ser. No. 08/665,343 filed Jun. 17, 1996, which is a CIP of Ser. No. 08/581,125 filed Dec. 29, 1995 (now U.S. Pat. No. 5,962,572), which is a CIP of PCT/US94/07314 filed Jun 27, 1994 (U.S. Ser. No. 08/256, 235 now U.S. Pat. No. 5,868,597), which is a CIP of PCT/US94/04278 (U.S. Ser. No. 08/211,781 now U.S. Pat. No. 6,033,383). This application is also a CIP of U.S. Ser. No. 09/421,886, filed Oct. 5, 1999 (abandoned), which is a CIP of Ser. No. 08/665,343 filed Jun. 17, 1996, which is a CIP of Ser. No. 08/581,125 filed Dec. 29, 1995 (now U.S. Pat. No. 5,962,572), which is a CIP of PCT/US94/07314 filed Jun. 27, 1994 (U.S. Ser. No. 08/256,235 now U.S. Pat. No. 5,868,597), which is a CIP of PCT/US94/04278 (U.S. Ser. No. 08/211,781 now U.S. Pat. No. 6,033,383). This application is also a CIP of U.S. Ser. No. 09/285,809 filed Apr. 1, 1999 (abandoned), which is a CIP of Ser. No. 08/665,343 filed Jun. 17, 1996, which is a CIP of Ser. No. 08/581,125 filed Dec. 29, 1995 (now U.S. Pat. No. 5,962, 572), which is a CIP of PCT/US94/07314, filed Jun. 27, 1994 (U.S. Ser. No. 08/256,235 now U.S. Pat. No. 5,868, 597), which is a CIP of PCT/US94/04278, filed Apr. 19, 1994 (U.S. Ser. No. 08/211,781 now U.S. Pat. No. 6,033, 383). This application is being filed even date with the following multiple applications having titles: (1) "GELATINOUS ELASTOMER COMPOSITIONS AND ARTICLES FOR USE AS FISHING BAIT", (now U.S. Ser. No. 10/199, 361) (2) "TEAR RESISTANT GELATINOUS ELASTOMER COMPOSITIONS AND ARTICLES FOR USE AS FISHING BAIT", (now U.S. Ser. No. 10/199,364), (3) "GELATINOUS FOOD-ELASTOMER COMPOSITIONS AND ARTICLES FOR USE AS FISHING BAIT", (now U.S. Ser. No. 10/199,362), (4) "GELATINOUS FOOD-ELASTOMER COMPOSITIONS AND ARTICLES", (now U.S. Ser. No. 10/199,363); said currently filed applications U.S. Ser. Nos. 10/199,361; 10/199,363; and 10/199,364 (now U.S. Pat. No. 6,794,440) are the same specifically identified applications incorporated-by-reference on Jul. 20, 2002 in the orininal papers as included in the specification-as-filed (at page 1 lines 4–10) which specification is specifically referred to in the combined oath and declaration executing this application that the subject matter contained in the related (said) applications and patents U.S. Ser. Nos. 10/199,361; 10/199,362; and 10/199,364 (now U.S. Pat. No. 6,794,440) are specifically incoporated herein by reference in this application (now U.S. Ser. No. 10/199,363).

BACKGROUND OF THE INVENTION

This invention relates to foods.

SUMMARY OF THE INVENTION

The present invention comprises a soft gelatinous food elastomer composition and article useful simulated food formed from (I) 100 parts by weight of one or a mixture of two or more of thermoplastic elastomer block copolymer(s);

(II) one or more first plasticizers in combination with or without one or more of second plasticizers being in sufficient amounts to achieve a gel rigidity of from about 20 gram Bloom to about 1,800 gram Bloom;

said gelatinous elastomer composition in combination with or without one or more selected (III) polymers or coplymers;

said gelatinous elastomer composition in combination with at least one selected components (IV), (V), (VI), (VII) and (VIII);

said components (IV) being one or more foods; said components (V) being one or more components of foods; said components (VI) being one or more food nutrients; said components (VII) being one or more food flavorings; and said components (VIII) being one or more food additives; said second plasticizers being in effective amounts in combination with said first plasticizers for said gelatinous compositions to have a greater temperature compression set than a gelatinous composition having the same rigidity formed from said first plasticizers alone;

said second plasticizers for said gelatinous compositions to have a greater temperature compression set than a gelatinous composition having the same rigidity formed from said first plasticizers alone or formed from a combination of said first plasticizers and said second plasticizers;

said simulated food being life like, soft, flexible, and capable of exhibiting buoyancy in water;

said simulated food being rupture resistant to dynamic stretching, shearing, resistant to ball-up during casting, resistant to tearing encountered during hook penetration, casting, and presentation;

said simulated food capable of exhibiting a success hook to catch ratio greater than 5, and said simulated food having greater elongation, greater tear resistance, or greater fatigue resistance than a conventional plastisol polyvinyl chloride simulated food of corresponding rigidity.

The various aspects of the invention gel compositions and articles made from the invention gel compositions will become apparent to those skilled in the art upon consideration of the accompanying disclosure.

DESCRIPTION OF THE INVENTION

A internet search of the USPTO Patent Data Base of Applicant's published patent applications and issued patent describing gel compositions identified: 6,161,555, 6,333,374; 6,324,703; 6,148,830; 6,117,176; 6,050,871; 5,884,639; 5,508,334; 5,334,646; 5,262,468; 5,153,254; PCT/US97/17534, PCT/US94/04278 and PCT/US94/07314 which are incorporated herein by reference.

Block and other copolymers are described in the following publications:

(1) W. P. Gergen, "Uniqueness of Hydrogenated Block Copolymers for Elastomeric Applications," presented at the German Rubber Meeting, Wiesbaden, 1983; Kautsch, Gummi, Kunstst. 37, 284 (1984). (2) W. P. Gergen, et al., "Hydrogenated Block Copolymers," Paper No. 57, presented at a meeting of the Rubber Division ACS, Los Angeles, Apr. 25, 1985. Encyclopedia of Polymer Science and Engineering, Vol. 2, pp 324–434, "Block Copolymers". (3) L. Zotteri and et al., "Effect of hydrogenation on the elastic properties of poly(styrene-b-diene-b-styrene) copolymers", Polymer, 1978, Vol. 19, April. (4) J. Kenneth Craver, et al., Applied Polymer Science, Ch. 29, "Chemistry and Technology of Block Polymers", pp. 394–429, 1975. (5) Y. Mahajer and et al., "The influence of Molecular Geometry on the Mechanical Properties of homopolymers and Block Polymers of Hydrogenated Butadiene and Isoprene" reported under U.S. ARO Grant No. DAAG29-78-G-0201. (6) J. E. McGrath, et al., "Linear and Star Branched Butadiene-Isoprene Block Copolymers and Their Hydrogenated Derivatives", Chem. Dept, Virginia Polytechnic Institute and State University Blacksturg, Va., reported work supported by Army Research Office. (7) Legge, Norman R., "Thermoplastic Elastomers", Charles Goodyear Medal address given at the 131st Meeting of the Rubber Division, American Chemical Society, Montreal, Quebec, Canada, Vol. 60, G79–G115, May 26–29, 1987. (8) Falk, John Carl, and et al., "Synthesis and Properties of Ethylene-Butylene-1 Block Copolymers", Macromolecules, Vol. 4, No. 2, pp. 152–154, March-April 1971. (9) Morton, Maurice, and et al., "Elastomeric Polydiene ABA Triblock Copolymers within Crystalline End Blocks", University of Arkon, work supported by Grant No. DMR78-09024 from the National Science Foundation and Shell Development Co. (10) Yee, A. F., and et al., "Modification of PS by S-EB-S Block Copolymers: Effect of Block Length", General Electric Corporate Research & Development, Schenectady, NY 12301. (11) Siegfried, D. L., and et al., "Thermoplastic Interpenetrating Polymer Networks of a Triblock Copolymer elastomer and an Monomeric Plastic Mechanical Behavior", Polymer Engineering and Science, January 1981, Vol. 21, No. 1, pp 39–46. (12) Clair, D. J., "S-EB-S Copolymers Exhibit Improved Wax Compatibility", Adhesives Age, November, 1988. (13) Shell Chemical Technical Bulletin SC: 1102-89, "Kraton® Thermoplastic Rubbers in oil gels", April 1989. (14) Chung P. Park and George P. Clingerman, "Compatibilization of Polyethylene-Polystyrene Blends with Ethylene-Styrene Random Copolymers", the Dow Chemical Company, May 1996. (15) Steve Hoenig, Bob Turley and Bill Van Volkenburgh, "Material Properties and Applications of Ethylene-Styrene Interpolymers", the Dow Chemical Company, September 1996. (16) Y. Wilson Cheung and Martin J. Guest, "Structure, Thermal Transitions and Mechanical Properties of Ethylene/Styrene Copolymers", the Dow Chemical Company, May 1996. (17) Teresa Plumley Karjaia, Y. Wilson Cheung and Martin J. Guest, "Melt Rheology and Processability of Ethylene/Styrene Interpolymers", the Dow Chemical Company, May 1997. (18) D.C. Prevorsek, et al., "Origins of Damage Tolerance in Ultrastrong Polyethylene Fibers and Composites: Journal of Polymer Science: Polymer Symposia No. 75, 81–104 (1993). (19) Chen, H., et al, "Classification of Ethylene-Styrene Interpolymers Based on Comonomer Content", J. Appl. Polym. Sci., 1998, 70, 109. (20–24) U.S. Pat. Nos. 5,872,201; 5,460,818; 5,244,996; EP 415815A; JP07,278,230 describes substantially random, more appropriately presudorandom copolymers (interpolymers), methods of making and their uses. (25) Alizadeh, et al., "Effect of Topological Constraints on The Crystallization Behavior of Ethylene/alp [ha-Olefin Copolymers", PMSE, Vol, 81, pp. 248–249, Aug. 22–26, 1999. (26) Guest, et al., "Structure/Property Relationships of Semi-Crystalline Ethylene-Styrene Interpolymers (ESI)", PMSE, Vol, 81, pp. 371–372, Aug. 22–26, 1999. (27) A. Weill and R. Pixa, in Journal of Polymer Science Symposium, 58, 381–394 (1977), titled: "Styrene-diene Triblock Copolymers: Orientation Conditions and Mechanical Properties of the Oriented Materials" describe techniques of orientation of neat SIS and SBS block copolymers and their properties. (28) Elastomeric Thermoplastic, Vol. 5, pages 416–430; Block Copolymers, Vol. 2, pages 324; Block and Graft Copolymers; Styrene-Diene Block Copolymers, Vol. 15, pages 508–530; and Microphase Structure, can be found in *ENCYCLOPEDIA OF POLYMER SCIENCE AND ENGINEERING*, 1987. (29) Legge, N. R, et al., Chemistry and Technology of Block Polymers, Ch. 29, pages 394–429, ACS, Organic Coatings and Plastics Chemistry,© 1975. (30) Legge, N. R., Thermoplastic Elastomers, Rubber Chemistry and Technology, Vol. 60, pages G79–117. (31) Lindsay, G. A., et al., Morphology of Low Density Polyethylene/EPDM Blends Having Tensile Strength Synergism, source: unknown. (32) Cowie, J. M. G., et al., Effect of Casting on the Stress-Hardening and Stress-Softening Characteristics of Kraton-G 1650 Copolymer Films, J. Macromol. Sci.-Phys., B 16(4), 611–632 (1979). (33) Futamura, S., et al., Effects of Center Block Structure on the Physical and Rheological Properties of ABA Block Copolymers. Part II. Rheological Properties, Polymer Engineering and Science, August, 1977, Vol. 17, No. 8, pages 563–569. (34) Kuraray Co., LTD. MSDS, Kuraray Septon 4055, Hydrogenated Styrene Isoprene/Butadiene Block Copolymer, Apr. 25, 1991. (35) Hoening, et al. U.S. Pat. No. 6,156,842, May 23, 2000, "Structures and fabricated articles having shape memory made from. Alpha.-olefin/vinyl or vinylidene aromatic and/or hindered aliphatic vinyl or vinylidene interpolymers. (36) Shell Technical bulletin SC: 1102-89 "Kraton® Thermoplastic Rubbers in oil gels", April 1989. (37) Witco products literature #19610M 700-360: "White oils Petrolatum, Microcrystalline Waxes, Petroleum Distillates", 1996 Witco Corporation. (38) Witco presentation: "White Mineral Oils in Thermoplastic Elastomers", ANTEC 2002, May 5–8, 2002. (39) Lyondell literature LPC-8126 1/93, "Product Descriptions of White Mineral Oils", pp 30–33. (40) Collins, Jr., Henry Hill, 'COMPLETE FIELD GUIDE TO AMERICAN WILDLIFE", 1959, LCCN: 58-8880. (41) Romanack, Mark, Bassin' with the Pros, 2001, LCCN: 2001086512. (42) Salamone, Joseph C., Concise Polymeric Materials Encyclopedia, CRC Press, 1999. (43) Lide, David R., Handbook of Chemistry and Physics, CRC Press, 78th Edition, 1997–1998. (44) Sigma year 2002–2003 Biochemical and Reagents for life Science Research, sigma-aldrich-.com. (45) Kraton Polymers and Compounds, Typical Properties Guide, K0137 Brc-00U, 2001. (46) Kraton Thermoplastic Rubber, Typical properties 1988, SC: 68–78, 5/88 5M. (47) Humko chemical Product Guide, Witco 1988.

(48) Opportunities with Humko chemical Kemamide fatty amides, Witco 1987. The above applications, patents and publications are specifically incorporated herein by reference.

Legge's paper teaches the development of (conventional substantially amorphous elastomer mid segment) SEBS triblock copolymers. In the polymerization of butadiene by alkyllithium initiators, 1,4-addition or 1,2-addition polymers, mixtures, can be obtained. In forming styrene butadiene triblock copolymers involving the addition of solvating agents such as ethers just before the final styrene charge is added, any excess of ethers can alter the polybutadiene structure from a 1,4-cis or trans structure to a 1,2- or 3,4-addition polymer. Using difunctional coupling agent would give linear block copolymers and multifuntional agents would give star-shaped or radial block copolymers. Hydrogenation of the 1,4-polybutadiene structure yields polyethylene, while that of the 1,2-polybutadiene yields polybutylene. The resulting polyethylene will be essentially identical with linear, high-density polyethylene with a melting point, Tm, of about 136° C. Hydrogenation of 1,2-polybutadiene would yield atactic poly(1-butene) (polybutylene). The Tg of polybutylene is around −18° C. Random mixtures of ethylene and butylene units in the chain would suppress crystallinity arising from polyethylene sequences. The objective for a good elastomer should be to obtain a saturated olefin elastomeric segment with the lowest possible Tg and the best elastomeric properties. Such an elastomer favored using styrene as the hard-block monomer and selecting the best monomer for hydrogenation of the elastomer mid segment. Using a mixture of 1,4- and 1,2-polybutadiene as the base polymer for the mid segment would result in an ethylene/butylene mid segment in the final product. The elements of selection of the midsegment composition is elastomer crystallinity and the elastomer Tg of an ethylene/butylene copolymer. Very low levels of crystallinity can be achieved around 40–50% butylene concentration. The minimum in dynamic hysteresis around 35% butylene concentration in the elastomeric copolymer. A value of 40% butylene concentration in the ethylene/butylene midsegment was chosen for the S-EB-S block copolymers. Clair's paper teaches that the EB midblock of conventional S-EB-S polymers is a random copolymer of ethylene and 1-butene exhibiting nearly no crystallinity in the midblock. In the preparation of ethylene-butylene (EB) copolymers, the relative proportions of ethylene and butylene in the EB copolymer chain can be controlled over a broad range from almost all ethylene to almost all butylene. When the EB copolymer is nearly all ethylene, the methylene sequences will crystallize exhibiting properties similar to low density polyethylene. In differential scanning calorimeter (DSC) curves, the melting endotherm is seen on heating and a sharp crystallization exotherm is seen on cooling. As the amount of butylene in the EB copolymer is increased, the methylene sequences are interrupted by the ethyl side chains which shorten the methylene sequences length so as to reduce the amount of crystallinity in the EB copolymer. In conventional S-EB-S polymers, the amount of 1-butene is controlled at a high enough level to make the EB copolymer midblock almost totally amorphous so as to make the copolymer rubbery and soluble in hydrocarbon solvents. Clair suggests that an S-EB-S polymer retaining at least some crystallinity in the EB copolymer midblock may be desirable. Therefore, a new family of S-EB-S polymers are developed (U.S. Pat. No. 3,772,234) in which the midblock contains a higher percentage of ethylene. The molecular weights of the new crystalline midblock segment S-EB-S polymers can vary from low molecular weight, intermediate molecular, to high molecular weight; these are designated Shell GR-3, GR-1, and GR-2 respectively. Unexpectly, the highest molecular weight polymer, GR-2 exhibits an anomalously low softening point. A broad melting endotherm is seen in the DSC curves of these polymers. The maximum in this broad endotherm occurs at about 40° C. Himes, et al., (4,880,878) describes SEBS blends with improved resistance to oil absorption. Papers (14)–(17) describes poly (ethylene-styrene) substantially random copolymers (Dow Interpolymers™): Dow S, M and E Series produced by metallocene catalysts, using single site, constrained geometry addition polymerization catalysts resulting in poly(ethylene-styrene) substantially random copolymers with weight average molecular weight (Mw) typically in the range of $1 \times 10^4$ to $4 \times 10^5$, and molecular weight distributions (Mw/Mn) in the range of 2 to 5. Paper (18) Prevorsek, et al., using Raman spectroscopy, WAXS, SAXD, and EM analysis interprets damage tolerance of ultrastrong PE fibers attributed to the nano scale composite structure that consists of needle-like-nearly perfect crystals that are covalently bonded to a rubbery matrix with a structure remarkably similar to the structure of NACRE of abalone shells which explains the damage tolerance and impact resistance of PE fibers. PE because of its unique small repeating unit, chain flexibility, ability to undergo solid state transformation of the crystalline phase without breaking primary bonds, and its low glass transition temperature which are responsible for large strain rate effects plays a key role in the damage tolerance and fatigue resistance of structures made of PE fibers. Chen (19) classifies 3 distinct categories of E (approximately 20–50 wt % styrene), M (approximately 50–70 wt % styrene), & S (greater than approximately 70 wt % styrene) substantially random or more appropriately pseudo-random ethylene-styrene copolymers or random copolymers of ethylene and ethylene-styrene dyads. The designated Ethylene-styrene copolymers are: E copolymers (ES16, ES24, ES27, ES28, ES28, ES30, and ES44 with styrene wt % of 15.7, 23.7, 27.3, 28.1, 39.6 & 43.9 respectively), M copolymers (ES53, ES58, ES62, ES63, and ES69 with styrene wt % of 52.5, 58.1, 62.7, 62.8, and 69.2 respectively and crystallinity, %, DSC, based on copolymer of 37.5, 26.6, 17.4, 22.9, 19.6 and 5.0 respectively), S copolymers (ES72, ES73, and ES74 with styrene wt % of 72.7, 72.8, and 74.3 respectively). The maximum comonomer content for crystallization of about 20% is similar in other ethylene copolymers, such as in ethylene-hexene and ethylene-vinyl acetate copolymers. If the comonomer can enter the crystal lattice, such as in ethylene-propylene, compositions in excess of 20 mol % comonomer can exhibit crystallinity. The molecular weight distribution of these copolymers is narrow, and the comonomer distribution is homogeneous. These copolymers exhibit high crystalline, lamellar morphologies to fringed micellar morphologies of low crystallinity. Crystallinity is determined by DSC measurements using a Rheometric DSC. Specimens weighing between 5 and 10 mg are heated from −80 to 180° C. at a rate of 10° C./min (first heating), held at 190° C. for 3 min, cooled to −80° C. at 10° C./min, held at −80° C. for 3 min, and reheated from −80° C. to 180° C. at 10° C./min (second heating). The crystallinity (wt %) is calculated from the second heating using a heat of fusion of 290 J/g for the polyethylene crystal. Contributing effects of the crystallinity include decrease volume fraction of the amorphous phase, restricted mobility of the amorphous chain segments by the crystalline domains, and higher styrene content of the amorphous phase due to segregation of styrene into the amorphous phase. Table I of this paper shows values of Total Styrene (wt %), aPS (wt %), Styrene (wt %), Styrene (mol %), $10^{-3}$ Mw, Mw/Mn, and Talc (wt %) for Ethylene-styrene copolymers ES16-ES74 while FIGS. 1–12 of this paper shows: (1) melting thermograms of ESI 1st and 2nd heating for ES16, ES27, ES44, ES53, ES63, & ES74; (2) crystallinity from DSC as a function of conmonomer content; (3)Logarithmic plot of the DSC heat of melting vs. Mole % ethylene for ESIs; (4) measured density as a function of styrene content for semicrystalline and amorphous ESIs; (5) % crystallinity from density vs % crystallinity from DSC melting enthalpy; (6) Dynamic mechanical relaxation behavior; (7) Glass transition temperature as a function of wt % ethylene-styrene dyads for semicrystalline and amorphous ESIs; (8) Arrhenius plots of the loss tangent peak temperature for representative semicrystalline and amorphous ESIs; (9) Draw ratio vs engineering strain; (10) Engineering stress-strain curves at 3 strain rates for ES27, ES63 and ES74; (11) Engineering stress-strain curves of ESIs; (12) Classification scheme of ESIs based on composition. (20) U.S. Pat. No. 5,872,201 describes interpolymers: terpolymers of ethylene/styrene/propylene, ethylene/styrene/4-methyl-1-pentene, ethylene/styrene/hexend-1, ethylene/styrene/octene-1, and ethylene/styrene/norbornene with number average molecular weight (Mn) of from 1,000 to 500,000. (21–24) U.S. Pat. Nos. 5,460,818; 5,244,996; EP 415815A; JP07,278,230 describes substantially random, more appropriately presudo-ramdom copolymers (interpolymers), methods of making and their uses. (25) Alizadeh, et al., find the styrene interpolymers impedes the crystallization of shorter ethylene crystallizable sequences and that two distinct morphological features (lamellae and fringe micellar or clain clusters) are observed in ethylene/styrene (3.4 mol %) as lamella crystals organized in stacks coexisting with interlamellar bridge-like structures. (26) Guest, et al., describes ethylene-styrene copolymers having less than about 45 wt % copolymer styrene being semicrystalline, as evidenced by a melting endotherm in DSC testing (Dupont DSC-901,10° C./min) data from the second heating curve. Crystallization decreases with increasing styrene content. Based on steric hindrance, styrene unit is excluded from the crystalline region of the copolymers. Transition from semi-crystalline to amorphous solid-state occurs at about 45 to 50 wt % styrene. At low styrene contents (<40%), the copolymers exhibit a relatively well-defined melting process. FIGS. 1–5 of this paper shows (a) DSC data in the T range associated with the melting transition for a range of ESI differing primarily in copolymer styrene content, (b) variation in percent crystallinity (DSC) for ESI as a function of copolymer S content, (c) elastic modulus versus T for selected ESI differing in S content, (d) loss modulus versus T for selected ESI differing in S content, (e) Tensile stress/strain behavior of ESI differing in S content, respectively. (35) Hoening, et al, teaches preparation of interpolymers ESI #1 to #38 having number average molecular weight (Mn) greater than about 1000, from about 5,000 to about 500,000, more specifically from about 10,000 to about 300,000.

(36) J. C. Randall, "A Review of High Resolution Liquid 13 Carbon Nuclear Magnetic Resonance Characterizations of Ethylene-Based Polymers" JMS-Review Macromol. Chem. Phys., C29 (2 & 3), 201–317 (1989).

The migration of additives from within the bulk gel to the gel's surface is generally due to gradients of pressure or temperature, weak, moderate, or strong molecular dipo/dipo or dipo/non-dipo interactions within the gel. Once the additives are transported from within the gel to the surface forming an "additive layer". Stearic acid and other additives such as certain organic crystals will melt upon heating and reform into crystals within the gel and may bloom to the gel surface as described in my U.S. Pat. No. 6,420,475. Selected substances blended into a gel will eventually find its way from the interior of the bulk gel to its surface by means of migration due to gradient transport (bloom to the surface with time depending on the nature of the added substances). I have found that food for animal consumption can be blended with the gelatinous elastomer compositions of the present invention and render such "food gels" useful for simulated food and animal uses.

The gelatinous elastomer compositions of the present invention will be referred to herein as "invention food gel(s)", "tear resistant food gels", "rupture resistant food gels", or more simply refer to as "the food gel(s)", "said food gel(s)", or the "gel(s)"

Also, the invention gel can be compounded with, "of all things" dry food to great advantage (invention food-gels). For example, it can be observed that fine dry powders of foods when incorporated into the molten gel, then cooled, and with time will be push out from the gel's interior to the outer surface. The find dry food powders can erupt or emerge from the surface of the gel. This has the advantage that food and components of foods (such as amino acids, proteins, lipids, minerals, vitamins, sugars, and the like) all can be incorporated into molten or liquid gel compositions to advantage and use for artificial food or bait (animal bait, insect bait, simulated food) without sacrificing to a great extend the elastic properties of the gel. All sorts of foods, foods for carnivore, herbivore, or omnivore can also be incorporated into the food gels of the invention (in such suitable form as dry particles, flakes, powders, crumbs, and the like).

In the case of fish, fish like to eat fish which provides the preditor with all the composition a fish would need for mainating fish muscle, fats so that it can be ready to eat more fish. It is a eating machine which lives in water.

Aside from water, fish is mostly fat and protein. The amount of protein in fish muscle is usually somewhere between 15 and 20 percent, but values lower than 15 percent or as high as 28 percent are occasionally met with in some species.

All proteins, including those from fish, are chains of amino acids. Two essential amino acids called lysine and methionine are generally found in high concentrations in fish proteins.

Taking all species into account, the fat content of fish can vary very much more widely than the water, protein or mineral content. Whilst the ratio of the highest to the lowest value of protein or water content encountered is not more than three to one, the ratio between highest and lowest fat values is more than 300 to one.

The term fat is used herein for simplicity, although the less familiar term lipid is more correct, since it includes fats, oils and waxes as well as more complex, naturally-occurring compounds of fatty acids.

There is usually considerable seasonal variation in the fat content of fatty fish; for example a starved herring may have as little as ½ percent fat, whereas one that has been feeding heavily to replenish tissue may have a fat content of over 20 percent. Sardines, sprats and mackerel also exhibit this seasonal variation in fat content. As the fat content rises, so the water content falls, and vice versa; the sum of water and fat in a fatty fish is fairly constant at about 80 percent. Although protein content falls very slightly when the fat content falls, it nevertheless remains fairly constant, somewhere between 15 and 18 percent.

The fat is not always uniformly distributed throughout the flesh of a fatty fish. For example in Pacific salmon there may be nearly twice as much fat in muscle from around the head as there is in the tail muscle.

The amount of carbohydrate in white fish muscle is generally too small to be of any significance. In white fish the amount is usually less than 1 percent, but in the dark muscle of some fatty species it may occasionally be up to 2 percent. Some molluscs, however, contain up to 5 percent of the carbohydrate glycogen.

In general the vitamin content of white fish muscle is similar to that of lean meat.

The most important extractives in fish include sugars, free amino acids, that is free in the sense that they are not bound in the protein structure, and nitrogenous bases, which are substances chemically related to ammonia. While many of these extractives contribute generally to the flavour of fish, some of them, known as volatiles, contribute directly to the flavours and odours characteristic of particular species; as the name suggests, volatiles are given off from the fish as vapours. Most of the extractives are present at very low concentrations.

The composition of a particular species often appears to vary from one fishing ground to another, and from season to season, but the basic causes of change in composition are usually variation in the amount and quality of food that the fish eats and the amount of movement it makes. For example, fish usually stop feeding before they spawn, and draw on their reserves of fat and protein. Again, when fish are overcrowded, there may not be enough food to go round; intake will be low and composition will change accordingly. Reduction in a basic food resource, plankton for example, can affect the whole food chain.

The amount of minerals in fish flesh on the other hand is comparatively small as compared to fats and proteins. On average, the amount of elements are 1 mg/100 g of flesh: sodium 72, potassium 278, calcium 792, magnesium 38, phosphorus 190, sulphur 191, iron 1.55, chlorine 197, silicon 4, manganese 0.823, zinc 0.96, copper 0.20, arsenic 0.37, iodine 0.15.

No one has ever had a two way conversation with a fish and found out what a fish perfers to eat. Observation can show that fish like fats and proteins as opposed to disolved minerials such as salts of sodium, potassium, calcium, magnesium, and the like which mostly are from rocks and formations in and surrounding the body of water. Although there may be reports that salt water fish may be attracted to the delta where salt concentration can be lower and fresh water fish may be attracted to higher concentrations of salts, swimming fishes are more likely to be anywhere there is food. When an object looks like food, acts like food, in one form or another and give off the odor of fats and protein, a fish is most likely to strike and retain fats longer than protein and when fat odor looking food and protein odor looking foods are presented, it is unlikely it will pass for anything less presenting in the water.

By experience, humans have been feeding fish to eventually have the fish to eat or sell for food or maintain the fish in good health as pets for long long time. Some of the fish food have guaranteed analysis of crude protein: not less than 55.0%, crude fiber: not more than 4.0%, crude fat: not less than 10.0%, crude ash: not more than 17.0%.

With respect ot components (IV), (V), (VI), (VII), and (VIII), the following fish foods and components can be heat dried or freezed dried and compounded with the gels of the invention: wheat, fish meal, soybean meal, blood meal, hydrolyzed feather meal, stabilized fish oil, capsanthin (red), spirulina (blue-green), xanthophyll (yellow), krill meal, dicalcium phosphate, vitamin a acetate, d-activated animal sterol (d3), vitamin b-12 supplement, riboflavin supplement, niacin, folic acid, calcium pantothenate, pyridoxine hydrochloride, thiamin, biotin, d1 alphatocopherol (e), 1-ascorbyl-20 polyphosphate (c), choline chloride, cobalt sulfate, ferrous sulfate, manganese sulfate, copper sulfate, ethylendiamine dihydroiodide, ethoxyquin (anti-oxidant). Added mineral matter not more than 2.50%. Fish meal, euphausiacea meal, yeast, gluten, casein, squid oil, shrimp meal, rice bran, spawn powder, lecithin, choline chloride, calcium phosphate, squid soluble, alfalfa meal, 1-lysine, inositol, methionine, vitamin c supplement, niacin, vitamin e supplement, p-aminobenzoic acid, biotin, calcium pantothenate, riboflavin, vitamin a supplement, vitamin b12 supplement, acetonmeaphthon, thiamine mononitrate, pyridoxine hydrochloride, folic acid, vitamin d3 supplement, calcium lactate, potassium phosphate, sodium phosphate, magnesium sulfate, ferric citrate, zinc sulfate, cobaltous carbonate, manganese sulfate, potassium iodide, aluminum hydroxide, cupric sulfate. Shrimp meal, cuttlefish meal, wheat flour, brewer's dried yeast, rice meal, spirulina, protease, thiamine, riboflavin supplement, pyridoxine hydrochloride, vitamin a supplement, ascorbic acid, vitamin b12 supplement, biotin, calcium pantothenate, choline chloride, d activated animal sterol (source of vitamin d3), folic acid, menadione sodium bisulfate (source of vitamin k activity), inositol, para-aminobenzoic acid, zinc oxide, manganous oxide, salt, ferrous chloride, copper sulfate, cobalt sulfate, aluminum sulfate, magnesium sulfate. Anchovey fish, whole wheat, wheat germ, alfalfa, gluten protein, soy meal, spirulina, hydrolyzed protein meal, marine fish oil, minerals including zinc sulfate, manganese sulfate, copper sulfate, potassium sorbate, di-calcium phosphate; vitamins including c (stabalized), a, d, e, k, b1, b2, b6, choline (chloride), niacin, biotin, folic acid, b12, additional carotenoids including: a-xan, cantha xan, xan-yellow, all essential amino acids. Shrimp meal, herring meal, wheat flour, krill meal, soybean meal, fish oil, canthazantin, vitamin supplement, minerals, copper sulfate, ferrous sulfate, manganese sulfate, potassium iodide, zinc sulfate, sodium chloride, ethoxyquin, bunch of vitamins. Wheat starch, fish meal, screened cracked corn, cracklings, dried potato products, soybean oil, shrimp meal, torula dried yeast, wheat germ meal, monobasic calcium phosphate, algae meal, lecithin, artificial colour, ethoxyquin as preservative. Fish and fish derivatives, cereals, yeasts, molluscs and crustaceans, vegetable protein extracts, oils and fats, algae, various sugars. Contains eec permitted colourants and preservative. Wheat starch, screened cracked corn, feedingoat meal, fish meal, dehulled soybean meal, algae meal, dehydrated alfalfa meal, monobasic calcium phosphate, fish oil, soybean oil, 1-ascorbyl-2-polyphosphate (vitamin c), artificial colors inclding yellow 5, ethoxyquin asa-preservative. Spirulina, soy protein concentratte, wheat germ, dehydrated alfalfa, whole wheat, wheat gluten, oats, corn gluten meal, brewer's dried yeast, rice flour, pea protein, wheat starch, zucchini, aniseed, soybean oil, spinach, choline chloride, vitamin a supplement, vitamin 3d supplement, vitamin e supplement, vitamin b12 suplement, riboflavin, niacin, calcium pantothenate, menadione sodium bisulfate (soure of vitamin k) folic acid, pyridoxine hci, thiamine mononitrate, biotin, ethoxyquin tetra sundried baby shrimp, dried baby freshwater shrimps. Asian tubifex worms. Bloodworms 5.02%, shrimp 9.50%, veg diet crude fat 0.50% blood worms 0.24% shrimp 1.00% veg diet crude fiber 1.00%, bloodworms 0.29% shrimp 0.2%, dry bloodworms 95% shrimp 88% bloodworms, brine shrimp, vegetable diet (squash, romaine, spinach and vitamins). Chicken meal, turkey meal, brown rice, white rice, lamb meal, chicken fat, (preserved with mixed tocopherols and ascorbic acid), menhaden fish meal, flax seed, sun cured alfalfa meal, sunflower oil, lecithin, brewers yeast, natural flavors, monosodium phosphate, choline, linoleic acid, rosemary extract, sage extract, ferrous sulfate, mixed tocopherols (source of vitamin e) zinc oxide, sodium selenite, manganous oxide, riboflavin supplement (source of B2), yeast culture, dried *aspergillus niger* fermentation extract, dried *aspergillus oryzae* fermentation extract, dried lactobacillus acidophilus fermentation product, dried *streptococcus faecium* fermentation product, zinc amino acid chelate, manganese amino acid chelate, copper amino acid chelate, cobalt amino acid chelate, iron amino acid chelate, niacin, vitamin b12 supplement, vitamin a supplement, calcium pantothenate, d-biotin supplement, pyridoxine hydrochloride (vitamin b6), calcium, iodate, thiamine mononitrate, folic acid, papain, *bacillus subtilis, aspergillus niger, yucca schidigera* extract white fish meal, brewer'S yeast, soy flour, wheat flour, oat flour, gluten, frozen or dried brine shrimp, plankton, shrimp, krill powder mix, dried spirulina, dried kelp, fish oil, double-stabilized vitamin c, lecithin, vit. A, vit. D-3, vit. Bi, vit. B12, biotin, some coloring, no preservatives. White fish meal and protein concentrate, oat, wheat and soy flours, gluten, torula yeast, frozen or dried brine shrimp, egg and egg protein, shrimp meal, krill powder mix, dried kelp and kelp meal, fish oil, plankton meal, sun-dried vegetables concentrate, mixed vitamin and mineral booster, lecithin, dried spirulina, methionine, double-stabilized vit. C, calcium carbonate, dl calcium pantothenate, niacin, d-biotin, riboflavin, thiamin, mms bisulfate blood-booster complex, pyrodoxine hydrochloride, vit. A acetate, folic acid, vit. D3, riboflavin, vit. E, choline, vit. B12, vit. B1, vit. B complex, some coloring, no preservatives. Fish meal, wheat flour, fish protein concentrate, corn gluten meal, wheat gluten, soy protein concentrate, shrimp meal, brewers dried yeast, fish oil, wheat germ meal, dehydrated alfalfa meal, soy protein isolate, crab meal, phaffia yeast, lecithin, spray-dried krill digest, paprika extract, spirulina, steamed rolled oats, marigold petal extract, natural flavor, pea protein isolate, rice flour, algae meal, crayfish extract in soybean oil, soybean oil (preserved with tbhq), potato starch, 1-ascorbyl-2-polyphosphate, vitamin premix containing (wheat middlings, vitamin a supplement, vitamin d3 supplement, vitamin e supplement, vitamin b12 supplement, riboflavin supplement, niacin supplement, calcium pantothenate, menadione sodium bisulfite complex, folic acid, pyridoxine HCL, thiamine mononitrate, d-biotin), xanthan gum, betaine, choline chloride, carrot oleoresin, zucchini, anise seed, spinach, lignin sulfonate, ethoxyquin (used as a preservative). Fish meal, wheat flour, fish protein concentrate, corn gluten meal, wheat gluten, soy protein concentrate, shrimp meal, brewers dried yeast, fish oil, wheat germ meal, dehydrated alfalfa meal, soy protein isolate, crab meal, phaffia yeast, lecithin, spray-dried krill digest, paprika extract, spirulina, steamed rolled oats, marigold petal extract, natural flavor, pea protein isolate, rice flour, algae meal, crayfish extract in soybean oil, soybean oil (preserved with tbhq), potato starch, 1-ascorbyl-2-polyphosphate, vitamin premix containing (wheat middlings, vitamin a supplement, vitamin d3 supplement, vitamin e supplement, vitamin b12 supplement, riboflavin supplement, niacin supplement, calcium pantothenate, menadione sodium bisulfite complex, folic acid, pyridoxine hcl, thiamine mononitrate, d-biotin), xanthan gum, betaine, choline chloride, carrot oleoresin, zucchini, anise seed, spinach, lignin sulfonate, ethoxyquin (used as a preservative). Vitamin, mineral mix may include: dicalcium phosphate, d1-methionine, canthaxanthin, ascorbyl polyphosphate (vitamin c, a natural preservative), biotin, choline chloride, inositol, calcium pantothenate, pyrodioxine hydrochloride, riboflavin, thiamin mononitrate, cyanocobalamin (vitamin B12), vitamin a acetate, cholecalciferol (vitamin D3), tocopherol acetate (vitamin e, a natural preservative), menadione (vitamin k), salt, magnesium oxide, zinc oxide, ferric oxide, ferrous sulfate, manganous oxide, copper sulfate, cobalt carbonate, iodine, selenium.

Of course, these store available fish foods although can be reduced to fine powder and compounded with the gel invention to form the food gels and use as simulated food, it makes more sense that since fish do not need and have little or no use for starch and fiber, these do not need to be included. Certainly, it is easier to obtain rediely available fish food off the self and compound it with the gel to make simulated food.

On the other hand, animal feed may include starch and fibers such as: alfalfa meal, animal digest, animal fat, barley, barley flour, beef (meat), beet pulp ("beet pulp, dried molasses" and "beet pulp, dried, plain"), brewer's rice, brown rice, carrots, chicken, chicken by-product meal, chicken liver meal, chicken meal, corn, corn bran, corn germ meal (dry milled), corn gluten, corn gluten meal, corn syrup, cracked pearl barley, dehydrated eggs, digest of beef, digest of beef by-products, digest of poultry by-products, dried animal digest, dried kelp, dried milk protein, dried reduced lactose whey, dried whey, feeding oatmeal, fish meal, ground corn (ground ear corn), ground dehulled oats, ground wheat, ground whole brown rice (ground brown rice), ground whole wheat, ground yellow corn, kibbled corn, lamb bone meal, lamb digest, lamb fat, lamb meal, linseed meal, soybean meal, grain sorghum, grass sorghums, sweet sorghums, broomcorn, cereal food fines, flaxseed, mesquite bean meal, oatmeal, meats and meat by-products from cattle, swine, sheep or goats, rendered meal made from animal tissue, include lungs, kidneys, brain, spleen, liver, bone, blood, partially defatted low-temperature fatty tissue, stomach, and intestines freed of their contents, poultry by-product: such as heart, lungs, liver, kidneys, feet, abdomen, intestines, and heads, dehydrated eggs, beef tallow, fruits and veggies such as: turnip greens, tomatoes, peas and carrots, oranges, grapefruit, beet pulp, biotin, dried whey, probiotics and probiotics, peanut hulls, dried kelp or dried seaweed, ginkgo biloba, glucosamine, lecithin, blue-green algae, olive oil, shark cartilage.

Foods in what ever suitable form, solid particles, such as, finely crushed, milled, dry, dehydrated, or milled freezed dried foods (dry fish meal, dry insect meal, dry plant meal, dry animal meal, dry seafood meal, dry fish bone meal, dry animal bone meal, dry corn meal, dry cereal meal, dry grain meal, dry oat meal) in the form of fine particles or powders and components of such dry foods (protein, crude protein, true protein), amino acids in powder form or milled from tablets into powder and compounded into the gels of the invention (found in fish, milk, beef, eggs) including Alanine (Ala), Arginine (Arg), Asparagine (Asn), Aspartic Acid (Asp), Cysteine (Cys), Glutamic Acid (Glu), Glutamine (Gln), Glycine (Gly), Histidine (His), Isoleucine (Ile), Leucine (Leu), Lysine (Lys), Methionine (Met), Phenylalanine (Phe), Proline (Pro), Serine (Ser), Threonine (Thr), Tryptophan (Trp), Tyrosine (Tyr), Valine (Val), structural proteins (actin, myosin, tropormyosin, and actomyosin), protamines, sacroplasmic proteins (myoalbumin, globulin and enzymes), trimethylamine oxide and its decomposition products, lipids, structural lipids, (aphospholipid, phospholipids, triglycerides, fats, depot fat, wax esters, oils, cholesterol, phosphatidyl-choline, phosphatidyl-ethanoiamine, phosphatidylserine, waxes and fatty acids, long-chain fatty acids, linoleic, linolenic acid, eicosapentaenoic acid), myoglobin, carbohydrates (sugars, sugar phosphates and glycoy, minerals, calcium, phosphorus, iron, copper, selenium, iodine), vitamins (A, D, E & K, thiamine, riboflavin, niacin, pantothenic acid), free amino acids, nitrogenous bases, food seasonings (salts, MSG, sugars, peppers, and the like), carotenoid, food colorings, collagen, can be incorporated into the invention clear gel and invention food-gels and use to advantage as simulated food and animal bait. The blending of the foods (food preparations, components of foods, food flavorings, food seasonings, and the like) into the invention food gels is performed during liquid solvent room temperature or molten elevated temperature blending. Such incorporated powder foods will with time gradually migrate out from the interior bulk of the gel articles unto its outer surface. Under 10×, 30×, 100× illuminated microscope, the emerging protein, wax, fatty acids, and food particles, can be seen appearing on the gel article surface as a function of time. Speculative theory is that this is attributed to the internal pressure of the gel forcing the incompatible materials out from the interior where pressure or gradient is greatest resulting in greater and greater gel volume equilibrium. By cutting the gel, it can be readily observed after cooling and with sufficient time (with passing days, weeks, months, and possibly years) more and more defined separation or stratification of the food components within the interior of the gel towards the outer surfaces of the gel article.

Since, the composition of foods are difficult to quantify and too complex to determine on an element by element, substance by substance, or molecule by molecule bases, herein food for simplicity is described in terms of and by proximate analysis of the composition of the foods. Food composition as a whole described in terms of classes of substances present is referred to as proximate composition by the process of proximate analysis rather than as individual proteins or specific minerals. Proximate does not refer to accuracy, it does not mean either exact or approximate. All additives incorporated into the gel are parts by weight relative to 100 parts by weight of the base block copolymer (I). Other terms are sometimes used for the class of substance, such as moisture instead of water, oil or lipid instead of fat, ash instead of minerals. By food, the gel food compositions of this invention comprises the defined and claimed polymer oil gels and foods in the general class of natural food stuff which are beneficial to the health and well being of plant and animal life (including all biological matter, basic meats, plants, and microbiological molds, fungus, bacteria, alga), and components of such food stuff derived from Nature (from the air, land and oceans, in man made biological cultures) that can now and in the future be found to be edible by animal and provide nutrients to plant life on this Earth.

By means of freeze-drying (lyophilization), many kinds of biological matter (including all foods cooked and uncooked foods) can be preserved without damage or changes in quality or viability for extended periods. In the freeze-drying process, the water contained in the biological structure is frozen; the ice is then removed by sublimation (turning directly into vapor without passing through the liquid stage). By this method the twin advantages of freezing and drying are combined into one favorable means of preservation. Adequately packaged, the resulting product can be kept for years at room temperature.

Freeze-drying can be applied to non-living matter such as blood plasma, serum, hormone solutions, pharmaceutical products and food. Special matter for surgical transplants such as arteries, skin and bone. Live cells intended to be kept alive for long periods of time. This category includes bacteria, viruses and yeast but not mammalian cells.

For Freeze-drying, the product to be treated is placed in a chamber in which vacuum is rapidly produced. As pressure in the chamber drops, temperature also drops and the water contained in the product freezes. Next, still under vacuum, the product is heated and ice sublimation occurs. The vacuum and heating temperature involved in the process vary according to the product.

In freeze-drying works extremely well on all types of organic foods, including meat, vegetables, fruits such as apples, bacteria, fungus, alga, seaweeds, grass, and the like. Ice cream and coffee can also be freeze-dried. The gels of the invention can be made to contain foods for animal or human consumption to advantage. It can be use as animal bait by incorporating dry chicken liver or beef liver to attract animals for capture and medical treatment. After use, the bait can be cleaned are re-used. It can be made with different foods, texture, and chewable portions for human consumption. As edible substitute foods in combination with or without real foods for human consumption, it has the flavor and taste of real food and can be chewed and ingested. It fills up the stomach and pass through the body and digestive tract intact and inert as chewing gum does. Such human substituted foods can be used by medical doctors to treat sever cases of obesity that may not be treatable by any other methods.

Freeze dried foods when blended with the gel compositions of the invention can be a tasty treat, for example, chicken a la king: cooked chicken, mushrooms, pimientos, green peppers, nonfat dry milk, celery, corn oil and spice extract, wheat flour, salt, chicken base (chicken including natural chicken juices maltodextrin (from corn), hydrolyzed corn gluten, dried whey, onion powder and natural flavorings, autolyzed yeast extract, turmeric), sugar, modified cornstarch, flavorings (hydrolyzed wheat gluten, partially hydrogenated soybean and cottonseed oil, autolyzed yeast extract, lactic acid and bonito fish extract), chicken fat, onion powder, spices. Noodles: Precooked noodles (semolina, egg yolk, salt). Beef Stroganoff with Noodles: Noodles, beef, sour cream, mushrooms, modified cornstarch, corn oil, nonfat dry milk, dehydrated onions, hydrolyzed vegetable protein (soybean and wheat), salt, monosodium glutamate (a flavor enhancer), spice, malic acid, garlic powder, caramel color. Chicken Teriyaki with Rice: Cooked chicken meat, soy sauce (wheat, soybeans, salt), brown sugar, bamboo shoots, mushrooms, red peppers, green peas, modified cornstarch, sherry wine, onions, green peppers, garlic powder, spice, salt. Rice: Precooked rice. Beef Teriyaki with Rice: Cooked beef, soy sauce (wheat, soybeans, salt), red peppers, pineapple in light syrup, water chestnuts, brown sugar, mushrooms, modified corn-starch, sherry wine, onions, pea pods, onion powder, peanuts, sesame/soybean oil, flavor enhancer (hydrolyzed wheat gluten, partially hydrogenated soybean and cottonseed oil, autolyzed yeast extract, lactic acid, bonito fish extract), garlic powder, spices, salt. Rice: Precooked rice. Turkey Tetrazzini: Cooked turkey meat, asparagus, modified cornstarch, nonfat dry milk, pimientos, mushrooms, corn oil, and spice extract, salt, sugar, chicken base (chicken including natural chicken juices, chicken fat, maltodextrin (from corn), hydrolyzed corn gluten, dried whey, onion powder and natural flavorings, autolyzed yeast extract), flavorings (hydrolyzed wheat gluten, partially hydrogenated soybean and cottonseed oil, autolyzed yeast extract, lactic acid and bonito fish extract), hydrolyzed corn soy wheat gluten protein and partially hydrogenated soybean oil, chicken fat, dehydrated onions, spices, garlic powder and turmeric. Noodles: Precooked noodles (semolina, egg yolk, salt). Chicken Stew: Potatoes, cooked chicken meat, carrots, peas, corn oil and spice extract, nonfat dry milk, modified cornstarch, salt, hydrolyzed vegetable protein (hydrolyzed corn soy wheat gluten protein, partially hydrogenated soybean oil), dehydrated onions, chicken fat, sugar, monosodium glutamate (a flavor enhancer), spices and garlic powder. Rice and Chicken: Instant rice, cooked chicken, corn oil, pimientos, salt, modified cornstarch, hydrolyzed vegetable protein, monosodium glutamate (a flavor enhancer), chicken fat, sugar, onion powder, spices and turmeric. Spaghetti with Meat and Sauce: Spaghetti, tomato paste, beef, salt, textured soy flour (caramel colored), sugar, dehydrated cheese (cheddar cheese, cream, salt, sodium phosphate, lactic acid), hydrolyzed vegetable protein, spices, onion powder, monosodium glutamate (a flavor enhancer), and garlic powder. Hearty Vegetable Stew with Beef: Potatoes, peas, cooked beef, carrots, corn, corn oil and spice extract, modified cornstarch, hydrolyzed vegetable protein (hydrolyzed corn torula, brewers yeast, wheat gluten, soy protein), dehydrated onions, salt, monosodium glutamate (a flavor enhancer), sugar, spices, garlic powder. Chili Sauce with Beans and Beef: Kidney beans, cooked beef (salt), seasoning mix (comprised of chili pepper, spices, salt, dehydrated onion and garlic, hydrolyzed soybean protein, beef extract, sugar, paprika, partially hydrogenated soybean and/or cottonseed oil, monosodium glutamate, autolyzed yeast, caramel color, spice extractives, disodium inosinate, disodium guanylate), modified cornstarch, tomato powder, dehydrated onions, corn oil, spice extract. Lasagna with Meat and Sauce: Tomatoes, beef, tomato paste, enriched noodles (semolina, whole egg solids, ferrous sulfate, niacinamide, thiamine mononitrate, riboflavin), mozzarella cheese flavoring (whole milk, mozzarella cheese (cultured milk, salt, enzymes), calcium caseinate, corn oil, partially hydrogenated soybean oil, sodium caseinate, salt, natural & artificial flavors, maltodextrin, sodium aluminum phosphate), dehydrated onions, dehydrated parmesan and romano (made from cow's milk) cheeses (part-skim milk, cheese culture, salt, enzymes), modified corn starch, salt, sugar, spices, garlic powder, parsley flakes, annatto, turmeric. Chili Mac with Beef: Beef, enriched macaroni (wheat flour, niacin, ferrous sulfate, thiamine mononitrate and riboflavin), kidney beans, tomato paste, seasoning mix (comprised of chili pepper, spices, salt, dehydrated onion and garlic, hydrolyzed soybean protein, beef extract, sugar, paprika, partially hydrogenated soybean and/or cottonseed oil, monosodium glutamate, autolyzed yeast, caramel color, spice extractives, disodium inosinate, disodium guanylate), modified cornstarch, dehydrated onions, annatto, turmeric.

Sweet and Sour Pork with Rice: Pork, pineapple in light syrup, green peppers, vinegar, onions, red peppers, brown sugar, sugar, modified cornstarch, chicken base (chicken including natural chicken juices, salt, chicken fat, sugar, maltodextrin, hydrolyzed corn gluten, dried whey, onion powder and natural flavorings, autolyzed yeast extract, turmeric), Worcestershire sauce (soy, garlic, anchovies, tamarind, distilled vinegar, corn syrup, sugar, salt, spices, flavoring), soy sauce (wheat, soybeans, salt), corn oil, salt, sesame oil and soybean oil, flavor enhancer (hydrolyzed wheat gluten, partially hydrogenated soybean and cottonseed oil, autolyzed yeast extract, lactic acid, bonito fish extract), garlic powder, spice. Rice: Precooked rice. Oriental-Style Spicy Chicken & Vegetables w/Rice: Cooked chicken, soy sauce powder (soy sauce, maltodextrin), peanuts, modified cornstarch, water chestnuts, green beans, teriyaki flavor (sugar, salt, hydrolyzed corn protein, yeast extract, citric acid, sodium lactate, partially hydrogenated cottonseed and soybean oil, monosodium glutamate), brown sugar, mushrooms, red bell peppers, natural flavor enhancer (torula yeast, natural flavor), flavor blend (autolyzed yeast extract, corn syrup solids, citric acid, natural flavor), garlic powder, salt, sesame oil with cottonseed or soybean oil, spices, corn oil and spice extract. Rice: Precooked rice. Uncooked Beef Patties (Currently unavailable) 100% beef. A minimum of 30 patties per can. Chili con Carne with Beans: Beef, beans, tomatoes, seasoning mix (processed from chili pepper, spices, salt, dehydrated onion and garlic, hydrolyzed soy protein, beef extract, sugar, paprika, partially hydrogenated soybean and/or cottonseed oil, monosodium glutamate, caramel color, spice extractives, disodium inosinate, disodium guanylate), tomato paste. Scrambled Eggs with Real Bacon: Whole eggs, crumbled bacon (cured with water, salt, sugar, sodium erythorbate, sodium nitrite; may also contain sodium phosphate, hydrolyzed soybean protein, monosodium glutamate, smoke flavor, BHA), egg yolk, nonfat dry milk, modified cornstarch, corn oil, salt, monosodium glutamate, smoke flavoring and xanthan gum. Beef Sausage Patties: Beef, salt, spices, dried pork stock, corn syrup, dextrose, pork flavor (contains modified food starch, corn syrup solids, hydrolyzed plant protein, autolyzed yeast extract, dried soy sauce, dried egg yolks, natural flavor), roast flavor (contains autolyzed yeast extract, hydrolyzed plant protein, partially hydrogenated vegetable oil, bonito fish extract), and autolyzed yeast. Cheese Omelette: Whole eggs, nonfat dry milk, American cheese (American cheese (milk, cheese culture, salt, enzymes), sodium phosphate, milkfat, salt, artificial color), dehydrated cheddar cheese blend (cheddar cheese (milk, cheese culture, salt, enzymes, artificial color), cream, salt, sodium phosphate, lactic acid, Yellow #5, Yellow #6), salt, onion powder, spice. Granola with Blueberries and Milk: Granola (rolled oats, brown sugar, soy oil, unsweetened coconut, sesame seeds, wheat germ, natural vanilla flavor), nonfat dry milk, freeze dried blueberries, cream powder (sweet cream, lecithin, tocopherols and ascorbyl palmitate), vanilla powder (sugar, cornstarch, dextrose and natural and artificial vanilla flavors). Garden Green Peas: 100% sweet garden peas. Golden Sweet Whole Kernel Corn: 100% sweet whole kernel corn. Nut-Chocolate LURPS: Candy coated chocolates (containing milk chocolate, sugar, cocoa butter, whole milk powder, chocolate liquor, lecithin added as an emulsifier, salt, vanillin (an artificial flavor), sugar, corn syrup, artificial colors, includes FD&C Yellows #5 and #6, dextrin), roasted cashews, salted peanuts. Strawberry Fruit Crisps: Strawberries (cut and formed), sugar.

The fundamental process steps are freezing the product. This provides a necessary condition for low temperature drying. After freezing, the product is placed under vacuum. This enables the frozen solvent in the product to vaporize without passing through the liquid phase, a process known as sublimation. Heat is applied to the frozen product to accelerate sublimation. Low-temperature condenser plates remove the vaporized solvent from the vacuum chamber by converting it back to a solid. The resultant food products can be ground or milled into smaller and smaller particles and powders. The amount of food incorporated into the gel based on 100 parts by weight of the base polymer can be in minor or major amounts. Minor amounts mean about 50 or less parts by weight of food per 100 parts by weight of the base polymer and major amounts means greater that 50 parts by weight of food per 100 parts by weight of the base polymer. Minor amounts of food per 100 parts by weight of the base polymer can range from about 49.999 to about 0.01, for example about 49, 48, 47, 46, 45, 44, 43, 42, 41, 40, 39, 38, 37, 36, 35, 34, 33, 32, 31, 30, 29, and stepwise decreasing by 1 to about 1, or from about 49.99, 49.98, 49.87, and stepwise decreasing by 0.01 to about 0.01. All amounts in the ranges between about 49.999 to less than about 1.0 may be suitable for use in the gel food compositions of the invention. Likewise, all major amounts of food per 100 parts by weight of the base polymer can range from about 50 to about greater than 500 parts by weight, for example about 50, 51, 52, 53, 54, 55 stepwise increasing by about 1 to about 500 parts by weight, or stepwise increasing from about 50 by about 0.01 to greater than about 499.99 may be suitable for use in the gel food compositions of the invention.

Key benefits of freeze drying include retention of morphological, biochemical, and immunological properties, high viability/activity levels, lower temperature, oxygen, and shear conditions versus other drying methods, high recovery of volatiles, retention of structure, surface area, and stoichiometric ratios.

Freezed-dry foods can be ground, or powdered to exact specifications including, meats (beef, lamb, chicken, pork ham, turkey, fish, shell fish), vegetables (asparagus, green beans, spinach, broccoli, green peas, yellow beans, corn, italian beans), fruits apples, pineapple, blackberries, raspberries blueberries, strawberries other (cheese, milk, eggs), frozen/freeze dried fish food, egg yolk, live foods, brine shrimp, worms, fish, brine shrimp and daphnia. The worm category includes blood worms, tubifex, and earthworms and several others.

As a consequence, the invention food gel simulated foods are a boon to the angler giving him a success hook to catch ratio of at least greater than 5 in side by side fishing with a conventional plastisol PVC bait. Thereby, increasing his catch per unit of effort, increasing his fishing effectiveness, minimizing his fishing effort of presentation and maximizing his success.

The invention food gels can be made to exhibit sufficient low Gram Tack to be noticeable non-tacky to the touch of the fingers of a typical human hand at 23° C. A simple way to accurately measure the non tacky feeling as sensed by the fingers is to drop a reference gel sample having a cylindrical shape of about 1.0 cm diameter and 1.0 cm in length a distance of 10 cm on to the surface of a polystyrene petri dish having a diameter of 10 cm inclined at 45°. The reference gel sample is considered non tacky if it (1) "bounce at least twice before coming to rest", (2) "bounce off", (3) "bounce and then rolls off", or (4) "rolls off" on striking the polystyrene surface. If none of (1) thru (4) is observed, then the level of Gram Tack can be determined by the gel sample method above.

The invention food gel composition comprises at least one high viscosity linear multiblock copolymers and star-shaped (or radial) multiblock copolymers. The invention food gel compositions copolymer (I) comprises 100 parts by weight of one or a mixture of two or more of a thermoplastic elastomer block copolymers including hydrogenated styrene isoprene/butadiene block copolymer(s) and/or hydrogenated styrene butadiene styrene block copolymers, more specifically, hydrogenated styrene block polymer with 2-methyl-1,3-butadiene and 1,3-butadiene) or poly(styrene-ethylene-ethylene-propylene-styrene) SEEPS or poly(styrene-ethylene-ethylene-propylene)$_n$, (SEEP)$_n$, Food gels of SEEPS exhibit greater tear resistance that SEBS food gels and SEBS food gels exhibit greater strength than SEPS food gels. Food gels made from SBS exhibit higher rigidity that SEEPS, SEBS, and SEPS food gels. Food gels of SBS and SIS somewhat less thermally stable.

In general such block copolymers have the general configurations $A''$-Z-$A''$ and $(A''$-Z$)_n$ wherein each $A''$ is a selected glassy polymer end block of a monoalkenyl arene compounds, more specifically, a monovinyl aromatic compounds such as polystyrene (where superscript n=1), monovinylnaphithalene as well as the alkylated derivatives thereof such as poly(alpha-methylstyrene) (n=2), poly(o-methylstyrene) (n=3), poly(m-methylstryene) (n=4), poly(p-methylstyrene) (n=5) poly(tertiary-butylstyrene) (n=6), and the like, and midblocks (Z) comprising polymer chains of poly(ethylene), poly(ethylene) and poly(propylene) or -EEP-. In the case of styrene glassy end blocks, the hydrogenated styrene isoprene/butadiene block copolymer(s) have the formula The SEEPS (I) linear copolymers are characterized as having a Brookfield Viscosity value at 5 weight percent solids solution in toluene at 30° C. of from less than about 40 cps to about 150 cps and higher, advantageously from about 40 cps to about 60 cps and higher, more advantageously from about 50 cps to about 80 cps and higher, still more advantageously from about 70 cps to about 110 cps and higher, and even more advantageously from about 90 cps to about 180 cps and higher.

The (I) star-shaped copolymers are characterized as having a Brookfield Viscosity value at 5 weight percent solids solution in toluene at 30° C. of from about 150 cps to about 380 cps and higher, advantageously from about 150 cps to about 260 cps and higher, more advantageously from about 200 cps to about 580 cps and higher, and still more advantageously from about 500 cps to about 1,000 cps and higher.

This physical elastomeric network structure of the invention food gels are reversible, and heating the polymer above the softening point of the glassy domains temporarily disrupt the structure, which can be restored by lowering the temperature. During mixing and heating in the presence of compatible plasticizers, the glassy domains (A) unlock due to both heating and solvation and the molecules are free to move when shear is applied. The disruption and ordering of the glassy domains can be viewed as a unlocking and locking of the elastomeric network structure. At equilibrium, the domain structure or morphology as a function of the (A) and (Z) phases (mesophases) can take the form of spheres, cylinders, lamellae, or bicontinuous structures. The scale of separation of the phases are typically of the order of hundreds of angstroms, depending upon molecular weights (i.e. Radii of gyration) of the minority-component segments. The sub-micron glassy domains which provides the physical interlocking are too small to see with the human eye, too small to see using the highest power optical microscope and only adequately enough to see using the electron microscope. At such small domain scales, when the gel is in the molten state while heated and brought into contact to be formed with any substrate and allowed to cool, the glassy domains of the gel become interlocked with the surface of the substrate. At sufficiently high enough temperatures, with or without the aid of other glassy resins (such as polystyrene homopolymers and the like), the glassy domains of the copolymers forming the invention food gels fusses and interlocks with even a visibly smooth substrate surface such as glass. The disruption of the sub-micron domains due to heating above the softening point forces the glassy domains to open up, unlocking the network structure and flow. Upon cooling below the softening point, the glassy polymers reforms together into sub-micron domains, locking into a network structure once again, resisting flow. It is this unlocking and locking of the network structure on the sub-micron scale with the surfaces of various materials which allows the gel to form interlocking composites with other materials.

A useful analogy is to consider the melting and freezing of a water saturated substrate, for example, foam, cloth, fabric, paper, fibers, plastic, concrete, and the like. When the water is frozen, the ice is to a great extent interlocked with the substrate and upon heating the water is able to flow. Furthermore, the interlocking of the ice with the various substrates on close examination involves interconnecting ice in, around, and about the substrates thereby interlocking the ice with the substrates. A further analogy, but still useful is a plant or weed well established in soil, the fine roots of the plant spreads out and interconnects and forms a physical interlocking of the soil with the plant roots which in many instances is not possible to pull out the plant or weed from the ground without removing the surrounding soil also.

Likewise, because the glassy domains are typically about 200 Angstroms in diameter, the physical interlocking involve domains small enough to fit into and lock with the smallest surface irregularities, as well as, flow into and flow through the smallest size openings of a porous substrate. Once the gel comes into contacts with the surface irregularities or penetrates the substrate and solidifies, it becomes difficult or impossible to separate it from the substrate because of the physical interlocking. When pulling the gel off a substrate, most often the physically interlocked gel remains on the substrate. Even a surface which may appear perfectly smooth to the eye, it is often not the case. Examination by microscopy, especially electron microscopy, will show serious irregularities. Such irregularities can be the source of physical interlocking with the gel.

The polyethylene midblock containing block copolymers of the invention food gel are the result of hydrogenation of butadiene. In order for the block copolymers forming the invention food gel to exhibit polyethylene crystallinity, the midblock segments must contain long runs of —$CH_2$— groups. There should be approximately at least 16 units of —($CH_2$)— in sequence for crystallinity. Only the (—$CH_2$—)$^4$ units can crystallize, and then only if there are at least 4 units of (—$CH_2$—)$^4$ in sequence; alternatively, the polyethylene units are denoted by [—($CH_2$—$CH_2$—$CH_2$—$CH_2$)—]$^4$, [(—$CH_2$—)$^4$]$^4$ or (—$CH_2$—)$^{16}$.

The polyethylene crystalline segments or midblocks of copolymers forming the invention food gel can be characterized by the presence of a melting trace of from less than about 2.5° C. (for low viscosity polyethylene midblock containing block copolymers) to greater than about 18° C. (for higher viscosity polyethylene midblock containing block copolymers) as determined by crystallization exotherm DSC curve. More specific DSC melting values of the crystalline midblock block segment of the SEEPS copolymers may be carefully measured and detected include less than about 1.5° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 26° C., 27° C., 28° C., 29° C., 30° C., 31° C., 32° C., 33° C., 34° C., 35° C., 36° C., 37° C., 38° C., 39° C., 40° C., 44° C., 45° C., 46° C., 47° C., 48° C., 49° C., 50° C., 51° C., 52° C., 53° C., 54° C., 55° C., and higher. Whereas, the melting trace in DSC evidencing the presence of crystalline polyethylene are not found in amorphous block copolymers such as SEPS.

The crystallization exotherm of the crystalline block copolymer invention food gel are determined by ASTM D 3417 method. In order to provide conditions for DSC samples of certain polyethylene midblock containing block copolymers to have the best possible chance to exhibit any crystallinity the measurement protocol can be modified as follows: heat to 140° C. @ 10° C./min., cool to 0° C. @ 2° C./min., put sample in freezer for 1 week, heat sample to 140° C. @ 1°° C./min., then cool to 0° C. @ 1° C./min.

Generally, the method of obtaining long runs of crystalline —($CH_2$)— is by sequential block copolymer synthesis followed by hydrogenation. The attainment of invention food gels is solely due to the selective polymerization of the butadiene monomer (forming the midblocks) resulting in one or more predetermined amount of 1,4 poly(butadiene) blocks followed by sequential polymerization of additional midblocks and hydrogenation to produce one or more crystalline midblocks of the final block copolymers.

The crystalline block copolymers are made by sequential block copolymer synthesis, the percentage of crystallinity or (—$CH_2$—)$^{16}$ units should be at least about $(0.67)^4$ or about 20% and actual crystallinity of about 12%. For example, a selectively synthesized S-EBn-S copolymer having a ratio of 33:67 of 1,2 and 1,4 poly(butadiene) on hydrogenation will result in a midblock with a crystallinity of $(0.67)^4$ or 20%. For sake of simplicity, when n is a subscript of -EB-, n denotes the percentage of (—$CH_2$—)$^4$ units, eg, n=33 or 20% crystallinity which is the percentage of $(0.67)^4$ or "(—$CH_2$—)$^{16}$" units. Thus, when n=28 or 72% of (—$CH^2$—)$^4$ units, the % crystallinity is $(0.72)^4$ or 26.87% crystallinity attributed to (—$CH_2$—)$^{16}$ units, denoted by -$EB_{28}$-. As a matter of convention, and for purposes of this specification involving hydrogenated polybutadiene: the notation -E- denotes at least about 85% of (—$CH_2$—)$^4$ units. The notation -B- denotes at least about 70% of [—$CH_2$—$CH(C_2H_5)$—] units. The notation -EB- denotes between about 15 and 70% [—$CH_2$—$CH(C_2H_5)$—] units. The notation -EBn- denotes n % [—$CH_2$—$CH(C_2H_5)$—] units. For hydrogenated polyisoprene: The notation -EP- denotes about at least 90% [—$CH_2$—$CH(CH_3)$—$CH_2$—$CH_2$—] units.

Generally, one or more (E) midblocks can be incorporated at various positions along the midblocks of the block copolymers. The lower flexibility of block copolymer gels due to (E) midblocks can be balanced by the addition of sequentially (W) midblocks. For example, the sequentially synthesized block copolymer S-E-EB-S can maintain a high degree of flexibility due to the presence of amorphous -EB- block. The sequential block copolymer S-E-EB-B-S can maintain a high degree of flexibility due to the presence of amorphous -EB- and -B- midblocks. The sequential block copolymer S-E-EP-E-S can maintain a high degree of flexibility due to the presence of -EP- midblock. The sequential block copolymer S-E-B-S can maintain a high degree of flexibility due to the presence of the -B- midblock. For S-E-S, where the midblock may be crystalline and flexibility low, physical blending with amorphous block copolymers such as S-EP-S, S-EB-EP-S, (S-EP)$_n$ and the like can produce more softer, less rigid, and more flexible gel.

Because of the high viscosity of the block copolymers and (E) midblocks, the invention food gel exhibit different physical characteristics and improvements over amorphous gels including damage tolerance, improved crack propagation resistance, improved tear resistance producing knotty tears as opposed to smooth tears, improved resistance to fatigue, higher hysteresis, etc. Moreover, the invention food gels when stretched exhibit additional yielding as shown by necking caused by stress induced crystallinity or yielding of the styrene glassy phases.

Regarding resistance to fatigue, fatigue (as used herein) is the decay of mechanical properties after repeated application of stress and strain. Fatigue tests give information about the ability of a material to resist the development of cracks or crazes resulting from a large number of deformation cycles. Fatigue test can be conducted by subjecting samples of amorphous and gels to deformation cycles to failure (appearance of cracks, crazes, rips or tears in the gels).

Tensile strength can be determined by extending a selected gel sample to break as measured at 180° U bend around a 5.0 mm mandrel attached to a spring scale. Likewise, tear strength of a notched sample can be determined by propagating a tear as measured at 180° U bend around a 5.0 mm diameter mandrel attached to a spring scale.

Various block copolymers can be obtained which are amorphous, highly rubbery, and exhibiting minimum dynamic hysteresis:

Block Copolymer S-EB-S

The monomer butadiene can be polymerized in a ether/hydrocarbon solvent to give a 50/50 ratio of 1,2 poly(butadiene)/1,4 poly(butadiene) and on hydrogenation no long runs of —$CH_2$— groups and negligible crystallinity, ie, about $(0.5)^4$ or 0.06 or 6% actual crystallinity of about 3%. Due to the constraints of Tg and minimum hysteresis, conventional S-EB-S have ethylene-butylene ratios of about 60:40 with a crystallinity of about $(0.6)^4$ or 0.129 or 12% and actual crystallinity of about 7.7%.

Block Copolymer S-EP-S

The monomer isoprene when polymerized will produce 95% 1,4 poly(isoprene)/5% 3,4 poly(isoprene) and upon hydrogenation will form amorphous, rubbery poly(ethylene-propylene) midblock and no long runs of —$CH_2$— and no crystallinity.

Mixed Block Copolymer S-EB/EP-S

The polymerization of a 50/50 mixture of isoprene/butadiene monomers in suitable ether/hydrocarbon solvents to give equal amounts of 1,2 and 1,4 poly(butadiene) on hydrogenation will produce a maximum crystallinity of $(0.25)^4$ or 0.4%. The actual crystallinity would be approximately about 0.2%, which is negligible and results in a good rubbery midblock.

The polymerization of a 80/20 mixture of isoprene/butadiene monomers in suitable ether/hydrocarbon solvents to give equal amounts of 1,2 and 1,4 poly(butadiene) will upon hydrogenation produce a low crystallinity of $(0.10)^4$ or 0.01%. The actual crystallinity would be approximately about 0.006%, which is negligible and results in a good rubbery midblock.

The polymerization of a 20/80 mixture of isoprene/butadiene monomers in suitable ether/hydrocarbon solvents to give equal amounts of 1,2 and 1,4 poly(butadiene) will upon hydrogenation produce a low crystallinity of $(0.4)^4$ or 2.56%. The actual crystallinity would be approximately about 1.53%, which is negligible and results in a good rubbery midblock.

Block Copolymer S-EEP-S

The polymerization of a 20/80 mixture of isoprene/butadiene monomers in suitable ether/hydrocarbon solvents to give a 40:60 ratio of 1,2 and 1,4 poly(butadiene) will upon hydrogenation produce a low crystallinity of $(0.48)^4$ or 5.3%. The actual crystallinity would be approximately about 3.2%, which is negligible and results in a good rubbery midblock. This theoretical % of actual crystallinity corresponds well to commercially available SEEPS Septon 4033 and 4055 which varies with batch lots.

For purpose of convince and simplicity, the hydrogenated polybutadiene are denoted as follows: -E- denotes at least 85% R-1 units, -B- denotes at least 70% R-2 units, -EB- denotes between 15 and 70% R-2 units, -EBn- denotes n% R-2 units, and -EP- denotes 90% R-3 units.

Table I below gives the % of units on hydrogenation of polybutadiene/polyisoprene copolymer midblocks

| |H2 |
|---|
| —$(CH_2)_4$—(CH—$CH_2$)—($CH_2$—CH—$CH_2$—$CH_2$)—($CH_2$—CH)— |
| $C_2H_5$      $CH_3$      CH / $CH_3CH_3$ |
| n % from polybutadiene    (1 − n) % from polyisoprene |
| 90% · n   10% · n   95% · (1 − n)   5% · (1 − n) | where n is the mole % polybutadiene in the polybutadiene-polyisoprene starting polymer

| n = | R − 1 | R − 2 | R − 3 | R − 4 |
|---|---|---|---|---|
| 0% | 0% | 0% | 95% | 5% |
| 20% | 18% | 2% | 76% | 4% |
| 40% | 36% | 4% | 57% | 3% |
| 60% | 54% | 6% | 38% | 2% |
| 80% | 72% | 8% | 19% | 1% |
| 100% | 90% | 10% | 0% | 0% | where R-1 denotes —$(CH_2—)^4$,

R-2 denotes —(CH—$CH_2$)—,
                       $C_2H_5$

R-3 denotes —($CH_2$—CH—$CH_2$—$CH_2$)—, and
                          $CH_3$

R-4 denotes —($CH_2$—CH)—
                   CH
              $CH_3$   $CH_3$

Therefore, the percentage that can crystallize is $[(-CH_2-)^4]^4$ since this is the chance of getting four $(-CH_2-)^4$ units in sequence. The percentage that will crystallize is about 60% of this.

| n = | $(-CH_2-)^4$ | $[(-CH_2-)^4]^4$ | 0.6 × $[(-CH_2-)^4]_n$ |
|---|---|---|---|
| 0% | 0% | 0% | 0% |
| 20% | 18% | 0.1% | 0.06% |
| 40% | 36% | 1.7% | 1.0% |
| 60% | 54% | 8.5% | 5.1% |
| 80% | 72% | 26.9% | 16.1% |
| 100% | 90% | 65.6% | 39.4% |

This applies to polymerization in a hydrocarbon solvent. In an ether (eg, diethylether), the percentage $(-CH_2-)^4$ units will be reduced so that crystallinity will be negligible.

| n = | $(-CH_2-)^4$ | $[(-CH_2-)^4]^4$ | $0.6 \times [(-CH_2-)^4]^n$ |
|---|---|---|---|
| 0% | 0% | 0% | 0% |
| 20% | 5% | 0.0006% | 0.0004% |
| 40% | 10% | 0.01% | 0.006% |
| 60% | 15% | 0.05% | 0.03% |
| 80% | 20% | 0.16% | 0.10% |
| 100% | 25% | 0.39% | 0.23% |

These values are all negligible. There will be no detectable crystallinity in any of these polymer midblocks. In a mixed ether/hydrocarbon solvent, values will be intermediate, depending on the ratio of ether to hydrocarbon.

The midblock components (Z) can comprise various combinations of midblocks between the selected end blocks (A); these include: -E-EB-, -E-EP-, -E-EP-E-, -E-EB-E-, -E-E-EP-, -E-E-EB-, and the like.

The (Z) midblock of two or more polymer chains can be obtained by hydrogenation methods, for example: 1,4-polybutadiene ($B_{1,4}$) can be converted by hydrogenation to poly(ethylene), 1,4-polybutadiene ($B_{1,4}$) and 1,2-polybutadiene ($B_{1,2}$) can be converted by hydrogenation to poly(ethylene-butylene), 1,4-poly-isoprene ($I_{1,4}$) can be converted by hydrogenation to poly(ethylene-propylene), 1,2-polybutadiene ($B_{1,2}$) can be converted by hydrogenation to atactic poly(1-butene)(polybutylene), 1,4-polybutadiene ($B_{1,4}$) and polyisoprene (1) 1,4-poly-butadiene ($B_{1,4}$) can be converted by hydrogenation to poly(ethylene-ethylene-co-propylene-ethylene), 2-methyl-1,3-polybutadiene and 1,3-polybutadiene (I, $B_{1,3}$) can be converted by hydrogenation to poly(ethylene-ethylene-co-propylene), and the like. Polypropylene can be modified by tailblocking a poly(ethylene-propylene) copolymer segment on the propylene block to form poly(propylene-ethylene-co-propylene); likewise, poly(ethylene-propylene)$_n$(EP), poly(propylene-ethylene-co-propylene-propylene) (P-EP-P), poly(propylene-ethylene-propylene) (P-E-P), poly(ethylene-ethylene-co-propylene) (E-EP) can be formed. It is noted herein that B (bold) denotes polybutadiene and B (plain) denotes polybutylene.

Further, the multiblock copolymers (A''-Z-A'') can be obtained by various synthesis methods including hydrogenation of selected block copolymers. When the subscript n of A is =1, (polystyrene) (S), for example, suitable block copolymers can be converted to the useful multiblock copolymers forming the invention food gels. These include: conversions of S-I-$B_{1,3}$-S to (S-E-EP-S), S-$B_{1,4}$-I-$B_{1,4}$-S to (S-E-EP-E-S), S-$B_{1,2}$-I-S to (S-B-EP-S), S-$B_{1,3}$-$B_{1,2}$-$B_{1,4}$-S to (S-E-EB-S), S-$B_{1,4}$-$B_{1,2}$-I-S to (S-EB-EP-S), S-I-$B_{1,3}$-$B_{1,2}$-$B_{1,4}$-S to (S-E-EP-EB-S), etc. As denoted herein abbreviations are interchangeably used, for example, (S-E-EP-S) denotes poly(styrene-ethylene-ethylene-co-propylene-styrene). Other linear multiblock copolymers (denoted in abbreviations) can be formed, including: (S-B-EB-S), (S-E-EB-E-S), (S-B-EP-E-S), (S-B-EB-E-S), (S-E-E-EP-S), (S-E-E-EB-S), and the like.

The multiblock star-shaped (or radial) copolymers (A''-Z)$_n$ can be obtained by various synthesis methods including hydrogenation of selected block copolymers. When the subscript n of A is =1, (polystyrene) (S), for example, suitable block copolymers can be converted to the useful multiblock copolymers forming the invention food gels. These include: conversions of (S-I-$B_{1,3}$)$_n$ to poly(styrene-ethylene-ethylene-co-propylene)$_n$ denoted by the abbreviation (S-E-EP)$_n$, (S-$B_{1,4}$-I-$B_{1,4}$)$_n$ to (S-E-EP-E)$_n$, S-$B_{1,2}$-I)$_n$ to (S-B-EP)$_n$, (S-$B_{1,3}$-$B_{1,2}$-$B_{1,4}$)$_n$ to (S-E-EB)$_n$, (S-$B_{1,4}$-$B_{1,2}$-I)$_n$ to (S-EB-EP)$_n$, (S-I-$B_{1,3}$-$B_{1,2}$-$B_{1,4}$)$_n$ to (S-E-EP-EB)$_n$, etc. Other multiblock copolymers can be formed, including: (S-B-EB)$_n$, (S-E-EB-E)$_n$, (S-B-EP-E)$_n$, (S-B-EB-E)$_n$, (S-B-EP-B)$_n$, (S-B-EB-B)$_n$, (S-E-E-EP)$_n$, (S-E-EB)$_n$, (S-B-E-EP)$_n$, (S-B-E-EB)$_n$, (S-B-B-EP)$_n$, (S-B-B-EB)$_n$, (S-E-B-EB)$_n$, (S-E-B-EP)$_n$, (S-EB-EB)$_n$, (S-EP-EP)$_n$, (S-E-EB-EB)$_n$, (S-E-EP-EP)$_n$, (S-E-EB-EP)$_n$, (S-B-EB-EB)$_n$, (S-B-EP-EP)$_n$, and the like.

The Z and A portions of the linear and star-shaped multiblock copolymers are incompatible and form a two or more-phase system consisting of sub-micron glassy domains (A) interconnected by flexible Z chains. These domains serve to crosslink and reinforce the structure. This physical elastomeric network structure is reversible, and heating the polymer above the softening point of the glassy domains temporarily disrupt the structure, which can be restored by lowering the temperature.

It should be noted that when the A to Z ratios falls substantially below about 30:70, various properties such as elongation, tensile strength, tear resistance and the like can decrease while retaining other desired properties, such as gel rigidity, flexibility, elastic memory.

In general, for these block copolymers, the various measured viscosities of 5, 10, 15, and 20, weight percent solution values in toluene at 30° C. can be extrapolated to a selected concentration. For example, a solution viscosity of a 5 weight percent copolymer solution in toluene can be determined by extrapolation of 10, 15, and 20 weight percent measurements to 5 weight percent concentration.

The Brookfield Viscosities can be measured at various neat polymer concentrations, for example, the selected high viscosity linear multiblock copolymers in (I) can have a typical Brookfield Viscosity value of a 20 weight percent solids solution in toluene at 25° C. of about 1,800 cps and higher, and advantageously about 2,000 cps and higher. Typically, the Brookfield Viscosity values can range from at least about 1,800 to about 16,000 cps and higher. More typically, the Brookfield Viscosity values can range from at least about 1,800 cps to about 40,000 cps and higher. Still more typically, the Brookfield Viscosity values can range from at least about 1,800 cps to about 80,000 cps and higher. Due to structural variations between the multiblock and star-shaped copolymers, the high viscosity star-shaped or radial copolymers, typically, may exhibit a lower Brookfield Viscosity value than its counterpart linear multiblock copolymers. However, when the multiblock copolymers are considered as star-shaped or branched, than at equal branch lengths, the solution viscosities of the multiblock copolymers and branched copolymers are about the same or equivalent.

In all cases, the molecular chain lengths (molecular weights) of the multiblock and star-shaped (or radial) copolymers (I) must be sufficient to meet the high solution Brookfield Viscosities requirements described herein that is necessary for making the soft, strong and extreme tear resistant food gels.

The copolymers (I) selected have Brookfield Viscosity values ranging from about 1,800 cps to about 80,000 cps and higher when measured at 20 weight percent solution in toluene at 25° C., about 4,000 cps to about 40,000 cps and higher when measured at 25 weight percent solids solution in toluene. Typical examples of Brookfield Viscosity values for star-shaped copolymers at 25 weight percent solids solution in toluene at 25° C. can range from about 3,500 cps to about 30,000 cps and higher; more typically, about 9,000 cps and higher. Other advantageous multiblock and multiblock star-shaped copolymers can exhibit viscosities (as measured with a Brookfield model RVT viscometer at 25° C.) at 10 weight percent solution in toluene of about 400 cps and higher and at 15 weight percent solution in toluene of about 5,600 cps and higher. Other advantageous multiblock and star-shaped copolymers can exhibit about 8,000 to about 20,000 cps at 20 weight percent solids solution in toluene at 25° C. Examples of most advantageous high viscosity linear multiblock copolymers can have Brookfield viscosities at 5 weight percent solution in toluene at 30° C. of from about 40 to about 50, 60, 70, 80, 90, 100 . . . 120, 150, 200 cps and higher, while viscosities of star-shaped multiblock copolymers are 150 cps and higher.

Examples of high viscosity multiblock copolymers (I) having two or more midblocks are Kuraray's (S-E-EP-S) 4033, 4045, 4055 and 4077 hydrogenated styrene isoprene/butadiene block copolymers, more specifically, hydrogenated styrene block polymer with 2-methyl-1,3-butadiene and 1,3-butadiene. Kuraray's 4055 (S-E-EP-S) multiblock copolymer and 4077 exhibit viscosities at 5 weight percent solution in toluene at 30° C. of about 90 cps to about 120 cps and about 200 to about 380 cps respectively. At 10 weight percent SEEPS 4055 is about 5,800 cps and higher. Other linear and star multiblock copolymers (I) such as (S-E-EP-S), (S-E-EP-E-S), (S-B-EP-S), (S-E-EB-S), (S-EB-EP-S), (S-E-EP-EB-S), (S-B-EB-S), (S-E-EB-E-S), (S-B-EP-E-S), (S-B-EB-E-S), (S-B-EP-B-S), (S-B-EB-B-S), (S-E-E-EP-S), (S-E-E-EB-S), (S-B-E-EP-S), (S-B-E-EB-S), (S-B-B-EP-S), (S-B-B-EB-S), (S-E-B-EB-S), (S-E-B-EP-S), (S-EB-EB-S), (S-EP-EP-S), (S-E-EB-EB-S), (S-E-EP-EP-S), (S-E-EB-EP-S), (S-B-EB-EB-S), (S-B-EP-EP-S), (S-B-EB-EP-S), (S-B-EP-EB-S), (S-E-EP-E-EP-S), (S-E-EP)$_n$, (S-E-EP-E)$_n$, (S-B-EP)$_n$, (S-E-EB-S)$_n$, (S-EB-EP-)$_n$, (S-E-EP-EB)$_n$, (S-B-EB)$_n$, (S-E-EB-E)$_n$ can also exhibit viscosities at 5 weight percent solution in toluene at 30° C. of from less than about 100 to about 200, 300, 400, 500, 600, 700, 800, 900, 1,000, 1,200, 1,300, 1,600, 1,800, 2,000 cps and higher.

The copolymer (I) forming the invention food gels can have a broad range of A end block to Z center block ratio of about 20:80 or less to about 40:60 or higher. The A:Z weight ratios can range from lower than about 20:80 to above about 40:60 and higher. More specifically, the values can be 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:65, 45:55, 46:54, 47:53, 48:52, 49:51, 50:50, 51:49 and etc. Other ratio values of less than 19:81 or higher than 51:49 are also possible. Broadly, the styrene block to elastomeric block ratio A:Z of the high viscosity multiblock and star copolymers (I) is about 20:80 to about 40:60 or higher, less broadly about 31:69 to about 40:60, preferably about 32:68 to about 38:62, more preferably about 32:68 to about 36:64, particularly more preferably about 32:68 to about 34:66, especially more preferably about 33:67 to about 36:64, and most preferably about 30:70.

Theory notwithstanding, the multiblock copolymer gel properties can be attributed to the additional blocks affecting the separate polymer phases, the additional blocks affecting the heterophase structure, the additional blocks affecting the interfacial regions between phases of the multiblock polymers, the additional blocks forming a separate phase or inducing the formation of additional separate phases, or the high molecular weight and combination of high styrene content of the block copolymer. Due to the additional number of midblocks of the copolymers (I), the differences in solubility parameters between (A) and (Z) becomes greater than the solubility parameters differences between (A) and (D) of triblock copolymers, where D denotes the lone midblock polymer chain. Moreover, the presence of additional midblocks of ethylene, propylene, butylene, ethylene-propylene, or ethylene-butylene may contribute to stress-induced crystallization. This may explain why as the viscosity of the multiblock copolymers is increased to a higher level, the appearance of the invention food gels change from clear to more translucent white.

The invention food gels of the present invention resist tearing under tensile loads or dynamic deformation in that when cut or notched, the "crack" made on the gel deep surface does not readily propagate further under dynamic deformation or tensile loads. Unlike triblock copolymer gels, such as (SEBS) and (SEPS) gels which possess high tensile strength and will catastrophically snap apart into two reflective clean smooth surfaces when cut or notched under tensile or dynamic loads. Furthermore, when elongated, the invention food gels can exhibit two or more draw plateaus and can possess high tensile strength and rapid return from high extension without noticeable set or deformation. As observed, the invention food gels can be stretched by a first tensile load with uniform deformation to a measured length, upon the application of higher tensile loads, the gel can be further extended without breaking. Upon release, the gel returns immediate to its original shape and any necking quickly disappears. Again, theory notwithstanding, the additional drawing plateaus of the gel may be attributed to yielding of crystallite formations ethylene or propylene components in the gel or yield of induced interfacial regions of concentrated ethylene or propylene between the domains which during extension absorbs the elastic energy. Likewise, the resistance to tear propagation of the invention food gels when notched under tensile load can be attributed to yielding of the gel midblock components, yielding of additional phases, or yielding of interfacial regions before rupture or deformation of the (A) domains can take place.

Additionally, shearing, heating or cooling form the molten state can alter the gels' state. The invention food gels can be made to exhibit long elastomeric recovery times. Such gels can be used effectively in suppressing low frequency vibrations and for absorbing energy. The unusual properties of the invention food gels can be attributed to altering different phase or interfacial arrangements of the domains of the multiblock copolymers. The presence of polyethylene and crystallinity in block copolymers can be determined by NMR and DSC.

Physical measurements (NMR and DSC) of typical commercial Kraton G 1651, Septon 2006, Septon 4033 and Septon 4055 block were performed. Two types of $^{13}$C NMR spectra data were collected. The gated decoupled experiment provided quantitative data for each type of carbon atom. The DEPT experiment identified each type of carbon atom having attached protons. The DEPT data allowed assignment of the resonances in the gated decoupled experiment, which was then integrated for quantitation of the different types of midblock and end groups in each polymer tested The relative quantities of each type of carbon group in the various polymers were found. The uncertainty associated with these measurements is estimated as ±3 percentage units. Only the Kraton 1651 spectrum had resonances below about 20 ppm. These resonances, at 10.7–10.9 ppm, were assigned to the butylene methyl group and distinguish the SEBS polymer from the SEPS and SEEPS types of polymer (36). Only the Septon 2006 spectrum lacked the resonance at about 20 ppm that is characteristic of polyethylene units (defined here as three contiguous CH$_2$ groups), and this feature distinguishes the SEPS polymer from the SEBS and SEEPS polymers (36). There were additional differences between the spectra. The Septon 2006 and the Septon 4033 and 4055 spectra all showed resonances at 20 ppm; whereas the spectrum of Kraton 1651 was missing this resonance. The 20 ppm peak is characteristic of the methyl group of a propylene subunit, which is present in SEPS and SEEPS polymers but absent in the SEBS polymer. There were also a methylene peak, at 24.6 ppm, and a methine peak at 32.8 ppm, in all of the Septon spectra but not in the Kraton 1651 spectra. These resonances also arise from the propylene subunit.

The chemical shifts, relative intensities, and relative integrations were the same for the spectra of the Septon 4033 and Septon 4055, indicating that these two polymeric compositions are identical based on NMR spectroscopy.

DSC of ASTM D3417-99 was modified to provide conditions for the samples to have the best possible chance to exhibit any crystallinity. The protocol was as follows: (1) heat to 140° C. @ 10° C./min., (2) cool to 0° C. @ 2° C./min., (3) place in freezer for 1 week, (4) heat to 140° C. @ 1° C./min, and (5) cool to 0° C. @ 1° C./min.

This protocol was used with the exception that the samples were left in the freezer for approximately 2 months, instead of 1 week, because the DSC equipment broke during the week after the first run and required some time for repair. This delay is not expected to have negatively impacted the results of the experiment.

Two HDPE reference samples gave clearly defined crystallization exotherms and fusion endotherms, allowing calculation of heats of crystallization and fusion. These results showed that the equipment and methodology were fully functional, and this check was performed daily during DSC operation. Of the samples, only Kraton 1651 showed discernable transitions for both crystallization and fusion. The Septon 2006 showed no discernable transitions, which is consistent with its SEPS structure being entirely amorphous. The Septons 4033 and 4055 showed crystallization exotherms.

The heats of crystallization for the Kraton 1651 and Septons 4033 and 4055 were small, below about 3 J/g, indicating that small amounts of crystallinity are present in these polymers. The DSC data show:

Kraton 1651: crystallization exotherm peak at 18.09° C., crystallization exotherm—mass normalized enthalpy (J/g) of 1.43, fusion endortherm peak at 34.13° C., and Fusion Endotherm—mass normalized enthalphy J/g of 15.17.

Septon 2006: crystallization exotherm peak (not detected), crystallization exotherm—mass normalized enthalpy (not detected), fusion endortherm peak NONE, and Fusion Endotherm—mass normalized enthalphy (not detected).

Septon 4033: crystallization exotherm peak at 2.86° C., crystallization exotherm—mass normalized enthalpy (J/g) of 3.00, fusion endortherm peak (not detected), and Fusion Endotherm—mass normalized enthalphy (not detected).

Septon 4055: crystallization exotherm peak at 14.4° C., crystallization exotherm—mass normalized enthalpy (J/g) of 1.32, fusion endortherm peak (not detected), and Fusion Endotherm—mass normalized enthalphy (not detected).

Aldrich 13813JU polyethylene reference: crystallization exotherm peak at 119.72° C., crystallization exotherm—mass normalized enthalpy (J/g) of 174.60, fusion endortherm peak at 130.70° C., and Fusion Endotherm—mass normalized enthalphy J/g of 189.90.

Plasticizers (II) particularly advantageous for use in practicing the present invention are will known in the art, they include rubber processing oils such as paraffinic and naphthenic petroleum oils, highly refined aromatic-free paraffinic and naphthenic food and technical grade white petroleum mineral oils, and synthetic liquid oligomers of polybutene, polypropene, polyterpene, etc. The synthetic series process oils are high viscosity oligomers which are permanently fluid liquid nonolefins, isoparaffins or paraffins of moderate to high molecular weight.

Examples of representative commercially available plasticizing oils include Amoco® polybutenes, hydrogenated polybutenes, polybutenes with epoxide functionality at one end of the polybutene polymer, liquid poly(ethylene/butylene), liquid hetero-telechelic polymers of poly(ethylene/butylene/styrene) with epoxidized polyisoprene and poly (ethylene/butylene) with epoxidized polyisoprene: Example of such polybutenes include: L-14 (320 Mn), L-50 (420 Mn), L-100 (460 Mn), H-15 (560 Mn), H-25 (610 Mn), H-35 (660 Mn), H-50 (750 Mn), H-100 (920 Mn), H-300 (1290 Mn), L-14E (27–37 cst @ 100° F. Viscosity), H-300E (635–690 cst @ 210° F. Viscosity), Actipol E6 (365 Mn), E16 (973 Mn), E23 (1433 Mn), Kraton L-1203, EKP-206, EKP-207, HPVM-2203 and the like. Example of various commercially oils include: ARCO Prime (55,70, 90, 200, 350, 400 and the like), Duroprime and Tufflo oils (6006, 6016, 6016M, 6026, 6036, 6056, 6206, etc), other white mineral oils include: Bayol, Bernol, American, Drakeol, Ervol, Gloria, Kaydol, Litetek, Lyondell (Duroprime 55, 70, 90, 200, 350, 400, Ideal FG 32, 46, 68, 100, 220, 460), Marcol, Parol, Peneteck, Primol, Protol, Sontex, and the like. Oils useful in the invention food gel include: Witco 40 oil, Ervol, Benol, Blandol, Semtol-100, Semtol 85, Semtol 70, Semtol 40, Orzol, Britol, Protol, Rudol, Carnation, Klearol; 350, 100, 85, 70, 40, Pd-23, Pd 25, FG 32, 46, 68, 100, 220, 460, Duroprime Ds-L, Ds-M, Duropac 70, 90, Crystex 22, Af-L, Af M, 6006, 6016, 6026, Tufflo 6056, Ste Oil Co, Inc: Crystal Plus 70, 200,350, Lyondell: Duroprime DS L & M, Duropac 70, 90, Crystex 22, Crystex AF L & M, Tufflo 6006, 6016; Chevron Texaco Corp: Superta White Oil 5, Superta 7, 9, 10, 13, 18, 21, 31, 35, 38, 50, Penreco: Conosol 340, Conosol C-200, Drakeol 15, 13, 10, 10B, 9, 7, 5, 50, Peneteck, Ultra Chemical Inc, Ultraol White 60Nf, Ultraol White 50Nf, Witco Hydrobrite 100, 550, 1000, and the like.

Selected amounts of one or more compatible plasticizers can be used to achieve gel rigidities of from less than about 2 gram Bloom to about 1,800 gram Bloom and higher. Tack may not completely be dependent upon the amount of the glassy phase, by using selected amount of certain low viscosity oil plasticizers, block copolymers of SEBS, SEEPS, SEPS, $SEP_n$, $SEB_n$, and the like, gel tack can be reduced or the gel can be made non-tacky.

Major or minor amounts (based on 100 parts by weight of base elastomer) of any compatible second plasticizers can be utilized in forming the invention food gel, but because of the non-tack property of the invention food gel, the major amount of first plasticizers used should be low viscosity plasticizers having viscosities advantageously of not greater than about 30 cSt @ 40° C., for example 30, 29, 28, 27, 26, 25, 24, 23, 22, 21, 20, 19, 18, 17, 16, 15, 14, 13, 12, 11, 10, 9, 8, 7, 6, 5, 4, 3 and the like. The invention food gel tack decreases with decreasing oil viscosities of from about 30 to 3. Invention food gels which are non-tacky to the touch can be achieved using oils with viscosities of about 10 cSt @ 40° C. and less. Best result can be achieved using oils with viscosities of about 6 and less. Oils of higher viscosities of from about 500 cSt @ 40° C. to about 30 produce higher and higher tack with increase in viscosities. Heat temperature set resistance improves with increase in oil viscosity. Oils with viscosities less than about 15 exhibit heat set at about 50° C. Therefore a combination of low viscosity oils to improve low tack and high viscosity oils to improve set can be achieved by blending various oils having the desired viscosities for the desired end use. The disassociation of polystyrene is about 100° C. to about 135° C., the invention food gels do not melt below the disassociation temperature of polystyrene. It is important that simulated food when stored in a fishing box in the hot Sun at about 50° C. to about 58° C. do not suffer substantial heat set as tested at these temperatures in a 108° U bend for one hour.

It has been found that the lower the oil viscosity, the lower the heat set of the resulting gel composition and the higher the oil viscosity use in the gel compositions of the invention, the higher the heat set of the resulting gel composition. For example, if the first plasticizer is less than about 50 SUS @ 100° F., the heat set of the resulting gel composition comprising 100 parts of (1) copolymers of equal parts of SEEPS 4055 and Kraton G 1651 with about 600 parts by weight of the first plasticizer, the resulting is found to have a heat set less than that of a conventional PVC plastisol simulated food at about 50° C. However, as the 50 Vis SUS @ 100° F. oil of the formulation is gradually replaced with a higher viscosity oil of about 80–90 SUS @ 100° C., the heat set deformation improves with increasing amounts of the higher viscosity oil. In order to obtain equal heat set performance as conventional PVC plastisol simulated food, the first and second plasticizers would have to be of equal amounts in the gel composition. Replacing the first plasticizer with a greater amount would increase the gel tack. If tack is not of great concern, then a higher amount of the second plasticizers would be beneficial for improving heat set at higher and higher temperatures to the point that the second plasticizers can reach greater than 2525 SUS @ 10° C. (Ideal FG 100, 220, or 460 oil) the resulting gel composition would not exhibit set at even temperatures greater than 400° F.

The cited first plasticizers with or without one or more second plasticizers can be used in sufficient amounts to achieve a gel rigidity of from about 20 gram Bloom to about 1,800 gram Bloom. The second plasticizers in effective amounts in combination with the first plasticizers can provide a greater temperature compression set than a gelatinous composition having the same rigidity formed from the first plasticizers alone. The second plasticizers when used can provide a greater temperature compression set than a gelatinous composition having the same rigidity formed from the first plasticizers alone or formed from a combination of the first plasticizers and the second plasticizers. The first plasticizers being in effective amounts with said second plasticizers can provide a Gram Tack lower than a gelatinous composition having the same rigidity formed from the second plasticizers alone.

Generally, plasticizing oils with average molecular weights less than about 200 and greater than about 700 may also be used (e.g. H-300 (1290 Mn)). It is well know that minor and sufficient amounts of Vitamin E is added to the described commercially available oils during bulk processing which is useful as a oil stabilizer, antioxidant, and preservative.

Of all the factors, the amount of plasticizing oils can be controlled and adjusted advantageously to obtain substantially higher tear and tensile strength gels. The improvements in tensile strength of the invention food gels are accompanied by corresponding increase in gel rigidity as the amount of plasticizing oils are lowered until the rigidity of the invention food gels becomes much higher than that of the gums which surround the teeth. Although higher tensile strengths can be obtained as the amount of plasticizing oils in the gel approaches zero, the tensile strength of the floss, however, must be maintained at an acceptable gel rigidity (at sufficient high plasticizing oil levels) in order to be as soft as the gums required for flossing. For example, the rigidities of a gel containing 100, 200, or 300 parts by weight of oil is much higher than a gel containing 300, 400, 500, 600, 800, or 900 parts of oil.

These gels can exhibit a larger unit lateral contraction at the same elongation per unit of length as their counterpart parent gels from which the invention food gels are derived or formed. This property would allow a same unit volume of gel when elongated as its parent to easily wedge between the teeth when flossing. It would seem that a gel having the 1.0 cm$^3$ volume made from a ratio of 100 parts by weight of copolymer and 400 parts plasticizer would have a unique macro volume configurations that is at equilibrium with the plasticizer which is much like a 3-D fingerprint which is uniquely different from any other gel of a different copolymer to plasticizer ratio. Reducing the plasticizer content of a ratio 100:400 gel to a 100:300 ratio of copolymer to plasticizer will decrease the amount of plasticizer, but the original macro volume configurations will remain the same.

Speculative theories not withstanding, configurations may take the form of (1) swiss cheese, (2) sponge, (3) the insides of a loaf of bread, (4) structures liken to ocean brain corals, (5) large structures and small structures forming the 3-D gel volume landscape, (6) the outer heated surface which cools faster than the inner volumes of the gel during its cooling histories may have a patterned crust (rich in A micro-phases) like that of a loaf of bread and the inner volume may have much like 1–5, and (7) the many different possible structures are unlimited and volume landscapes may be interconnected at the macro-level by threads or micro-strands of Z micro-phases.

The amount of plasticizer extracted can advantageously range from less than about 10% by weight to about 90% and higher of the total weight of the plasticizer. More advantageously, the extracted amounts of plasticizer can range from less than about 20% by weight to about 80% by weight of the total plasticizer, and still more advantageously, from about 25% to about 75%. Plasticizing oils contained in the invention food gels can be extracted by any conventional methods, such as solvent extraction, physical extraction, pressure, pressure-heat, heat-solvent, pressure-solvent-heat, vacuum extraction, vacuum-heat extraction, vacuum-pressure extraction, vacuum-heat-pressure extraction, vacuum-solvent extraction, vacuum-heat-solvent-pressure extraction, etc. The solvents selected, should be solvents which do not substantially disrupt the A and Z phases of the (I) copolymers forming the invention food gels. Any solvent which will extract plasticizer from the gel and do not disrupt the A and Z phases can be utilized. Suitable solvents include alcohols, primary, secondary and tertiary alcohols, glycols, etc., examples include methanol, ethanol, tetradecanol, etc. Likewise, the pressures and heat applied to remove the desired amounts of oils should not be sufficient to disrupt the A and Z domains of the (I) copolymers. To form a lower rigidity gel, the simplest method is to subject the gel to heat in a partial vacuum or under higher vacuum for a selected period of time, depending on the amount of plasticizer to be extracted.

Surprisingly, as disclosed in my application Ser. No. 09/896,047 filed Jun. 30, 2001, oil extraction from the invention food gels can be achieved with little or no energy in the presence of one or more silicone fluids to almost any degree. A theory can be made to explain the physics involved in the extraction process which reasoning is as follows: (1) When water is placed in contact with an oil extended gel, the gel will not over time exhibit weight loss. (2) When oil is add to a column of water in a test tube, the oil will separate out and find its level above the column of water. (3) The surface tension of water at 25° C. is about 72.0 mN/m. (4) The surface tension of oil (mineral oil) at 25° C. is about 29.7 mN/m. (5) The surface tension of silicone fluid at 25° C. range from abut 16 to abut 22 mN/m (for example: the surface tension of 100 cSt silicone fluid at STP is 20.9 mN/m). (6) The density of oil is less than the density of silicone fluid, silicone grease, silicone gel, and silicone elastomer. (7) Oil is not a polar liquid and is highly compatible with the rubber phase of the oil gel forming polymer. (8) Silicone is polar and not compatible with the polymer's rubber phase.

The molecules of a liquid oil drop attract each other. The interactions of an oil molecule in the liquid oil drop are balanced by an equal attractive force in all directions. Oil molecules on the surface of the liquid oil drop experience an imbalance of forces at the interface with air. The effect is the presence of free energy at the surface. This excess energy is called surface free energy and is quantified as a measurement of energy/area. This can be described as tension or surface tension which is quantified as a force/length measurement or m/Nm.

Clearly gravity is the only force pulling on the extracted oil from the gel in the presence of silicone fluid at the gel-petri dish interface in the examples below. In the case of gel samples in the petri dishes in contact with silicone fluids, the extracted oil are collected on the top surface layer of the silicone fluid while the silicone fluid maintain constant contact and surrounds the gel sample. In the case of gel placed in a test tube of silicone fluid of different viscosity, the oil is extracted and migrates and collect at the top of the silicone fluid surface while the gel reduces in volume with time. The oil extraction process in silicone is accompanied by buoyant forces removing the extracted oil from the surroundings of the gel constantly surrounding the gel with fresh silicone fluid while in the example of alcohol, since the oil is heavier, the oil is maintained and surrounds the gel sample forming a equilibrium condition of oil surround the gel sample while keeping the alcohol from being in contact with the gel sample. Therefore in order to use alcohol to extract oil from a gel sample, the extracted oil must be constantly removed from the oil alcohol mixture as is the case during soxhlet extraction which process requires additional energy to pump the oil-alcohol mixture away from the sample and removing the oil before forcing the alcohol back to the gel sample surface to perform further extraction.

Silicone fluid is efficient and useful for extracting oil form oil gel compositions with the assistance of gravity and buoyancy of oil in the silicone fluids.

It is very difficult to extract, separate, or remove oil from an oil gel composition by positive or vacuum pressure or heat while using little or no energy and because of the affinity of the rubber midblock for oil, not even the weight of a two ton truck resting on a four square foot area (placing a layer of gel between four pairs of one foot square parallel steel plates one set under each of the truck tire resting on the gels) can separate the oil from the gel composition.

The use of silicone fluids of various viscosity acts as a liquid semi porous membrane when placed in constant contact with an oil gel composition will induce oil to migrate out of the gel composition. By the use of gravity or oil buoyancy, no energy is required run the oil extraction process.

In the case of the invention food gels of this application made in the shape of a simulated food in contact with silicone fluid, the elastomer or rubber being highly compatible with the oil, holds the oil in place within the boundary of the rubber molecular phase. It is this affinity of the (i) rubber and oil molecules and (ii) the attraction of oil molecules for each other that prevents the oil from bleeding out of the surface of the gel body. There exist then, at the surface of the gel several types of surface tensions of: (iii) oil-air surface tension, (iv) oil-rubber surface tension, (v) rubber-air surface tension, (vi) rubber/oil-air surface tension, and (vii) rubber-rubber surface tension. Other forces acting on the gel are: the elastic force of the polymer network pulling inwards, similar to stretched out rubber bands, which is in equilibrium with the oil molecules' attraction to the rubber molecules of the polymer network. In the case of SBS, the lower compatibility of the midblock butadiene with oil, once a gel is made, the SBS network immediately contracts due to elastic forces to produce oil bleeding which is evidence of the poor compatibility of the rubber block for the oil molecules.

The intermolecular forces that bind similar molecules together are called cohesive forces. Intermolecular forces that bind a substance to a surface are called adhesive forces.

When two liquids are in contact such as oil and silicone fluid, there is interfacial tension. The more dense fluid is referred to herein as the "heavy phase" and the less dense fluid is referred to as the "light phase". The action at the surface of the oil extended polymer gel surface when brought into contact with silicone fluid is as follows: a drop of silicone fluid when placed on the flat surface of a oil extended polymer gel will wet the gel surface and spread over a larger area as compared to a drop of oil placed on the same gel surface. Because the surface free energy of the silicone fluid in contact with the gel surface is lower than the surface free energy of the oil, the silicone fluid has the ability to displaces the oil from the surface of the gel.

The invention food gels can optionally comprise selected major or minor amounts of one or more polymers or copolymers (III) provided the amounts and combinations are selected without substantially decreasing the desired properties. The polymers and copolymers can be linear, star-shaped, branched, or multiarm; these including: (SBS) styrene-butadiene-styrene block copolymers, (SIS) styrene-isoprene-styrene block copolymers, (low styrene content SEBS such as Kraton 1650 and 1652) styrene-ethylene-butylene-styrene block copolymers, (SEP) styrene-ethylene-propylene block copolymers, (SEPS Kraton RP-1618) styrene-ethylene-propylene-styrene block copolymers, $(SB)_n$ styrene-butadiene and $(SEB)_n$, $(SEBS)_n$, $(SEP)_n$, $(SI)_n$ styrene-isoprene multi-arm, branched or star-shaped copolymers, polyethyleneoxide (EO), poly(dimethylphenylene oxide) and the like. Still, other (III) polymers include homopolymers which can be utilized in minor amounts; these include: polystyrene, polybutylene, polyethylene, polypropylene and the like. In the case of high molecular weight and combination of high styrene content of the block copolymer which may be the reason for improve tear and fatigue resistance, these properties may be achieved and maintained by blending (I) copolymers of SEEPS with (III) copolymers of SBS (Kraton D 1101, 1144, 1116, 1118, 4141, 4150, 1133, 1184, 4158, 1401P, 4240, and KX219), SEBS (G1651, 1654).

Other (III) polymers useful in the invention food gels include: of trifluoromethyl-4,5-difuoro-1,3-dioxole and tetrafluoroethylene, polytetrafluoroethylene, maleated poly(styrene-ethylene-butylene), maleated poly(styrene-ethylene-butylene)$_n$, maleated poly(styrene-ethylene-butylene-styrene), maleated poly(styrene-ethylene-propylene),n maleated poly(styrene-ethylene-propylene-styrene), poly(dimethylphenylene oxide), poly(ethylene-butylene), poly(ethylene-propylene), poly(ethylene-styrene)interpolymer made by metallocene catalysts, using single site, constrained geometry addition polymerization catalysts, poly(styrene-butadiene), poly(styrene-butadiene)n, poly(styrene-butadiene-styrene), poly(styrene-ethylene-butylene), poly(styrene-ethylene-butylene)n, poly(styrene-ethylene-butylene-styrene), poly(styrene-ethylene-butylene-styrene), poly(styrene-ethylene-propylene), poly(styrene-ethylene-propylene)n, poly(styrene-ethylene-propylene-styrene), poly(styrene-isoprene), poly(styrene-isoprene)n, poly(styrene-isoprene-styrene), poly(styrene-isoprene-styrene)n, polyamide, polybutylene, polybutylene, polycarbonate, polydimethylsiloxane; polyethylene vinyl alcohol copolymer, polyethylene, polyethyleneoxide, polypropylene, polystyrene, polyvinyl alcohol, wherein said selected copolymer is a linear, radial, star-shaped, branched or multiarm copolymer, wherein n is greater than one When the selected (III) polymers and copolymers contain greater glassy block of styrene content of 33 and higher, such may be effective to provide a Gram Tack lower than a gelatinous composition having the same rigidity formed from the (I) block copolymers and corresponding first plasticizers alone or the first plasticizers with a second plasticizers. The selected component (III) polymers of polystyrene forming a styrene content of 33 and higher when used in effective amounts may provide a greater temperature compression set than a gelatinous composition having the same rigidity formed from the (I) block copolymers and corresponding first plasticizers alone or the first plasticizers with a second plasticizer.

On the other hand, the lower viscosity first plasticizer can impart lower Gram Tack to the invention food gels than an increase of styrene content of the (I) copolymers or (III) polymers and copolymers. The low tack and non tacky invention food gels can be made from one or more linear, branched, star-shaped (radial), or multiarm block copolymers or mixtures of two or more such block copolymers having one or more midblock polymer chains which invention food gels have use as articles with high tear propagation resistance. The invention food gels also possess high tensile strength and rapid return from high extension and can exist in an altered state of delay elastomeric recovery as it regains its original shape following high extensions or dynamic deformations. The invention food gels also exhibit low set, high dimensional stability, crack, tear, craze, and creep resistance, excellent tensile strength and high elongation, long service life under shear, stress and strain and capable of withstanding repeated dynamic shear, tear and stress forces, excellent processing ability for cast molding, extruding, fiber forming film forming and spinning, non-toxic, nearly tasteless and odorless, soft and strong, optically clear, highly flexible, possessing elastic memory, substantially with little or no plasticizer bleedout, and having low or no tack in contact with human hand which reduction in tackiness can be measured. The non tacky and optical properties of the invention food gels do not rely on powders or surface activation by additives to establish their non-tackiness. The invention food gels' non-tackiness pervasive the gels' entire bulk or volume. No matter how deep or in which direction a cut is made, the invention food gels are non tacky throughout (at all points internally as well as on the gels' surface). Once the gel is cut, the invention food gel immediately exhibits non-tackiness at its newly cut surface. Hence, the homogeneity of the non-tackiness and optical properties of the invention food gels are not known.

Example of (III) polymers, copolymers, and blends include: (a) Kraton G 1651, G 1654X; (b) Kraton G 4600; (c) Kraton G 4609; other suitable high viscosity polymer and oil s include: (d) Tuftec H 1051; (e) Tuftec H 1041; (f) Tuftec H 1052; (g) low viscosity Septon® Kuraray SEEPS 4033 (hydrogenated styrene isoprene/butadiene block copolymers, more specifically, hydrogenated styrene block polymer with 2-methyl-1,3-butadiene and 1,3-butadiene); other Septon® (h) Kuraray SEBS 8006; (i) Kuraray SEPS 2005; (j) Kuraray SEPS 2006, and (k) blends (polyblends) of (a)–(h) with other polymers and copolymers include: (1) SEBS-SBS; (2) SEBS-SIS; (3) SEBS-(SEP); (4) SEBS-(SEB)$_n$; (5) SEBS-(SEB)$_n$; (6) SEBS-(SEP)$_n$; (7) SEBS-(SI)$_n$; (8) SEBS-(SI) multiarm; (9) SEBS-(SEB)$_n$; (10) (SEB)$_n$ star-shaped copolymer; (11) s made from blends of (a)–(k) with other homopolymers include: (12) SEBS/polystyrene; (13) SEBS/polybutylene; (14) SEBS/polyethylene; (14) SEBS/polypropylene; (16) SEP/SEBS, (17) SEP/SEPS, (18) SEP/SEPS/SEB, (19), SEPS/SEBS/SEP, (20), SEB/SEBS (21), EB-EP/SEBS (22), SEBS/EB (23), SEBS/EP (24), (25) (SEB)$_n$ s, (26) (SEP)$_n$, Septon® (27) Kuraray 2007 (SEPS), (28) Kuraray 2002, (SEPS), and the like.

Representative examples of commercial elastomers that can be combined with the multiblock and star-shaped copolymers (III) described above include: Shell Kratons D1101, D1102, D1107, D1111, D1112, D1113X, D1114X, D1116, D1117, D1118X, D1122X, D1125X, D1133X, D1135X, D1184, D1188X, D1300X, D1320X, D4122, D4141, D4158, D4240, G1650, G1652, G1657, G1701X, G1702X, G1726X, G1750X, G1765X, FG1901X, FG1921X, D2103, D2109, D2122X, D3202, D3204, D3226, D5298, D5999X, D7340, G1654X, G2701, G2703, G2705, G1706, G2721X, G7155, G7430, G7450, G7523X, G7528X, G7680, G7705, G7702X, G7720, G7722X, G7820, G7821X, G7827, G7890X, G7940, G1730 (SEPSEP), FG1901X and FG1921X. Septon® Kuraray's SEPS, SEP/SEPS or SEP/SEB/SEPS Nos. SEP 1001, SEP 1050, 2027, 2003, SEPS 2006, SEPS 2023, SEPS 2043, SEPS 2063, SEPS 2050, SEPS 2103, SEPS 2104, SEPS 2105, SEBS 8004, SEBS 8007, H-VS-3 (S-V-EP-S) and the like. Dow poly(ethylene-styrene) random copolymers (interpolymers) produced by metallocene catalysts, using single site, constrained geometry addition polymerization catalysts resulting in poly(ethylene-styrene) substantially random copolymers such as ESI-#1 thru #38, including ES16, ES24, ES27, ES28, ES28, ES30, ES44 with styrene wt % of 15.7, 23.7, 27.3, 28.1, 39.6 & 43.9 respectively, M copolymers (ES53, ES58, ES62, ES63, and ES69 with styrene wt % of 52.5, 58.1, 62.7, 62.8, and 69.2 respectively and crystallinity, %, DSC, based on copolymer of 37.5, 26.6, 17.4, 22.9, 19.6 and 5.0 respectively), S copolymers (ES72, ES73, and ES74 with styrene wt % of 72.7, 72.8, and 74.3 respectively). Other grade copolymers include ES60 (melt index 0.1, 0.5, 3, 10), ES20 (MI=0.1. 0.5, 3, 11).

Representative examples of suitable sources of SEEPS block copolymers being Kuraray's Septon® 4033, Septon® 4045, Septon® 4055 and Septon® 4077; sources of SBS block copolymers being Kraton® 1101, Kraton® 1133, Kraton® 1184, Kraton® 4158Kraton® 4150, Kraton® 1144; sources of SEBS block copolymers being Kraton® 1651, Kraton® 1654, Kraton® 1650. Various other commercial sources of different and kind of SEPS, SEBS, SEEPS, SBS, $SEB_n$, $SEEP_n$, $SE_n$ and $SEP_n$ thermoplastic copolymers are also available and suitable for use in the present invention and not limited to the specific Kraton and specific Septon mentioned above which other thermoolastic copolymers can be easily and quickly determined to be useful or not useful as polymers for their tear and fatigue resistance gel properties. A simple test for suitable polymers is by heating any type and kind of SEBS, SEPS, SEEPS, SBS, $SE_n$, $SEB_n$, $SEP_n$, $SEEP_n$, and $SB_n$ in oil in a test tube, forming it into gel upon cooling, removed it from the test tube and simply by holding it tightly in both hands and snapping the rod of gel as quickly and as forcibly as possible to attempt to break or tear it. Another simple is to test a polymer for suitability is to initiate a cut in a polymer gel sample and intentionally cut it to see it resist tearing. The sample can be examined to see if the tearing produce resistant knotty tears on the fresh tearing surface as opposed to non-resistant smooth tears.

The Brookfield Viscosity of a 5 weight percent solids solution in toluene at 30° C. of 2006 is about 27. Typical Brookfield Viscosities of a 10 weight percent solids solution in toluene at 30° C. of Septon® Kuraray SEP 1001, SEP 1050, SEPS 2007, SEPS 2063, SEPS 2043, SEPS 2005, SEPS 2006, are about 70, 70, 17, 29, 32, 50, 1200, and 1220 respectively. Typical Brookfield Viscosity of a 25 weight percent solids solution in toluene at 25° C. of Kraton D1101, D1116, D1184, D1300X, G1701X, G1702X are about 4000, 9000, 20000, 6000, 50000 and 50000 cps respectively. Typical Brookfield Viscosity of a 10 weight percent solids solution in toluene at 25° C. of G1654X is about 370 cps. The Brookfield Viscosities of a 20 and 30 weight percent solids solution in toluene at 30° C. of H-VS-3 are about 133 cps and 350 cps respectively. Other polymers such as, thermoplastic crystalline polyurethane copolymers with hydrocarbon midblocks can also be employed.

The glassy A component type homopolymers can be advantageously added to provide non-tackiness which are selected from one or more homopolymers of: polystyrene, poly(alpha-methylstyrene), poly(o-methylstyrene), poly(m-methylstryene), poly(p-methylstyrene), and poly(dimethylphenylene oxide) (GE PPO 612 and Arizona XR 6504). Such glassy polymers can be use in forming the invention food gel, but would increase hot tack.

The average molecular weight of the glassy homopolymers useful in the invention food gels advantageously can range from about 2,500 to about 90,000, typical about 3,000; 4,000; 5,000; 6,000; 7,000; 8,000; 9,000; 10,000; 11,000; 12,000, 13,000; 14,000; 15,000; 16,000; 17,000; 18,000; 19,000; 20,000; 30,000; 40,000; 50,000; 60,000; 70,000; 80,000; 90,000 and the like. Example of various molecular weights of commercially available polystyrene: Aldrich Nos.: 32,771-9 ($2,500M_w$), 32,772-7 (4,000 Mw), 37,951-4 (13,000 Mw), 32-774-3 (20,000 Mw), 32,775-1 (35,000 Mw), 33,034-5 (50,000 Mw), 32,777-8 (90,000 Mw); poly (alpha-methylstyrene) #41,794-7 (1,300 Mw), 19,184-1 (4,000 Mw); poly(4-methylstyrene) #18,227-3 (72,000 Mw), Endex 155, 160, Kristalex 120, 140 from Hercules Chemical, GE: Blendex HPP820, HPP822, HPP923, and the like.

Suitable triblock copolymers (III) and their typical viscosities are further described: styrene-ethylene-butylene-styrene block copolymers (SEBS) available from Shell Chemical Company and Pecten Chemical Company (divisions of Shell Oil Company) under trade designations Kraton G 1651, Kraton G 1654X, Kraton G 4600, Kraton G 4609 and the like. Shell Technical Bulletin SC: 1393-92 gives solution viscosity as measured with a Brookfield model RVT viscometer at 25° C. for Kraton G 1654X at 10% weight in toluene of approximately 400 cps and at 15% weight in toluene of approximately 5,600 cps. Shell publication SC:68–79 gives solution viscosity at 25° C. for Kraton G 1651 at 20 weight percent in toluene of approximately 2,000 cps. When measured at 5 weight percent solution in toluene at 30° C., the solution viscosity of Kraton G 1651 is about 40. Examples of high viscosity SEBS triblock copolymers includes Kuraray's SEBS 8006 which exhibits a solution viscosity at 5 weight percent at 30° C. of about 5 f cps. Kuraray's 2006 SEPS polymer exhibits a viscosity at 20 weight percent solution in toluene at 30° C. of about 78,000 cps, at 5 weight percent of about 27 cps, at 10 weight percent of about 1220 cps, and at 20 weight percent 78,000 cps. Kuraray SEPS 2005 polymer exhibits a viscosity at 5 weight percent solution in toluene at 30° C. of about 28 cps, at 10 weight percent of about 1200 cps, and at 20 weight percent 76,000 cps. Other grades of SEBS, SEPS, $(SEB)_n$, $(SEP)_n$, polymers can also be utilized in the present invention provided such polymers exhibits the required high viscosity. Such SEBS polymers include (high viscosity) Kraton G 1855X which has a Specific Gravity of 0.92, Brookfield Viscosity of a 25 weight percent solids solution in toluene at 25° C. of about 40,000 cps or about 8,000 to about 20,000 cps at a 20 weight percent solids solution in toluene at 25° C.

The styrene to ethylene and butylene (S:EB) weight ratios for the Shell designated polymers can have a low range of 20:80 or less. Although the typical ratio values for Kraton G 1651, 4600, and 4609 are approximately about 33:67 and for Kraton G 1855X approximately about 27:73, Kraton G 1654X (a lower molecular weight version of Kraton G 1651 with somewhat lower physical properties such as lower solution and melt viscosity) is approximately about 31:69, these ratios can vary broadly from the typical product specification values. In the case of Kuraray's SEBS polymer 8006 the S:EB weight ratio is about 35:65. In the case of Kuraray's 2005 (SEPS), and 2006 (SEPS), the S:EP weight ratios are 20:80 and 35:65 respectively. Much like S:EB ratios of SEBS and $(SEB)_n$, the SEP ratios of very high viscosity SEPS triblock copolymers are about the same and can typically vary as broadly.

The triblock copolymers (III) such as Kraton G 1654X having ratios of 31:69 or higher can be used and do exhibit about the same physical properties in many respects to Kraton G 1651 while Kraton G 1654X with ratios below 31:69 may also be use, but they are less advantageous due to their decrease in the desirable properties of the final gel.

The high glassy component copolymers suitable for use in forming the invention food gel include high styrene component BASF's Styroflex series copolymers including BX 6105 with a statistical SB sequence for the low elastomeric segments (styrene to butadiene ratio of 1:1) and an overall styrene content of almost 70%, high styrene content Shell Kraton G, Kraton D-1122X $(SB)_n$, D-4122 SBS, D-4240 $(SB)_n$, D4230 $(SB)_n$, DX-1150 SBS, D-4140 SBS, D-1115 SBS, D4222 SBS, Kraton D-1401P, SEBS, Dexco's Vector 6241-D, 4411-D, Fina's Finaclear high styrene content SBS series copolymers, Phillips Petroleum's XK40 K-Resin styrene/butadiene copolymers, Kuraray's S2104 SEPS. The copolymers include amorphous polymers with high styrene content: SBS, SIS, SEPS, SEB/EPS, and the like. The copolymers with glassy to elastomeric ratios can range from 37:63, 37.6:62.4, 38:62, 39:61, 40:60, 41:59, 42:58, 43:57, 44:65, 45:55, 46:54, 47:53, 48:52, 49:51, 50:50, 51:49 52:48, 53:47, 54:46, 55:45, 56:44, 57:43, 58:42, 59:41, 60:40, 6:39, 62:38, 63:37, 64:36, 65:35, 66:34, 67:33, 68:32, 69:31, 70:30, 7:29, 72:28, 73:27, 74:26, 75:25, 76:24, 77:23, 78:22, 79:21, to 80:20 and higher. High styrene content Dow ES30, and ES44 with styrene wt % of 15.7, 23.7, 27.3, 28.1, 39.6 & 43.9 respectively, M copolymers (ES53, ES58, ES62, ES63, and ES69 with styrene wt % of 52.5, 58.1, 62.7, 62.8, and 69.2 respectively and crystallinity, %, DSC, based on copolymer of 37.5, 26.6, 17.4, 22.9, 19.6 and 5.0 respectively, S copolymers ES72, ES73, and ES74 with styrene wt % of 72.7, 72.8, and 74.3 respectively may also be used. These hard to process polymers can be added (from 0.01 to 30 parts by weight) by dry blending in combination with 200–400 parts oil and with SEEPS 4055, 4033, 4077, 4045 and the like and extruded at about between 75° C.–135° C. to form a pre-blend and then formulated with additional oil or/or oil and (I) copolymers to produce the final invention food gel.

Suitable polyolefins include polyethylene and polyethylene copolymers such as Dow Chemical Company's Dowlex 3010, 2021D, 2038, 2042A, 2049, 2049A, 2071, 2077, 2244A, 2267A; Dow Affinity ethylene alpha-olefin resin PL-1840, SE-1400, SM-1300; more suitably: Dow Elite 5100, 5110, 5200, 5400, Primacor 141—XT, 1430, 1420, 1320, 3330, 3150, 2912, 3340, 3460; Dow Attane (ultra low density ethylene-octene-1 copolymers) 4803, 4801, 4602, Eastman Mxsten CV copolymers of ethylene and hexene (0.905–0.910 g/cm3).

On the other hand, the molten gelatinous elastomer composition will adhere sufficiently to certain plastics (e.g. acrylic, ethylene copolymers, nylon, polybutylene, polycarbonate, polystyrene, polyester, polyethylene, polypropylene, styrene copolymers, and the like) provided the temperature of the molten gelatinous elastomer composition is sufficient high to fuse or nearly fuse with the plastic. In order to obtain sufficient adhesion to glass, ceramics, or certain metals, sufficient temperature is also required (e.g. above 250° F.).

The incorporation of such adhesion resins is to provide strong and dimensional stable adherent invention food gels, gel composites, and gel articles. Typically such adherent invention food gels can be characterized as adhesive invention food gels, soft adhesives or adhesive sealants. Strong and tear resistant adherent invention food gels may be formed with various combinations of substrates or adhere (attach, cling, fasten, hold, stick) to substrates to form adherent gel/substrate articles and composites.

The present invention food gel can also contain useful amounts of conventionally employed additives such as stabilizers, antioxidants, antiblocking agents, colorants, fragrances, flame retardants, flavors, other polymers in minor amounts and the like to an extend not affecting or substantially decreasing the desired properties. Additives useful in the gel of the present invention include: tetrakis[methylene 3,-(3'5'-di-tertbutyl-4"-hydroxyphenyl) propionate] methane, octadecyl 3-(3",5"-di-tert-butyl-4"-hydroxyphenyl) propionate, distearyl-pentaerythritol-diproprionate, thiodiethylene bis-(3,5-ter-butyl-4-hydroxy) hydrocinnamate, (1,3,5-trimethyl-2,4,6-tris[3,5-di-tert-butyl-4-hydroxybenzyl] benzene), 4,4"-methylenebis(2,6-di-tert-butylphenol), Tinuvin P, 123, 144, 213, 234, 326, 327, 328, 571, 622, 770, 765, Chimassorb 119, 944, 2020, Uvitex OB, Irganox 245, 1076, 1098, 1135, 5057, HP series: 2215, 2225, 2921, 2411, 136, stearic acid, oleic acid, stearamide, behenamide, oleamide, erucamide, N,N"-ethylenebisstearamide, N,N"-ethylenebisoleamide, sterryl erucamide, erucyl erucamide, oleyl palmitamide, stearyl stearamide, erucyl stearamide, calcium sterate, other metal sterates, waxes (e.g. polyethylene, polypropylene, microcrystalline, carnauba, paraffin, montan, candelilla, beeswax, ozokerite, ceresine, and the like). The gel can also contain metallic pigments (aluminum and brass flakes), TiO2, mica, fluorescent dyes and pigments, phosphorescent pigments, aluminatrihydrate, antimony oxide, iron oxides (Fe3O4, —Fe2O3, etc.), iron cobalt oxides, chromium dioxide, iron, barium ferrite, strontium ferrite and other magnetic particle materials, molybdenum, silicone fluids, lake pigments, aluminates, ceramic pigments, iron-blues, ultramarines, phthalocynines, azo pigments, carbon blacks, silicon dioxide, silica, clay, feldspar, glass, microspheres, barium ferrite, wollastonite and the like. The report of the committee on Magnetic Materials, Publication NMAB-426, National Academy Press (1985) is incorporated herein by reference.

Various glassy phase associating resins having softening points above about 120° C. can also serve as additives to increase the glassy phase of the Invention food gel and met the non-tackiness criteria, these include: Hydrogenated aromatic resins (Regalrez 1126, 1128, 1139, 3102, 5095, and 6108), hydrogenated mixed aromatic resins (Regalite R125), and other aromatic resin (Picco 5130, 5140, 9140, Cumar LX509, Cumar 130, Lx-1035) and the like.

The commercial resins which can aid in adhesion to materials (plastics, glass, and metals) may be added in minor amounts to the invention food gels, these resins include: polymerized mixed olefins (Super Sta-tac, Betaprene Nevtac, Escorez, Hercotac, Wingtack, Piccotac), polyterpene (Zonarez, Nirez, Piccolyte, Sylvatac), glycerol ester of rosin (Foral), pentaerythritol ester of rosin (Pentalyn), saturated alicyclic hydrocarbon (Arkon P), coumarone indene, hydrocarbon (Picco 6000, Regalrez), mixed olefin (Wingtack), alkylated aromatic hydrocarbon (Nevchem), Polyalphamethylstyrene/vinyl toluene copolymer (Piccotex), polystyrene (Kristalex, Piccolastic), special resin (LX-1035), and the like.

In my U.S. Pat. No. 5,760,117, is described a non-adhering gel which is made non-adhearing, by incorporating an advantage amount of stearic acid (octadecanoic acid), metal stearates (e.g., calcium stearate, magnesium stearate, zinc stearate, etc.), polyethylene glycol distearate, polypropylene glycol ester or fatty acid, and polytetramethylene oxide glycol disterate, waxes, stearic acid and waxes, metal stearate and waxes, metal stearate and stearic acid. Such non-adhering gels by including additives are no longer optical clear and with time some of the additives blooms uncontrollably to the gel surface.

The invention food gels are also suitable for forming composites combinations with various substrates. The substrate materials are selected from the group consisting of paper, foam, plastic, fabric, metal, metal foil, concrete, wood, glass, various natural and synthetic fibers, including glass fibers, ceramics, synthetic resin, and refractory materials.

The invention food gels can also be made into composites. The invention food gels can be casted unto various substrates, such as open cell materials, metals, ceramics, glasses, and plastics, elastomers, fluropolymers, expanded fluropolymers, Teflon (TFE, PTFE, PEA, FEP, etc), expanded Teflon, spongy expanded nylon, etc.; the molten gel composition is deformed as it is being cooled. Useful open-cell plastics include: polyamides, polyimides, polyesters, polyisocyanurates, polyisocyanates, polyurethanes, poly(vinyl alcohol), etc. Open-celled Plastic (sponges) suitable for use with the compositions are described in "Expanded Plastics and Related Products", Chemical Technology Review No. 221, Noyes Data Corp., 1983, and "Applied Polymer Science", Organic Coatings and Plastic Chemistry, 1975. These publications are incorporated herein by reference.

The invention food gels denoted as "G" can be physically interlocked with a selected material denoted as "M" to form composites as denoted for simplicity by their combinations $G_nG_n$, $G_nM_n$, $G_nM_nG_n$, $M_nG_nM_n$, $M_nG_nG_n$, $G_nG_nM_n$, $M_nM_nG_n$, $M_nM_nM_nG_n$, $M_nM_nM_nG_nM_n$, $M_nG_nG_nM_n$, $G_nM_nG_nG_n$, $G_nM_nM_nG_n$, $G_nM_nM_nG_n$, $G_nG_nM_nM_n$, $G_nG_nM_nG_nM_n$, $G_nM_nG_nG_n$, $G_nG_nM_n$, $G_nM_nG_nM_nM_n$, $M_nG_nM_nG_nM_nG_n$, $G_nG_nM_nM_nG_n$, $G_nG_nM_nG_nM_nG_n$, and the like or any of their permutations of one or more $G_n$ with $M_n$ and the like, wherein when n is a subscript of M, n is the same or different selected from the group consisting of foam, plastic, fabric, metal, concrete, wood, glass, ceramics, synthetic resin, synthetic fibers or refractory materials and the like; wherein when n is a subscript of G, n denotes the same or a different gel rigidity of from less than about 2 gram to about 1,800 gram Bloom and higher).

Furthermore, the interlocking materials with the gel of the invention may be made from flexible materials, such as fibers and fabrics of cotton, flax, and silk. Other flexible materials include: elastomers, fiber-reinforced composites, mohair, and wool. Useful synthetic fibers include: acetate, acrylic, aremid, glass, modacrylic polyethylene, nylon, olefin, polyester, rayon, spandex, carbon, sufar, polybenzimidazole, and combinations of the above. Useful open-cell plastics include: polyamides, polyimides, polyesters, polyisocyanurates, polyisocyanates, polyurethanes, poly(vinyl alcohol), etc. Open-celled Plastic (foams) suitable for use with the compositions of the invention are described in "Expanded Plastics and Related Products", Chemical Technology Review No. 221, Noyes Data Corp., 1983, and "Applied Polymer Science", Organic Coatings and Plastic Chemistry, 1975. These publications are incorporated herein by reference. These include: open and non-opened cell silicone, polyurethane, polyethylene, neoprene, polyvinyl chloride, polyimide, metal, ceramic, polyether, polyester, polystyrene, polypropylene. Example of such foams are: Thanol®, Arcol®, Ugipol®, Arcel®, Arpak®, Arpro®, Arsan®, Dylite®, Dytherm®, Styrofoam®, Trymer®, Dow Ethafoam®, Ensolite®, Scotfoam®, Pyrell®, Volana®, Trocellen®, Minicel®, and the like.

Sandwiches of gel-material (i.e. gel-material-gel or material-gel-material, etc.) are useful as dental floss, shock absorbers, acoustical isolators, vibration dampers, vibration isolators, and wrappers. For example the vibration isolators can be use under research microscopes, office equipment, tables, and the like to remove background vibrations. The tear resistance nature of the invention food gels are superior in performance to triblock copolymer gels which are much less resistance to crack propagation caused by long term continue dynamic loadings.

Adhesion to substrates is most desirable when it is necessary to apply the adherent invention food gels to substrates in the absence of heat or on to a low temperature melting point substrate for later peel off after use, such as for sound damping of a adherent gel composite applied to a first surface and later removed for use on a second surface. The low melting substrate materials which can not be exposed to the high heat of the molten adherent invention food gels, such as low melting metals, low melting plastics (polyethylene, PVC, PVE, PVA, and the like) can only be formed by applying the adherent invention food gels to the temperature sensitive substrates. Other low melting plastics include: polyolefins such as polyethylene, polyethylene copolymers, ethylene alpha-olefin resin, ultra low density ethylene-octene-1 copolymers, copolymers of ethylene and hexene, polypropylene, and etc. Other cold applied adherent gels to teflon type polymers: TFE, PTFE, PEA, FEP, etc., polysiloxane as substrates are achieved using the adherent invention food gel.

Likewise, adherent gel substrate composites can be both formed by casting hot onto a substrate and then after cooling adhering the opposite side of the adherent gel to a substrate having a low melting point. The adherent gel is most essential when it is not possible to introduce heat in an heat sensitive or explosive environment or in outer space. The use of solid or liquid resins promotes adherent gel adhesion to various substrates both while the adherent gel is applied hot or at room temperature or below or even under water. The adherent invention food gels can be applied without heating to paper, foam, plastic, fabric, metal, concrete, wood, wire screen, refractory material, glass, synthetic resin, synthetic fibers, and the like.

The adhesion properties of the invention food gels are determined by measuring comparable rolling ball tack distance "D" in cm using a standard diameter "d" in mm stainless steel ball rolling off an inclined of height "H" in cm. Adhesion can also be measured by determining the average force required to perform 180° C. peel of a heat formed $G_1M_1$ one inch width sample applied at room temperature to a substrate $M_2$ to form the composite $M_1G_1M_2$. The peel at a selected standard rate cross-head separation speed of 25 cm/minute at room temperature is initiated at the $G_1M_2$ interface of the $M_1G_1M_2$ composite, where the substrate $M_2$ can be any of the substrates mentioned and $M_1$ preferably a flexible fabric.

Glassy phase associating homopolymers such as polystyrene and aromatic resins having low molecular weights of from about 2,500 to about 90,000 can be blended with the triblock copolymers of the invention in large amounts with or without the addition of plasticizer to provide a copolymer-resin alloy of high impact strengths. More advantageously, when blended with multiblock copolymers and substantially random copolymers the impact strengths can be even higher. The impact strength of blends of from about 150 to about 1,500 parts by weight glass phase associating polymer and resins to 100 parts by weight of one or more multiblock copolymers can provide impact strength approaching those of soft metals. At the higher loadings, the impact strength approaches that of polycarbonates of about 12 ft-lb/in notch and higher.

The invention food gel can also contain useful amounts of conventionally employed additives such as stabilizers, antioxidants, antiblocking agents, colorants, fragrances, flame retardants, other polymers in minor amounts and the like to an extend not affecting or substantially decreasing the desired properties of the present invention.

The invention food gels are prepared by blending together the components (I, II, III, IV, V, VI, VII, or VIII) including the various additives as desired at about 23° C. to about 100° C. forming a paste like mixture and further heating said mixture uniformly to about 150° C. to about 200° C. until a homogeneous molten blend is obtained. Lower and higher temperatures can also be utilized depending on the viscosity of the oils and amounts of multiblock copolymers (I) and polymer (III) used. These components blend easily in the melt and a heated vessel equipped with a stirrer is all that is required. Small batches can be easily blended in a test tube using a glass stirring rod for mixing. While conventional large vessels with pressure and/or vacuum means can be utilized in forming large batches of the instant compositions in amounts of about 40 lbs or less to 10,000 lbs or more. For example, in a large vessel, inert gases can be employed for removing the composition from a closed vessel at the end of mixing and a partial vacuum can be applied to remove any entrapped bubbles. Stirring rates utilized for large batches can range from about less than 10 rpm to about 40 rpm or higher.

The invention food gel can also contain gases as an additive, i.e. the gel can be foamed. Foam is herein defined as tightly or loosely packing aggregation of gas bubbles, separated from each other by thin or thick layers of gel. Many types of foamed invention food gels (from ultra high density to ultra low density) can be produced as desired by (i) adding gas to the molten gel during processing, and (ii) producing gas in the molten gel during processing. Gas can be added by whipping a gas into the molten gel before it cools or introduce a gas into the molten gel and then expand or reduce the size of the gas bubbles by reducing the pressure to reduce the bubbles size or applying high pressure to expand the bubbles size. In this regard, inert gases such as Carbon dioxide, Nitrogen, Helium, Neon, Argon, Krypton, Xenon and Radon are suitable. Air can also be used. Gas can be produced in the molten gel by adding one or more of a "blowing agent" to the. Useful blowing agents include dinitroso compounds, such as dinitroso pentamethylenetetramine, azodicarbonamide, 4,4'oxybis (benzenesulfonyl) hydrazine, 5-phenyltetrazole, p-toluenesulfonyl semicarbazide, sulfonyl hydrazide, such as benzene sulfonylhydrazide. Water can be used as a "blowing agent" to $^1$ produce varying density of foam invention food gels; water used to advantage can be in the form of mist, droplets, steam, and hot or cold water. The density of the foam invention food gels can vary from less than 1.00 kilograms per cubic meter to near the solid gel density. Although the materials forming soft solid invention food gels may be more shear resistant, the same materials when made into a foam become much less shear resistant.

The gel articles can be formed by blending, injection molding, extruding, spinning, casting and other conventional methods. For example, Shapes having various crossection can be extruded using a HP-2000 Mixing extruder from Dek-tron Scientific Instruments of Plainfield, N.J. 07060, USA.

In general, the basis of this invention resides in the fact that one or more of a high viscosity linear multiblock and star-shaped multiblock copolymers (I) or a mixture of two or more of such copolymers having (A) end block to elastomeric block ratio preferably within the contemplated range of styrene to rubber ratios of from about 20:80 to about 40:60 and higher, more preferably from between about 31:69 to about 40:60 and higher when blended in the melt with an appropriate amount of plasticizing oil makes possible the attainment of invention food gels having a desirable combination of physical and mechanical properties, notably high elongation at break of at least 1,600%, ultimate tensile strength of about $8\times10^5$ dyne/cm$^2$ and higher, low elongation set at break of substantially not greater than about 2%, tear resistance of $5\times10^5$ dyne/cm$^2$ and higher, substantially about 100% snap back when extended to 1,200% elongation.

More specifically, the invention food gels of the present invention exhibit one or more of the following properties. These are: (1) tensile strength of about $8\times10^5$ dyne/cm$^2$ to about $10^7$ dyne/cm$^2$ and greater; (2) elongation of less than about 1,600% to about 3,000% and higher; (3) elasticity modulus of about $10^4$ dyne/cm$^2$ to about $10^6$ dyne/cm$^2$ and greater; (4) shear modulus of about $10^4$ dyne/cm$^2$ to about $10^6$ dyne/cm$^2$ and greater as measured with a 1, 2, and 3 kilogram load at 23° C.; (5) gel rigidity of about less than about 2 gram Bloom to about 1,800 gram Bloom and higher; (6) tear propagation resistance of at least about $5\times10^5$ dyne/cm$^2$; (7) and substantially 100% snap back recovery when extended at a crosshead separation speed of 25 cm/minute to 1,200% at 23° C. Properties (1), (2), (3), and (6) above are measured at a crosshead separation speed of 25 cm/minute at 23° C.

As the invention food gels formed from multiblock copolymers (I) having more and more midblock polymer chains can be expected to exhibit greater delay recovery form extension or longer relaxation times with increasing number of midblocks and increasing midblock lengths, such invention food gels having more than three midblocks forming the copolymers (I) can exhibit extreme tear resistance and excellent tensile strength while at the same time exhibit almost liquid like properties.

The invention gels are especially suitable and have uses where resistance to dynamic stretching, shearing and tearing forces are particularly useful such as those forces acting during fishing as described above and as dental flossing. In the case of dental flossing, freeze dried dental paste can also be incorporated into the gel and formed into dental floss by passing coating the dental floss surface with flavors or other agents. Not only is the dental floss a floss, it is an effective tooth brush in between the tooth gap between making it a floss-brush with activated tooth past build in. The gel compounded with toothpaste can contain any anticavity agents including sodium fluoride, any antigingivitis agents, any whitening agents, and any plaque fighting agents. Freeze dry or powders containing hydrated silica, sorbitol, PVM/MA copolymer, sodium lauryl sulfate, flavor, sodium hydroxide, triclosan, monoammonium phosphate, calcium sulfate, ammonium chloride, magnesium chloride, methylparaben, propylparaben, coloring, and the like can be compounding into the gel composition forming a floss-brush gel composition.

While advantageous components and formulation ranges based on the desired properties of the multiblock copolymer invention gels have been disclosed herein. Persons of skill in the art can extend these ranges using appropriate material according to the principles discussed herein. All such variations and deviations which rely on the teachings through which the present invention has advanced the art are considered to be within the spirit and scope of the present invention.

The invention is further illustrated by means of the following illustrative embodiments, which are given for purpose of illustration only and are not meant to limit the invention to the particular components and amounts disclosed.

EXAMPLE 1

A gel composition of 100 parts of Kuraray's S-E-EP-S 4055 copolymer and 400 parts by weight of Duraprime 200 white oil was made following Example I and extruded and drawn (from a 7.15 mm diameter orifice) into a strand of uniform diameter onto a take-up roll of continuous lengths. The strand diameter was varied by increasing and decreasing the speed of the take-up roll. The continuous strand of varying diameter gel strand was cut to suitable lengths for use and testing as dental floss. Additional gel was also casted in varying thickness and tested. The results of samples tested are shown in Table 3, #4–7; Table 4, #12–15 and 20; Table 5 #22, 23, 27–29; Table 6 #36–32; Table 7, #40–43,#76 and 77. Sample Nos. 76 and 77 were tested together. Sample 77 exhibited higher tensile strength after 27.75% of plasticizing oil was extracted (with 2.89 parts by weight of oil remaining), its rigidity remained substantially unchanged.

EXAMPLE 2

A gel composition of 100 parts of Kraton G1651 and 400 parts by weight of Duraprime 200 white oil was made following Example I and extruded and drawn (from a 7.15 mm diameter orifice) into a strand of uniform diameter onto a take-up roll of continuous lengths. The strand diameter was varied by increasing and decreasing the speed of the take-up roll. The continuous strand of varying diameter gel strand was cut to suitable lengths for use and testing as dental floss. Additional gel was also casted in varying thickness and tested. The results of samples tested are shown in Table 3B, #8–11; Table 4, #16–19 and 21; Table 5, #24–26; Table 6, #33–35; and Table 7, #36–39.

TABLE 3A

Flossing Cycles to Break

| Sample No. | Floss Type | cross-section size (mm$^2$) | [2]Floss amalgam molars to break | [3]Floss fronts to |
|---|---|---|---|---|
| 1 | [4]Unwaxed spongy nylon | 0.30 | 18 | 200+ |
| 2 | [5]Regular waxed nylon | 0.11 | 11 | 200+ |
| 3 | [6]Extra fine unwaxed nylon | 0.06 | 6 | 200+ |

| Sample No. | Floss Type | [1]Relaxed/extended dia. (mm) | [2]Floss amalgam molars to break | [3]Floss fronts to break |
|---|---|---|---|---|
| 4 | [7]Gel | 2.42/0.16 | 37 | 76 |
| 5 | [7]Gel | 2.63/0.17 | 29 | 83 |
| 6 | [7]Gel | 2.75/0.17 | 36 | 183 |
| 7 | [7]Gel | 2.83/0.20 | 20 | 74 |
| 8 | [8]Gel | 3.22/0.22 | 8 | 30 |
| 9 | [8]Gel | 2.48/0.31 | 4 | 20 |
| 10 | [8]Gel | 3.16/0.33 | 6 | 44 |
| 11 | [8]Gel | 2.86/0.24 | 5 | 29 |

[1]floss dimension relaxed state and when extended during flossing cycles.
[2]Test conditions: number of flossing cycles (before breaking) between amalgam alloy metal (fully contacting) lower, left first and second human back molars.
[3]Test conditions: number of flossing cycles (before breaking) between upper human front teeth.
[4]Oral-B Ultra Floss ™, interlocking network of spongy nylon floss.
[5]Johnson & Johnson regular waxed nylon floss.
[6]Johnson & Johnson extra fine unwaxed nylon floss.
[7]Gel made from 100 parts by weight of S-E-EP-S 4055 multiblock copolymer having a Brookfield viscosity of 90 as measured for a 5 wt % solution in toluene at 30° C. and 400 parts by weight of Duraprime 200 plasticizing oil.
[8]Gel made from 100 parts by weight of SEBS Kraton G1651 copolymer having a Brookfield viscosity of 40 as measured for a 5 wt % solution in toluene at 30° C.
[2,3]Any selected test methods may be utilized in testing the floss performance of the invention gels . For example, a set of simulated upper front teeth fully contacting under a uniform spring load of two pounds may be used in place of human teeth. Such simulated testing conditions may be more severe than conditions 2 and less severe than conditions 3 above.

TABLE 4

Tensile Strength of Gel Strands

| Sample No. | Number of Strands | Radius (mm) | Area (cm$^2$) | Failure (Kg) | Tensile (Kg/cm$^2$) |
|---|---|---|---|---|---|
| 12 | 3 | 1.325 | 0.165 | 9.00 | 54.54 |
| 13 | 4 | 1.250 | 0.196 | 9.50 | 48.39 |
| 14 | 4 | 1.421 | 0.253 | 9.50 | 37.44 |
| 15 | 5 | 1.359 | 0.290 | 12.5 | 43.08 |
| 16 | 2 | 2.14 | 0.287 | 14.0 | 48.78 |
| 17 | 2 | 1.55 | 0.151 | 11.5 | 75.95 |
| 18 | 2 | 1.17 | 0.086 | 8.50 | 98.84 |
| 19 | 2 | 1.322 | 0.109 | 9.0 | 81.96 |
| 20 | 6 | 1.375 | 0.356 | 14 | 39.32 |
| 21 | 2 | 1.445 | 0.131 | 10 | 76.33 |
| 76 | 1 | 1.22 | 0.0467 | 2.00 | 42.82 |
| 77† | 1 | 1.38 | 0.0598 | 4.00 | 66.88 |

†Plasticizing oil extracted

TABLE 5

Tensile Strength of Bulk Gels Samples

| Sample No.. | Cross-section (cm2) | Failure (Kg) | Tensile (Kg/cm2) |
|---|---|---|---|
| 22 | 1.96 | 24.0 | 12.24 |
| 23 | 1.56 | 25.0 | 16.02 |
| 24 | 0.58 | 15.0 | 25.83 |
| 25 | 0.602 | 16.0 | 26.54 |
| 26 | 1.163 | 24.0 | 20.64 |

TABLE 5-continued

Tensile Strength of Bulk Gels Samples

| Sample No. No.. | Cross-section (cm2) | Failure (Kg) | Tensile (Kg/cm2) |
|---|---|---|---|
| 27 | 0.913 | 21.0 | 23.00 |
| 28 | 0.595 | 18.5 | 36.56 |
| 29 | 0.702 | 19.0 | 27.06 |

TABLE 6

180° U Bend Tear Propagation of Bulk Gels Samples

| Sample No. | Tear width (cm) | Failure (Kg) | Tear Force (Kg/cm) |
|---|---|---|---|
| 30 | 1.31 | 2.75 | 2.09 |
| 31 | 1.28 | 3.0 | 2.30 |
| 32 | 1.14 | 2.75 | 2.56 |
| 33 | 1.53 | 2.75 | 1.79 |
| 34 | 1.27 | 2.25 | 1.76 |
| 35 | 1.26 | 2.25 | 1.77 |

TABLE 7

Notched Gel Strand Tension Tear Propgation

| Sample No. | Strand Dia. (mm) | Failure (Kg) | Tear Force (Kg/cm) |
|---|---|---|---|
| 36 | 2.86 | 0.75 | 2.62 |
| 37 | 2.49 | 0.75 | 3.01 |
| 38 | 3.09 | 0.60 | 1.94 |
| 39 | 2.62 | 0.70 | 2.67 |
| 40 | 2.54 | 0.60 | 2.36 |
| 41 | 1.94 | 1.10 | 5.67 |
| 42 | 1.58 | 0.75 | 4.74 |
| 43 | 2.34 | 1.2 | 5.12 |

The tensile strengths of invention gels made from higher viscosity copolymers are lower than the tensile strengths of gels made from lower solution viscosity copolymers. This was later found to be due to orientation effects and not considered significant.

The tear resistance of invention gels made from higher viscosity copolymers are higher than the tear resistance of invention gels made from lower solution viscosity copolymers.

Examples below illustrate other modes of practice contemplated

EXAMPLE 3

Gels of 100 parts of Septon crystalline (SEEPS) copolymers 4033, 4055, and 4077 in combination with sufficient amounts of a Dow poly(ethylene/styrene) random copolymers ES 16 having 37.5% crystallinity and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 4

Gels of 100 parts of Septon crystalline (SEEPS) copolymers 4033, 4055, and 4077 in combination with sufficient amounts of a Dow poly(ethylene/styrene) random copolymers ES24 having 26.6% crystallinity and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 5

Gels of 100 parts of Septon crystalline (SEEPS) copolymers 4033, 4055, and 4077 in combination with sufficient amounts of a Dow poly(ethylene/styrene) random copolymers ES27 having 17.4% crystallinity and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 6

Gels of 100 parts of Septon crystalline (SEEPS) copolymers 4033, 4055, and 4077 in combination with sufficient amounts of a Dow poly(ethylene/styrene) random copolymers ES28 having 22.9% crystallinity and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 7

Gels of 100 parts of Septon crystalline (SEEPS) copolymers 4033, 4055, and 4077 in combination with sufficient amounts of a Dow poly(ethylene/styrene) random copolymers ES30 having 19.6% crystallinity and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 8

Gels of 100 parts of Septon crystalline (SEEPS) copolymers 4033, 4055, and 4077 in combination with sufficient amounts of a Dow poly(ethylene/styrene) random copolymers ES44 having 5.0% crystallinity and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 9

Gels of 100 parts of Septon crystalline (SEEPS) copolymers 4033, 4055, and 4077 in combination with sufficient amounts of a Dow poly(ethylene/styrene) random copolymers ES72 and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 10

Gels of 100 parts of Septon crystalline (SEEPS) copolymers 4033, 4055, and 4077 in combination with sufficient amounts of a Dow poly(ethylene/styrene) random copolymers ES73 and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 11

Gels of 100 parts of Septon crystalline (SEEPS) copolymers 4033, 4055, and 4077 in combination with sufficient amounts of a Dow poly(ethylene/styrene) random copolymers ES74 and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 12

Gels of 100 parts of Septon crystalline (SEEPS) copolymers 4033, 4055, and 4077 in combination with sufficient amounts of a Dow poly(ethylene/styrene) random copolymers ES69 and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 13

Gels of 100 parts of Septon crystalline (SEEPS) copolymers 4033, 4055, and 4077 in combination with sufficient amounts of a Dow poly(ethylene/styrene) random copolymers ES62 and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 14

Gels of 100 parts of Septon (SEPS) copolymers Kraton GRP6918 in combination with each of a Dow poly(ethylene/styrene) random copolymers ES16, ES24, ES27, ES28, ES30, and ES44 and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 15

Gels of 100 parts of Septon (SEBS) copolymers S8006 and Kraton G1651, G1654 in combination with sufficient amounts of a Dow poly(ethylene/styrene) random copolymers ES16, ES24, ES27, ES28, ES30, and ES44 and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 16

Gels of 100 parts of Septon (SEEPS) copolymers 4033, 4045, 4055, 4077 in combination each with 25 parts by weight of Super Sta-tac, Betaprene Nevtac, Escorez, Hercotac, Wingtack, Piccotac, polyterpene, Zonarez, Nirez, Piccolyte, Sylvatac, glycerol ester of rosin (Foral), pentaerythritol ester of rosin (Pentalyn), saturated alicyclic hydrocarbon (Arkon P), coumarone indene (Cumar LX), hydrocarbon (Picco 6000, Regalrez), mixed olefin (Wingtack), alkylated aromatic hydrocarbon (Nevchem), Polyalphamethylstyrene/vinyl toluene copolymer (Piccotex), polystyrene (Kristalex, Piccolastic), special resin (LX-1035) and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 17

Gels of 100 parts of Septon (SEEPS) copolymers 4033, 4045, 4055, 4077 in combination each with 25 parts by weight of Super Sta-tac, Betaprene Nevtac, Escorez, Hercotac, Wingtack, Piccotac, polyterpene, Zonarez, Nirez, Piccolyte, Sylvatac, glycerol ester of rosin (Foral), pentaerythritol ester of rosin (Pentalyn), saturated alicyclic hydrocarbon (Arkon P), coumarone indene (Cumar LX), hydrocarbon (Picco 6000, Regalrez), mixed olefin (Wingtack), alkylated aromatic hydrocarbon (Nevchem), Polyalphamethylstyrene/vinyl toluene copolymer (Piccotex), polystyrene (Kristalex, Piccolastic), special resin (LX-1035) and 800, 600, 500, 450, 300, 250 parts by weight of Duraprime 55, 70, Klearol, Carnation, Blandol, Benol, Semtol 85, 70, and 40 (plasticizers having Vis. CSt @ 40° C. of less than 20) are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of Example X.

EXAMPLE 18

Gels of 100 parts by weight each of Septon 4033, 4055, 4045, 4077, Kraton 1651, 1654, 1184, 4158, 4150, 1101, 1113, and 1144 copolymers in combination with 600 parts by weight of Blandol, 50 parts by weight of a protein containing food from dried fish meal, dry egg yolk, dry brine shrimp, hydrolyzed plant protein, dry and worms, 0.05 parts by weight of Irganox 1010, and 0.1 parts by weight of Tinuvin P, are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of made from Septon 2006 SEPS.

EXAMPLE 19

Gels of 100 parts by weight each of Septon 4033, 4055, 4045, 4077, Kraton 1651, 1654, 1184, 4158, 4150, 1101, 1113, and 1144 copolymers in combination with 600 parts by weight of Blandol, 50 parts by weight of an amino acids: Alanine, Arginine, Asparagine, Aspartic Acid, Cysteine, Glutamic Acid, Glutamine, Glycine, Histidine Isoleucine, Leucine, Lysine, Methionine, Phenylalanine, Proline, Serine, Threonine, Tryptophan, Tyrosine, Valine, 0.05 parts by weight of Irganox 1010, and 0.1 parts by weight of Tinuvin P, are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of made from Septon 2006 SEPS.

EXAMPLE 20

Gels of 100 parts by weight each of Septon 4033, 4055, 4045, 4077, Kraton 1651, 1654, 1184, 4158, 4150, 1101, 1113, and 1144 copolymers in combination with 600 parts by weight of Blandol, 25 parts by weight of a protein containing food from dried fish meal, dry egg yolk, dry brine shrimp, hydrolyzed plant protein, dry and worms, 0.05 parts by weight of Irganox 1010, and 0.1 parts by weight of Tinuvin P, are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of made from Septon 2006 SEPS.

EXAMPLE 21

Gels of 100 parts by weight each of Septon 4033, 4055, 4045, 4077, Kraton 1651, 1654, 1184, 4158, 4150, 1101, 1113, and 1144 copolymers in combination with 600 parts by weight of Blandol, 50 parts by weight of dry chicken liver, dry lungs, dry kidneys, dry brain, and dry spleen, 0.05 parts by weight of Irganox 1010, and 0.1 parts by weight of Tinuvin P, are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of made from Septon 2006 SEPS. The resulting gel is found to have an elongation greater than 500% and is used to mold simulated foods in the form of a worm, a frog, a lizard, a fish for use on a Carolina Rig, a Texas Rig, and a Wacky Rig presentation and the simulated foods are found to exhibit a success hook to catch ratio greater than 5 as compared to a conventional plastisol polyvinyl chloride simulated food of corresponding rigidity.

EXAMPLE 22

Gels of 100 parts by weight each of Septon 4033, 4055, 4045, 4077, Kraton 1651, 1654, 1184, 4158, 4150, 1101, 1113, and 1144 copolymers in combination with 600 parts by weight of Blandol, 50 parts by weight of waxes, fatty acids, long-chair fatty acids, surger, MSG, fish oil, and plant oils, 0.05 parts by weight of Irganox 1010, and 0.1 parts by weight of Tinuvin P, are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of made from Septon 2006 SEPS.

EXAMPLE 23

Gels of 100 parts by weight each of Septon 4033, 4055, 4045, 4077, Kraton 1651, 1654, 1184, 4158, 4150, 1101, 1113, and 1144 copolymers in combination with 600 parts by weight of Blandol, 100 parts by weight of a protein containing food from dried fish meal, dry egg yolk, dry brine shrimp, hydrolyzed plant protein, dry and worms, 0.05 parts by weight of Irganox 1010, and 0.1 parts by weight of Tinuvin P, are melt blended, tests, and tack probe samples molded, the bulk gel rigidities are found to be within the range of 2 gram to 1,800 gram Bloom and the notched tear strength and resistance to fatigue of the gel at corresponding rigidities are found to be greater than that of amorphous gels of made from Septon 2006 SEPS.

EXAMPLE 24

Gel of 100 parts of of Kraton 1651 copolymer in combination with 600 parts by weight of (50 parts by weight of Arcro Prime 55 and 50 parts by weight of Arco prime 70), 0.05 parts by weight of Irganox 1010, and 0.1 parts by weight of Tinuvin P, the bulk gel rigidities are found to be within the range of 2 gram to 1,800 gram Bloom.

EXAMPLE 25

The following gels were made with 600 parts by weight of oil, 0.5 parts by weight of Irganox 1010, and 0.5 parts by weight of Tinuvin P, melt blended in a 16×150 mm glass test tube, cooled, removed, and 180° U bend tested 50° C. for 1.0 hour:

1. 80 parts by weight of Septon 4055 and 20 parts by weight of Septon 2006, block copolymers, Witco 40 oil, the gel sample retained a deformation of about 30°.
2. 80 parts by weight of Septon 8006 and 20 parts by weight of Septon 4055, block copolymers, 35 parts by weight of Endex 160, Witco 40 oil, the gel heat tested sample retained a deformation of about 84°.
3. Gels of 90 parts by weight of Septon 8006 and 10 parts by weight of Septon 4055, block copolymers, 35 parts by weight of Endex 160, Witco 40 oil, the gel heat tested sample retained a deformation of about 85°.
4. Gels of 80 parts by weight of Septon 8006 and 20 parts by weight of Septon 4055, block copolymers, 45 parts by weight of Endex 160, Witco 40 oil, the gel heat tested sample retained a deformation of about 91°.
5. Gels of 90 parts by weight of Septon 8006 and 10 parts by weight of Septon 4055, block copolymers, 45 parts by weight of Endex 160, Witco 40 oil, the gel heat tested sample retained a deformation of about 95°.
6. Gels of 100 parts by weight of Septon 8006, block copolymers, 25 parts by weight of Endex 155, Witco 40 oil, the gel heat tested sample retained a deformation of about 56°.
7. Gels of 100 parts by weight of Septon 8006, block copolymers, 45 parts by weight of Endex 155, Witco 40 oil, 0.5 parts by weight of Irganox 1010, the gel heat tested sample retained a deformation of about 57°.
8. Gels of 100 parts by weight of Septon 4055, block copolymers, Witco 40 oil, the gel heat tested sample retained a deformation of about 90°.
9. Gels of 60 parts by weight of Septon 4055 & 30 parts by weight of Kraton 1651 block copolymers, Witco 40 oil, the gel heat tested sample retained a deformation of about 45°.
10. Gels of 30 parts by weight of Septon 4055 & 60 parts by weight of Kraton 1651 block copolymers, Witco 40 oil, the gel heat tested sample retained a deformation of about 55°.
11. Gels of 100 parts by weight of Septon 8006 block copolymers in combination with 33 parts by weight of a GE PPO Blendex® HPP821, 600 parts by weight of Witco 40 oil, the gel heat tested sample retained a deformation of about 10°.
12. Gels of 60 parts by weight of Septon 4055 & 30 part by weight of Kraton 1651 block copolymers in combination with 33 parts by weight of a GE PPO Blendex® HPP821, Witco 40 oil, the gel heat tested sample retained a deformation of about 33°.
13. Gels of 100 parts by weight of Septon 4055 block copolymers in combination with 25 parts by weight of a GE PPO Blendex® HPP821, Witco 40 oil, the gel heat tested sample retained a deformation of about 30°.
14. Gels of 100 parts by weight of Septon 2006 block copolymers in combination with 25 parts by weight of a GE PPO Blendex® HPP821, Witco 40 oil, the gel heat tested sample retained a deformation of about 15°.
15. Gels of 100 parts by weight of Septon 8006 block copolymers in combination with 25 parts by weight of a GE PPO Blendex® HPP821, Witco 40 oil, the gel heat tested sample retained a deformation of about 35°.
16. Gels of 100 parts by weight of Kraton 1651 block copolymers in combination with 25 parts by weight of a GE PPO Blendex® HPP821, Witco 40 oil, the gel heat tested sample retained a deformation of about 25°.
17. Gels of 100 parts by weight of Septon 4055 block copolymers in combination with 25 parts by weight of Endex 155, Witco 40 oil, the gel heat tested sample retained a deformation of about 75°.
18. Gels of 100 parts by weight of Septon 2006 block copolymers in combination with 25 parts by weight of Endex 155, Witco 40 oil, the gel heat tested sample retained a deformation of about 55°.
19. Gels of 100 parts by weight of Septon 8006 block copolymers in combination with 25 parts by weight of Endex 155, Witco 40 oil, the gel heat tested sample retained a deformation of about 30°.
20. Gels of 100 parts by weight of Kraton 1651 block copolymers in combination with 25 parts by weight of Endex 155, Witco 40 oil, the gel heat tested sample retained a deformation of about 27°.
21. Gels of 100 parts by weight of Septon 4055 block copolymers, Blandol, the gel heat tested sample retained a deformation of about 30°.
22. Gels of 100 parts by weight of Septon 4055 block copolymers, Carnation, the gel heat tested sample retained a deformation of about 30°.
23. Gels of 100 parts by weight of Septon 4055 block copolymers, Klearol, the gel heat tested sample retained a deformation of about 40°.
25. Gels of 50 parts by weight of Septon 4055 & 50 parts by weight of Septon 2006 block copolymers, (equal weight of Blandol and Witco 40 oil), the gel heat tested sample retained a deformation of about 57°.
26. Gels of 50 parts by weight of Septon 4055 & 50 parts by weight of Septon 2006 block copolymers, Witco 40 oil, the gel heat tested sample retained a deformation of about 78°.
27. Gels of 50 parts by weight of Septon 4055 & 50 parts by weight of Septon 2006 block copolymers, Witco 40 oil, the gel heat tested sample retained a deformation of about 80°.
28. Gels of 50 parts by weight of Septon 4055 & 50 parts by weight of Kraton 1651 block copolymers, (equal weight of Blandol and Witco 40 oil), the gel heat tested sample retained a deformation of about 55°.
29. Gels of 100 parts by weight of Septon 2006 block copolymers, (equal weight of Blandol and Witco 40 oil), the gel heat tested sample retained a deformation of about 45°. The resulting gel is highly tacky.
30. A Berkly and V & M PVC fishing baits were 180° U bend tested @ 50° C. for 1.0 hour, both baits retained a deformation of about 34.

When poly(styrene-ethylene-butylene-styrene) (SEBS) is substituted in place of (I) block copolymer of the invention, the (SEBS) strength is slightly lower, but lack the improved tear resistance and rupture resistance. For use as simulated food, (SEBS) gels can also be made soft and are also an improvement over conventional plastisol polyvinyl chloride simulated foods of corresponding rigidity.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

I claim:

1. A foodstuff comprising a soft gelatinous food elastomer composition formed from
   (I) 100 parts by weight of one or more thermoplastic elastomer block copolymer(s);
   (II) a selected plasticizer being in sufficient amounts to achieve a gel rigidity of from about 20 gram Bloom to about 1,800 gram Bloom; and in combination with
   (III) a selected amount of one or more dry foodstuff.

2. A foodstuff comprising a soft gelatinous food elastomer composition formed from
   (I) 100 parts by weight of one or more thermoplastic elastomer block copolymer(s);
   (II) one or more first plasticizers with or without one or more second plasticizers being in sufficient amounts to achieve a gel rigidity of from about 20 gram Bloom to about 1,800 gram Bloom; and In combination with
   (III) a selected amount of one or more dry foodstuff protein.

3. A foodstuff comprising a soft gelatinous food elastomer composition formed from
   (I) 100 parts by weight of one or more of a thermoplastic elastomer block copolymer(s);
   (II) one or more first plasticizers with or without one or more second plasticizers being in sufficient amounts to achieve a gel rigidity of from about 20 gram Bloom to about 1,800 gram Bloom; and in combination with
   (III) a selected amount of one or more amino acids, proteins, crude proteins, true proteins, and lipids of a dry foodstuff; wherein said block copolymers is poly(styrene-ethylene-ethylene-propylene-styrene).

4. A foodstuff comprising a soft gelatinoUS food elastomer composition formed from
   (I) 100 parts by weight of one or more of a hydrogenated styrene isoprene/butadiene block copolymer(s) and from
   (II) about 300 to about 1,600 parts by weight of a plasticizing oil; with or without
   (III) a selected amount of one or more polymers or copolymers of poly(styrene-butadiene-styrene), poly(styrene-butadiene)$_n$, poly(styrene-isoprene-styrene)$_n$, poly(styrene-isoprene)$_n$, poly(styrene-ethylene-propylene), poly(styrene-ethylene-propylene- styrene), poly(styrene-ethylene-butylene-styrene), poly(styrene-ethylene-butylene), poly(styrene-ethylene-propylene)$_n$, poly(styrene-ethylene-butylene)$_n$, polystyrene, polybutylene, poly(ethylene-propylene), poly(ethylene-butylene), polypropylene, or polyethylene, wherein said selected copolymer is a linear, radial, star-shaped, branched or multiarm copolymer, wherein n is greater than one; and in combination with
   (IV) a selected amount of one or more amino adds, proteins, crude proteins, true proteins, and lipids of a dry seafoodstuff.

5. A foodstuff comprising a soft gelatinous food elastomer composition formed from
   (I) 100 parts by weight of one or more thermoplastic elastomer block copolymer(s);
   (II) one or more first plasticizers with or without one or more second plasticizers being in sufficient amounts to achieve a gel rigidity of from about 20 gram Bloom to about 1,800 gram Bloom; in combination with one or more selected amounts of lipids, amino acids, proteins, minerals, vitamins, sugars, blood plasma, serum, hormones, tissue, cartilage, and bone matter of a foodstuff selected from animal foodstuff, vegetable foodstuff, and microbiological foodstuff.

6. A foodstuff comprising a soft gelatinous food elastomer composition formed from
   (I) 100 parts by weight of one or more thermoplastic elastomer block copolymer(s);
   (II) one or more first plasticizers with or without one or more second plasticizers being in sufficient amounts to achieve a gel rigidity of from about 20 gram Bloom to about 1,800 gram Bloom; and in combination with a dry foodstuff.

7. A foodstuff comprising a soft gelatinous food elastomer composition formed from
   (I) 100 parts by weight of one or more thermoplastic elastomer block copolymer(s);
   (II) one or more first plasticizers with or without one or more second plasticizers being in sufficient amounts to achieve a gel rigidity of from about 20 gram Bloom to about 1,800 gram Bloom; and in combination with one or more foodstuff flavorings.

8. A foodstuff comprising a soft gelatinous food elastomer composition formed from
   (I) 100 parts by weight of one or more thermoplastic elastomer block copolymer(s);
   (II) one or more first plasticizers with or without one or more second plasticizers being in suffident amounts to achieve a gel rigidity of from about 20 gram Bloom to about 1,800 gram Bloom; and in combination with one or more foodstuff additives; wherein said block copolymers is poly(styrene-ethylene-ethylene-propylene-styrene), poly(styrene-ethylene-propylene-styrene) or poly(styrene-butadiene-styrene).

9. A foodstuff comprising a soft gelatinous food elastomer composition formed from
   (I) 100 parts by weight of one or more thermoplastic elastomer block copolymer(s);
   (II) one or more first plasticizers with or without one or more second plasticizers being in sufficient amounts to achieve a gel rigidity of from about 20 gram Bloom to about 1,800 gram Bloom; and in combination with one or more foodstuff selected from animal foodstuff, vegetable foodstuff, and microbiological foodstuff; wherein said block copolymers is poly(styrene-ethylene-ethylene-propylene-styrene), poly(styrene-ethylene-propylene-styrene) or poly(styrene-butadiene-styrene).

10. A foodstuff comprising a soft gelatinous food elastomer composition formed from
    (I) 100 parts by weight of one or more thermoplastic elastomer block copolymer(s);
    (II) one or more first plasticizers with or without one or more second plasticizers being in sufficient amounts to achieve a gel rigidity of from about 20 gram Bloom to about 1,800 gram Bloom; said gelatinous food elastomer composition in combination with one or more dry foodstuff selected from meats, vegetables, fruits, bacteria, fungus, yeasts, alga, seaweeds, and grasses, including one or more foodstuff extracts selected from proteins, cells, blood plasma, serum, and hormones.

11. A foodstuff comprising a soft gelatinous food elastomer composition formed from
    (I) 100 parts by weight of one or more thermoplastic elastomer block copolymer(s);
    (II) one or more first plasticizers with or without one or more second plasticizers being in sufficient amounts to achieve a gel rigidity of from about 20 gram Bloom to about 1,800 gram Bloom; in combination with or without (III) one or more selected polymers or copolymers; and in combination with (IV) one or more dry foodstuff;

said second plasticizers being in effective amounts in combination with said first plasticizers for said gelatinous compositions to have a greater temperature compression set than a gelatinous composition having the same rigidity formed from said first plasticizers alone;

said second plasticizers for said gelatinous compositions to have a greater temperature compression set than a gelatinous composition having the same rigidity formed from said first plasticizers alone or formed from a combination of said first plasticizers and said second plasticizers.

12. A foodstuff comprising a soft gelatinous food elastomer composition formed from (I) 100 parts by weight of one or more thermoplastic elastomer block copolymer(s);

(II) one or more plasticizers with a selected amount of one or more waxes, said plasticizers in sufficient amounts to achieve a gel rigidity of from about 20 gram Bloom to about 1,800 gram Bloom; and in combination with one or more a dry foodstuff; with or without one or more selected polymers or copolymers; said waxes in effective amounts for said gelatinous food elastomer composition to have a greater temperature compresion set than a gelatinous food elastomer composition having the same rigidity formed from said plasticizers alone.

13. A foodstuff comprising a soft gelatinous food elastamer composition formed from (I) 100 parts by weight of one or more thermoplastic elastomer block copolymer(s);

(II) one or more plasticizers with a selected amount of one or more waxes, said plasticizers in sufficient amounts to achieve a gel rigidity of from about 20 gram Bloom to about 1,800 gram Bloom; and in combination with (III) one or more foodstuff selected from animal foodstuff, vegetable foodstuff, and microbiological foodstuff.

14. A foodstuff comprising a soft gelatinous food elastomer composition formed from (I) 100 parts by weight of one or more thermoplastic elastomer block copolymer(s);

(II) one or more plasticizers in sufficient amounts to achieve a gel rigidity of from about 20 gram Bloom to about 1,800 gram Bloom; said gelatinous food elastomer composition in combination with a selected amount of one or more foodstuff selected from a fish foodstuff, an animal foodstuff, a meat foodstuff, a vegetable foodstuff, a microbiological foodstuff, a bacteria foodstuff, a fungus foodstuff, a mold foodstuff, an alga foodstuff, a seaweed foodstuff, a grass foodstuff, a yeast foodstuff, a protein foodstuff, a seafood protein foodstuff, a vegetable protein foodstuff, a crude protein foodstuff, a true protein foodstuff, an amino acid extract foodstuff, a sugar extract foodstuff, a plant starch extract foodstuff, a carbohydrate extract foodstuff, an extract of foodstuff, a lipid extract foodstuff, a fruit foodstuff, a fruit extract foodstuff, an extract of fungus foodstuff, an extract of microbiological foodstuff, an insect foodstuff, an insect extract foodstuff, and mineral foodstuff, and a mineral extract foodstuff.

15. A foodstuff comprising a soft gelatinous food elastomer composition formed from (I) 100 parts by weight of one or more thermoplastic elastamer block copolymer(s);

(II) one or more first plasticizers with one or more second plasticizers being in sufficient amounts to achieve a gel rigidity of from about 20 gram Bloom to about 1,800 gram Bloom; in combination with a selected amount of one or more foodstuff selected from animal foodstuff, vegetable foodstuff, fungus foodstuff, and microbiological foodstuff;

said second plasticizers being in effective amounts in combination with said first plasticizers for said gelatinous compositions to have a greater temperature compression set than a gelatinous composition having the same rigidity formed from said first plasticizers alone.

16. A foodstuff comprising a soft gelatinous food elastomer composition formed from (I) 100 parts by weight of one or more of thermoplastic elastomer block copolymer(s);

(II) one or more plasticizers in sufficient amounts to achieve a gel rigidity of from about 20 gram Bloom to about 1,800 gram Bloom; and in combination with a selected amount of one or more biological foodstuffs.

* * * * *